United States Patent [19]

Hanaoka et al.

[11] Patent Number: 5,640,510
[45] Date of Patent: Jun. 17, 1997

[54] LIBRARY APPARATUS

[75] Inventors: Yasuhiko Hanaoka; Yoshiaki Ochi, both of Kawasaki; Yoshiyuki Kitanaka, Kato-gun; Hiroki Ohashi, Kato-gun; Hiroshi Shimada, Kato-gun, all of Japan

[73] Assignee: Fujitsu Limited, Japan

[21] Appl. No.: 579,087

[22] Filed: Dec. 21, 1995

Related U.S. Application Data

[62] Division of Ser. No. 218,117, Mar. 25, 1994, Pat. No. 5,513,156.

[30] Foreign Application Priority Data

Jul. 23, 1993 [JP] Japan .................. 5-182480
Jul. 27, 1993 [JP] Japan .................. 5-184675
Jul. 27, 1993 [JP] Japan .................. 5-184676
Jul. 30, 1993 [JP] Japan .................. 5-189784

[51] Int. Cl.[6] .............. G06F 11/00; G06F 11/26; G11B 15/68
[52] U.S. Cl. .................. 395/183.18; 369/34
[58] Field of Search .......... 395/183.18, 183.01; 34/995; 369/34; 995/600

[56] References Cited

U.S. PATENT DOCUMENTS

| 5,018,060 | 5/1991 | Gelb et al. | 395/600 |
| 5,303,214 | 4/1994 | Kulakowski et al. | 369/34 |
| 5,513,156 | 4/1996 | Hanaoka et al. | 369/34 |

Primary Examiner—Robert W. Beausoliel, Jr.
Assistant Examiner—Ly V. Hua
Attorney, Agent, or Firm—Greer, Burns & Crain, Ltd.

[57] ABSTRACT

A library apparatus where multiple moving commands generated by several upper-order units are conveyed to a director. The moving commands may be sequentially conveyed through the same channel or may be simultaneously conveyed through different channels. The moving commands are then conveyed to an accessor controller which includes a queuing table for storing the commands. The queuing table permits the accessor controller to receive additional commands prior to the execution of the previous command. Therefore, the processing speed of the system is increased. Next, the commands are conveyed to a plurality of accessors which transfer the medium cartridges to the desired location. Several accessors may be operated simultaneously in parallel. The simultaneous operation of several accessors also increases the efficiency and speed of the system.

6 Claims, 66 Drawing Sheets

FIG. 18

| STORING LOCATION | CELL ADDRESS |
|---|---|
| ACCESSOR HAND | A000, A001 |
| INLET/OUTLET | B000 |
| CELL BLOCK | C000~CFFF |
| MTU | D000~D00D |

FIG. 22

| INPUT/OUTPUT MACHINE NUMBER ADDRESS (IOC ADDRESS) | | | | | | | |
|---|---|---|---|---|---|---|---|
| DIRECTOR 26-1 | | | | DIRECTOR 26-2 | | | |
| #0 | #1 | #2 | #3 | #0 | #1 | #2 | #3 |

FIG. 23

| DIRECTOR MACHINE NO. | |
|---|---|
| 26-1 | 26-2 |
| D0 | D1 |

FIG. 24

| ACCESSOR MACHINE NO. | |
|---|---|
| 12-1 | 12-2 |
| AS0 | AS1 |

FIG. 25

| DIRECTOR RESPONSE STATUS | CODE | CONTENTS |
|---|---|---|
| INITIAL STATUS | 00 | INDICATES THAT THE CONVEYING COMMAND WAS NORMALLY RECEIVED. PROMOTE THE TRANSFER OF MEDIUM CONVEYANCE INFORMATION. |
| CHANNEL END STATUS | 08 | INDICATES THAT THE CONVEYANCE INFORMATION WAS NORMALLY RECEIVED. |
| DEVICE BUSY | 10 | INDICATES THAT THERE IS NO VACANCY IN THE QUEUEING TABLE. |
| DEVICE END STATUS | 04 | INDICATES THE END OF CONVEYANCE OF THE MEDIUM. |
| BUSY CANCELLATION STATUS | 04 | INDICATES THAT THERE IS A VACANCY IN THE QUEUEING TABLE. |

F I G. 3 6
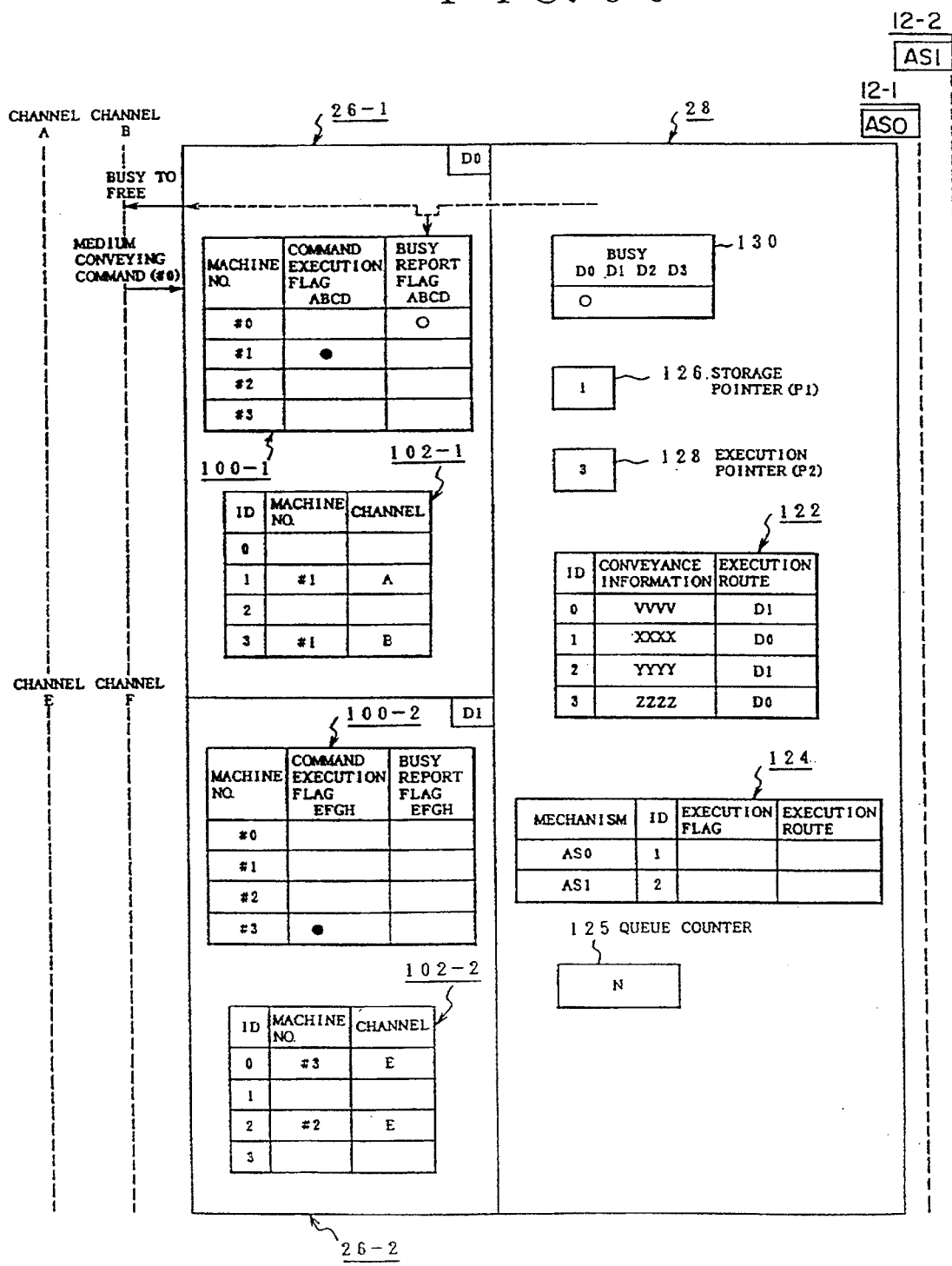

FIG. 59

CONTROL TABLE (8BIT REGISTER TABLE)

| |
|---|
| SEQUENCE STATUS OF TASK MONITOR SECTION |
| COMMAND RECEIPT PORT a/b |
| MOVING SIDE ADDRESS (FROM ADDRESS) |
| MOVING DESTINATION ADDRESS (TO ADDRESS) |
| NEXT SEQUENCE NUMBER |
| VARIOUS KINDS OF CONTROL FLAGS |
| VARIOUS KINDS OF STATE FLAGS |
| OTHERS |

FIG. 60

I/O TABLE

| |
|---|
| MACHINE CONTROLLER I/O PORT a/b |
| OTHERS |

LIBRARY APPARATUS

This is a divisional of application Ser. No. 08/218,117 filed on Mar. 25, 1994, now U.S. Pat. No. 5,813,156.

BACKGROUND OF THE INVENTION

The present invention relates to a library apparatus using a magnetic tape cartridge, an optical disk cartridge, or the like as a memory medium and, more particularly, to a library apparatus which receives a plurality of medium conveyance information and can simultaneously drive two medium conveying apparatuses.

In a recent computer system, in association with an increase in number of media which are used in an MTU apparatus, an optical disk apparatus, and the like as external memory devices, a high efficiency of the operation, easiness of the maintenance, a reliability of the apparatus, or the like is required. For this purpose, a library apparatus which can perform an automatic operation such as storage of the media and the conveyance to the apparatus is provided. When the number of operations of the Jobs or the number of connections of a host computer increases, however, since medium conveyance information increases, it is necessary to efficiently execute them.

FIG. 1 shows an outline of a conventional library apparatus. A library apparatus 400 is used as an information stocker of upper-order host computers 20-1 to 20-4. For example, a director 402-1 has four channels (A to D) and a director 402-2 has four channels (E to H). In this case, the channels (A and B) and the channels (E and F) are used. A cell block 410 as a medium stocker to enclose media such as magnetic tape cartridges or the like is provided in the library apparatus 400. Two accessors 408-1 and 408-2 as medium conveying apparatuses are provided on a rail 414 along the cell block 410. The accessor 408-1 is directly controlled by a machine controller 406-1. The accessor 408-2 is directly controlled by a machine controller 406-2. An accessor controller 404 is provided as an upper-order apparatus for the machine controllers 406-1 and 406-2. Generally, the accessor 408-1 operates and executes the conveyance control and the accessor 408-2 doesn't operate. This is because since two accessors 408-1 and 408-2 operate on one rail 414, they cannot simultaneously operate and they are unitarily managed by one control section so that they individually operate by an exclusive control method. The accessor controller 404 exists as a spare apparatus for alternation when the accessor 408-1 causes a fault or the like and enters an unexecutable state.

FIG. 2 is a diagram showing the operation when a moving command (a medium conveying command) is received in the conventional apparatus. Physical machine number addresses of the directors 402-1 and 402-2 are defined as D0 and D1 and physical machine number addresses of the accessors 408-1 and 408-2 are defined as AS0 and AS1. It is now assumed that the host computer 20-1 generated a moving command from the channel (B) to a logical machine number address (logical input/output device address) #0. A logical machine number address #8 is used in an actual apparatus. When the moving command is received from the channel (B), the director 402-1 instructs the medium conveyance to the accessor controller 404. The accessor controller 404 receives the conveying command from the director 402-1 and refers to an executing state management table 422. In this instance, since an execution flag is not set, it is confirmed that the accessors 408-1 and 408-2 can be used, and a response indicative of the reception of the conveying command is sent to the director 402. The director 402-1 subsequently confirms the reception response from the accessor controller 404 and sets the execution flag at the position of the channel (B) in a machine No. table 418-1 and reports an initial status to the channel B. After that, the director 402-1 receives the medium conveyance information 'XXXX' as a command parameter from the channel (B) and transfers to the accessor controller 404. The medium conveyance information includes a moving side address (From Address) and a moving destination address (To Address). The accessor controller 404 stores the medium conveyance information 'XXXX' which was transferred from the director 402-1 into a conveyance information table 420 and instructs the conveying operation to the accessor 408-1 and, after that, supplies a response signal indicative of the reception to the director 402-1. In this instance, the execution flag is set into a slot of the accessor machine No. AS0 in the executing state management table 422. After confirmation of the reception response from the accessor controller 404, the director 402-1 reports a channel end status to the channel (B).

FIG. 3 is a diagram showing the operation in the case where a moving command of a logical machine No. address #0 was received from the Channel (A) subsequently to FIG. 2. In this instance, since the accessor 408-1 is conveying the medium by the command from the channel (B), when the moving command is generated from the channel (A), a "device busy" is reported. That is, when the moving command of the logical machine No. address #0 is received from the channel (A), the director 402-1 instructs a command reception to the accessor controller 404. The accessor controller 404 refers to the executing state management table 422. In this instance, since the execution flag of the accessor machine No. AS0 has been set, the accessor controller 404 sets a busy flag to the position of the director machine No. address D0 in a busy management table 424 and returns a busy response to the director 402-1. The director 402 confirms the busy response from the accessor controller 404 and sets a busy report flag to the position of the channel (A) in the machine No. table 418-1 and reports a device busy status to the channel (A).

FIG. 4 shows the operation in the case where the moving command of the logical machine No. address #1 was received from the channel (E) subsequently to FIG. 3. In this case as well, since the accessor 408-1 is conveying the medium, a "busy" is finally reported to the channel (E).

FIG. 5 is a diagram showing the operation when the medium conveyance of the accessor 408-1 is finished. After confirmation of the end of the medium conveyance by the accessor 408-1, the accessor controller 404 reports the end to the director 402-1 and clears an execution flag of the executing state management table 422. After the conveyance end report was received from the accessor controller 404, the director 402-1 refers to the machine No. table 418-1 and reports a conveyance end status to the channel (B) to which the moving command was issued and clears the execution flag at the position of the channel (B).

FIG. 6 is a diagram showing the reporting operation of a busy cancellation after completion of the medium conveyance of FIG. 5. After confirming that the execution flag of the executing state management table 422 was turned off, the accessor controller 404 reports the busy cancellation to the director 402-1 and clears a busy flag of the director machine No. address D0 in the busy management table 424. After confirming the busy cancellation report from the accessor controller 404, the director 402-1 reports a busy cancellation status to the channel (A) in which a busy report flag was set.

The director 402-1 further clears the busy report flag in the machine No. table 418-1. After the busy cancellation status from the director 402-1 was received, the channel (A) designates the logical machine No. address #0 and again generates a moving command.

FIG. 7 shows operating sequences in FIGS. 2 to 6 in the conventional apparatus in a lump. A moving command from the channel (B) is received by the director 402-1 and transferred as a medium conveying command 502 to the accessor controller 404. The accessor controller 404 returns a receipt response 504 and reports a zero status 506 to the channel (B). Subsequently, the director 402-1 receives medium conveyance information 508 from the channel (B) and transfers as conveyance information 510 to the accessor controller 404 and gives a conveying command 516 to the accessor 208-1. At the same time, the accessor controller 404 returns a receipt response 512. The director 402-1 reports a channel end status 514. A moving command 518 from the channel (A) is received by the director 402-1 and transferred as a medium conveying command 520 to the accessor controller 404. The accessor controller 404 returns a busy response 522. The director 402-1 reports a device busy status 524 to the channel (A). A moving command 526 from the channel (E) is received by the director 402-2 and transferred as a medium conveying command 528 to the accessor controller 404. The accessor controller 404 returns a busy response 530. The director 402-2 reports a device busy status 532 to the channel (E). It is now assumed that the medium conveyance by the accessor 408-1 had been finished and a conveyance end report 534 was sent to the accessor controller 404. A conveyance end report 536 is sent to the director 402-2. The director 402-2 reports a device end status 538 to the channel (B). The director 402-1 subsequently receives a busy cancellation 540 and reports a busy cancellation status 542 to the channel (A). In response to such a report, a moving command 544 is again generated from the channel (A).

According to the above conventional apparatus, the directors 402-1 and 402-2 have the machine No. tables 418-1 and 418-2 of an amount of only one address and the accessor controller 404 holds only one medium conveyance information. Therefore, the library apparatus can allocate only one logical machine No. address. The apparatus can execute only a successive process such that only after one moving command was completely finished for the moving command from the channel, the next moving command can be executed.

Therefore, in the case where the library apparatus has already been executing one moving command, the next moving command can be executed after the device end status indicative of the end of the command which is at present being executed was reported. Therefore, the conventional library apparatus has the following problems.

First, since the library apparatus cannot designate a plurality of machine numbers, a plurality of moving commands for the different machine numbers from the same channel cannot be executed.

Second, the library apparatus can accept only one of the moving commands generated simultaneously from a plurality of channels.

Third, during the execution of the moving command by a certain director, the library apparatus cannot accept the moving command by another director.

Fourth, in spite of the fact that the library apparatus has a plurality of accessors as a medium conveying mechanism, the number of accessors which execute the conveying operation is always set to one, so that a use efficiency is bad.

On the other hand, in the conventional library apparatus, there is a case where a placement error fault or an interface system fault occurs during the conveyance of the memory medium. FIG. 8 shows a situation of the occurrence of faults in the library apparatus. The medium conveyance information in association with the moving command from the host computer 20 is transferred to the accessor controller 404 through the director 402 of the library apparatus. The accessor controller 404 which received the medium conveyance information generates a command to the accessor 408-1, thereby conveying the medium, for example, from a moving side address (1) in the cell block 410 designated by the medium conveyance information to a recording and reproducing apparatus (MTU) 416 designated by a moving destination address (2). On the other hand, when the medium is left in the MTU 416 because of some causes and, in this state, the accessor 408-1 conveys the medium to the MTU 416 on the basis of the moving command which was newly generated, a placement error fault occurs. Namely, when the operator tries to load the medium conveyed by a robot hand 418 of the accessor 408-1 by pushing the medium into the MTU 416, the medium will collide with another medium which has already been loaded and will not move. Such a state is recognized as a placement error fault occurrence. A fault response is returned to the host computer 20. In the case where such a placement error fault occurs, the accessor controller 404 executes a recovering process according to a flowchart shown in FIG. 9. A conventional idea of the recovering process for such a placement error fault is such that it is first regarded that the accessor itself has an abnormality and an alignment error occurred, so that the operation of the accessor is again executed by setting the alignment error to a fault counter measure position. If the fault is not recovered even by the above operation, the accessor is alternated to the spare accessor and the recovering process is similarly executed. If the fault is not recovered even by executing the above process, it is regarded that there are faults in both of the accessor or the placement error fault cannot be recovered in accordance with the presence or absence of the medium on the moving destination side, thereby finishing the processes as a fault.

The case of FIG. 8 will now be practically explained as an example in step S1 in FIG. 9, the moving side address (1) and moving destination address (2) are respectively designated on the basis of the medium conveyance information by the moving command which has already been received, and a command to convey the medium is generated to the accessor 408-1. When a status response of the occurrence of the placement error fault is obtained in step S2, step S3 follows and a repositioning process by the same accessor 408-1 is executed. Namely, in step S4, a command in which the moving destination address (2) is held unchanged and the robot hand 418 of the accessor 408-1 is set to the moving destination address (2) is generated. When a placement error fault again occurs in step S5 by the repositioning process, it is regarded that there is an alignment error of the accessor 408-1. The processing routine advances to step S6. In step S6, a command to convey the medium which was held by the robot hand 418 of the accessor 408-1 and in which the placement error occurred to a predetermined shunt address (3) in the cell block 410 is generated. In step S7, an alternating process for alternating to the spare accessor 408-2 is subsequently executed. In step S8, a command in which the moving destination address (2) is held unchanged and the shunt cell address (3) was set to the moving side address is generated to the accessor 408-2 which alternated. When a status response of the placement error fault is again obtained by the conveyance by the spare accessor 408-2 which alternated, it is likewise regarded that there is an alignment error of the accessor 408-2, so that step S11 follows. After a command to convey the medium held by the robot hand 418 of the accessor 408-2 to the shunt cell address (3) was generated, a command to convey the medium remaining in the recording and reproducing apparatus 416 as a moving destination address (2) to another shunt cell address (4) is generated in step S12. When no medium exists in the moving destination address (4) in step S13, the processing routine advances to step S14. It is Judged that there are faults in both of the accessors 408-1 and 408-2, so that the processes are finished as a fault. When the medium exists in the moving destination address (2), it is Judged that the placement error fault could not be recovered, so that the processes are finished as a fault.

A flowchart of FIG. 10 shows a conventional recovering process for a fault of the interface system. An idea of the conventional recovering process for the interface system fault is such that in the case where when a fault occurs in an interface bus 600-1 between a host computer 20 and a director 402, the bus 600-1 is switched to an interface bus 600-2 for alternation. In this state, the accessor controller 404 judges whether the medium to be conveyed by the accessor 408-1 exists in the moving side address or the moving destination address. The following processes are executed in accordance with the result of the judgement.

I. When the medium exists in the moving side address, the command is again retried.

II. When the medium exists in the moving destination address, the processes are finished as a normal state.

III. When no medium exists in both of the moving side address and the moving destination address, it is determined that there is a possibility such that the medium was not erroneously picked up, so that the accessor operation to prevent a damage of the medium is inhibited and a fault which needs to call a system engineer is set.

Explanation will now be practically made with reference to FIG. 8 as an example. In step S1, an instruction of the medium conveyance in which the moving side address (1) and the moving destination address (2) were respectively designated on the basis of the medium conveyance information by the moving command which had already been received form the upper-order apparatus is generated from the accessor controller 404 to the accessor 408-1. In step S2, when the occurrence of a fault of the interface bus system is recognized by the notification from the director 402, the processing routine advances to step S3. In step S3, the interface bus 600-1 between the director 402 and the host computer 20 is changed to the interface bus 600-2 as an alternating path and the apparatus waits for establishment of the using state of the alternating path. In step S4, a command to convey the medium existing in the moving destination address to the shunt cell address (3) is generated to the same accessor 408-1. When it is judged in step S5 that the medium exists in the moving side address (1) by the execution of the command by the accessor 408-1, since the medium is not conveyed yet, step S6 follows and the same moving command as that in step S1 is again generated. When the medium doesn't exist in the moving side address (1) in step S5, a check is made in step S7 to see if the medium exists in the moving destination address (2) or not. When the medium exists in the moving destination address (2), it is judged that the medium has already been conveyed, so that the processes are finished as a normal state in step S8. When no medium exists in the moving destination address (2), it is judged that the medium was dropped on the way to the moving destination address (2), so that the operation of the accessor 408-1 is inhibited in step S9 and the processes are finished as a system engineer call fault.

However, the conventional recovering methods for the placement error fault and interface system fault as mentioned above have the following problems. First, in the conventional recovering method of the placement error fault shown in FIG. 9, the placement error fault is regarded as an alignment error which is caused by an abnormality of the accessor and the recovering process is executed. Therefore, there is a problem such that it takes a very long time of five to six minutes until the placement error fault is recognized. In addition, a self error due to the collision of the mediums occurs three times until a fault is finally judged as a placement error fault. That is, although the self error which occurs when the media first collide occurs due to the placement error fault, in case of the remaining self errors of two times, the medium collision occurs because of the recovering process of the placement error fault. Therefore, there is a problem such that the medium is damaged or the like by a shock which is applied by the collision of the media. Further, in the conventional recovering process of the interface system fault, in the case where the interface system fault overlaps the placement error fault, since the medium has already been conveyed to the shunt cell, no medium exists in both of the moving side address and the moving destination address. There is, consequently, a problem such that it is judged that the medium was dropped on the way to the moving destination address, so that the accessor operation is inhibited and the library apparatus is stopped as a CE call fault.

SUMMARY OF THE INVENTION

According to the invention, there is provided a library apparatus in which when moving commands of different machine numbers are sequentially generated from the same channel or when a plurality of moving commands are simultaneously generated from different channels, those plurality of moving commands can be received and the operations of a plurality of conveying mechanisms can be simultaneously executed in parallel, thereby improving the processing performance.

A library apparatus of the invention comprises: a memory reproducing apparatus for performing the reading and writing operations for a portable memory medium such as a magnetic tape cartridge or the like; and inlet/outlet apparatus for inserting and ejecting the memory medium; a cell block as a medium stocker to enclose a plurality of memory media; and an accessor for conveying the memory medium between the cell block and the memory reproducing apparatus or between the cell block and the inlet/outlet apparatus. The library apparatus further comprises: a director as a first control section which receives a command from an upper-order unit and returns a status response; and an accessor controller as a second control section for generating a conveying command to either one of two accessors and controlling on the basis of the command which was transmitted from the upper-order unit through the director.

With respect to such a library apparatus, according to the invention, a machine No. control table, a first activation processing section, and a first idle processing section are provided for the director. The machine No. control table registers the correspondence relation between the logical machine No. address (#n) indicated by a moving command from the upper-order unit and a channel system which generated the command. The first activation processing section receives the moving command from the upper-order unit and registers the machine No. control table. The command reception is notified to the accessor controller as a second control section and a response to decide the permission or inhibition of the reception of the next moving command is returned. When a notification of the completion of the execution of the medium conveyance is received from the accessor controller, the first idle processing section clears the machine No. control table and sends an end response to the upper-order unit.

A queueing table, an executing state management table, a queue counter, a second activation processing section, and a second idle processing section are provided for the accessor controller. The queueing table stores a plurality of medium conveyance information (moving side address and a moving destination address) which were generated as command parameters from the upper-order unit subsequently to the moving command. The executing state management table manages a flap indicative of an operating state of the accessor. A count value of the queue counter is increased by one when the medium conveyance information is stored into the queueing table. The count value of the queue counter is decreased by one each time the execution of the command is finished on the accessor side. Each time the receipt notification of the moving command is received, the second activation processing section judges the presence or absence of a vacancy in the queueing table from the count value (N) of the queue counter. When there is a vacancy, a response indicating that the command can be stored is returned and the medium conveyance information transferred from the upper-order unit is stored into the queueing table. If there is no vacancy, a busy response is returned. The second idle processing section refers to the executing state management table in a state in which at least one medium conveyance information has been stored in the queueing table, generates a command to the accessor in the vacant state, and executes the command. When any one of a plurality of accessors is executing the command based on the medium conveyance information, the second idle processing section provided for the accessor controller extracts the medium conveyance information which is not overlapped to the moving range during the execution from the queueing table, thereby allowing the command to be executed by another accessor.

Now, assuming that the number of slots (storage number) of the machine No. control table is set to (n), (n) logical machine No. addresses (#0 to #n−1) are allocated to the director as addresses which can be received from the same channel system. The number (n) of slots of the machine No. control table can be obviously properly decided as necessary. When assuming that the number of command channel systems from the upper-order unit to the director is set to (m), it is desirable that the number (n×m) in which the number (n) of logical machine No. addresses is multiplied by the number (m) of channel systems is obtained for every director and the slots of the number corresponding to the sum of them are provided for the queueing table of the accessor controller. By providing the slots of such a number, a busy state doesn't occur in the queueing table. Specifically speaking, when it is assumed that the number (n) of slots of the machine No. control table is set to 4, four logical machine No. addresses (#0 to #3) are allocated to the directors as addresses which can be received from the same channel system. In this case, now assuming that the number (m) of channels is set to 4, the number of slots of the queueing table at which no busy state occurs is equal to 16. For example, in the case two directors are provided for the accessor controller, the number of slots of the queueing table at which no busy state occurs is set to 32 slots corresponding to the total of the directors by multiplying the number of channels of the director by the number of logical machine No. addresses.

The queueing table has a table structure which uses the ID number indicative of the storing position as an index and registers the moving command and the physical machine No. addresses D0 and D1 of the directors indicative of the command receiving system. The executing state management table has a table structure such that the physical machine No. addresses AS0 and AS1 of two accessors are used as indexes and the ID number of the queueing table, the execution flag indicating whether each accessor is operating or not, and the physical machine No. addresses D0 and D1 of the director indicative of the command receiving system are registered. Further, there are provided: a storage pointer which is counted up by one each time the moving command is stored into the queueing table and which subsequently indicates the ID number of the table position; and an execution pointer indicative of the ID number of the table to execute the medium conveyance information stored in the queueing table by any one of the accessors.

When the command receipt notification is received from the director, the second activation processing section of the accessor controller refers to the queue counter and generates a response indicating that the moving command can be received when it is judged that there is a vacancy in the queueing table. When there is no vacancy, the second activation processing section generates a busy response. In the case where the accessor in which the execution flag has been turned off and there is a vacancy was retrieved from the executing state management table, the second idle processing section of the accessor controller extracts the medium conveyance information of the ID number of the queueing table which was designated by the execution pointer and which is in a waiting state of the next execution, and instructs the execution of the command to the accessor in the vacant state. A busy management table to register a busy flag indicative of the physical machine NO. address Di of the director which returned the busy response and received the moving command is provided for the accessor controller. At the time of the busy response at which there is no vacancy in the queueing table, the second control section registers the busy flag to the position corresponding to the physical machine NO. address Di of the director which returned the busy response in the busy management table.

An ID management table is further provided for the director. When the storage end notification of the medium conveyance information to the queueing table is received from the accessor controller, the first activation processing section uses the ID number indicative of the table storing position as an index and registers the logical machine No. address #i and the channel system into the ID management table. When the medium conveyance end notification is received from the accessor controller, the first idle processing section recognizes the logical machine No. address #i in which the medium conveyance was finished and the channel system from the ID number management table and clears the registration of the machine No. control table. The first activation processing section further registers a busy report flag indicating that the busy report was performed for the moving command of the logical machine No. address #i into the machine No. control table for every channel system in this case, when the busy cancellation report based on the end of the medium conveyance is received from the accessor controller, the first idle processing section retrieves the machine No. control table and sends a busy cancellation response to the channel system in which the busy report flag was set and also clears the busy report flag.

According to the library apparatus of the invention as mentioned above, by providing the machine No. control table for the director as a first control section, a plurality of logical machine No. addresses (logical IOD addresses) depending on the number of slots of the machine No. control table which was arbitrarily set can be provided for the channel. By providing the queueing table for the accessor controller as a second control unit, a conveyance instruction can be performed in a manner such that a plurality of medium conveyance information generated from the channels is temporarily stored and a plurality of medium conveying mechanisms operate in parallel.

According to the invention, a library apparatus which receives the commands from the upper-order unit via a plurality of paths and can efficiently process them is provided. For this purpose, there is provided a command queue for storing and holding in a limp the medium conveyance information (From Address and To Address) which was generated from a plurality of upper-order units as command parameters in association with the moving commands. The medium conveyance information held in the command queue is extracted by the command allocating section and allocated to either one of a plurality of accessors, thereby allowing the medium conveying operation to be executed. In the command allocation, among the plurality of medium conveyance information stored in the command queue, the medium conveyance information is sequentially extracted in accordance with the order from the oldest one with respect to the time and is executed by the accessor in the waiting state. In the case where a plurality of medium conveyance information which can be executed by the accessor in the waiting state exist, the medium conveyance information having the position address that is nearest to the present position of the accessor is extracted and executed. The command allocating section sets the specific accessor as a main accessor and allocates the oldest command with respect to the time among the plurality of commands stored in the command queue as a reference command, thereby allowing the oldest command to be executed. In the case where there is no medium conveyance information which can be executed by another accessor in the waiting state during the operation of the main accessor, the reference command is changed and the medium conveyance information which can be simultaneously executed by the accessor in the waiting state is retrieved. When the overtime information such that the storage time of the command queue exceeds a predetermined time exists, such overtime information is preferentially allocated to the accessor and is executed. Further, with respect to a plurality of medium conveyance information stored in the command queue, all of the combinations of the execution orders are produced, thereby executing simulations of the medium conveyance by a plurality of accessors. The execution order of the command queue is exchanged to the order at which the medium conveyance can be most efficiently executed.

According to such a library apparatus of the invention, the commands from a plurality of host computers can be received via a plurality of paths. A processing efficiency of the library apparatus when it is seen from the host computer is raised. A plurality of host computer can effectively use one library apparatus. Since at least two accessors simultaneously operate and execute a plurality of medium conveyance information stored in the command queue, a loading request of the medium and a medium return request for the recording and reproducing apparatus can be promptly processed. The simultaneous operations by the plurality of accessors are executed by a command allocation which was optimized so as to minimize the processing time. Moreover, the parallel operations of the accessors can be executed without almost changing the conventional apparatus by using the spare apparatus which has conventionally been provided. Further, by simulating all of the combinations of the orders of the commands held in the command queue and by exchanging the optimum combination, the order is generated in accordance with the most efficient procedure and the medium conveying operation can be performed.

Further, according to the invention, a library apparatus which can simultaneously operate two accessors by using the accessor operation program for one accessor is provided. For this purpose, a conveying operation executing section, a real table, two virtual tables, and a table switching section are provided for the accessor controller. The conveying operation executing section operates by a single command system from the upper-order unit via the director. The real table stores the medium conveyance information (From Address and To Address) which is used in the conveying operation executing section. The virtual tables are provided in correspondence to the two accessors and selectively store the medium conveyance information sent by the command from the upper-order unit. The table switching section selects either one of the two virtual tables in operation of the conveying operation executing section and copies into the real table, thereby allowing the selected virtual table to be used. After completion of the operation of the conveying operation executing section, the contents in the real table are copied into the original virtual table.

Further, a real input/output table, two virtual input/output tables, and an input/output port switching section are provided for the conveying operation executing section. The real input/output table stores the switching information to switch and connect either one of the input/output ports for two accessors. The virtual input/output tables are provided in correspondence to the two accessors and selectively stores the switching information of the input/output ports. The input/output port switching section selects either one of the two virtual input/output tables at the time of operation of the conveying operation executing section and copies into the real input/output table and switches and connects one of the input/output ports for the two accessors in accordance with the switching information in the real input/output table. The input/output port switching section copies the contents in the real input/output tables into the original virtual input/output table after completion of the operation of the conveying operation executing section.

Further, a simulating section for falsely return a response for the operating command from the accessor is provided for control units (machine controllers) on the side of the two accessors. For the operating command from the accessor controller, the simulating section generates a command normal end or a command abnormal end like random numbers during the execution of the command and responds.

The conveying operation executing section of the accessor controller has a plurality of command sequences to indicate a predetermined operation to the accessor side. The number/numbers of one or a plurality of command sequences to be successively executed in accordance with the command from the upper-order unit is/are stored into the real table each time the preceding command sequence if finished. Upon execution of the conveying operation executing section, the sequence number in the real table is analyzed and the corresponding command sequence is executed. As command sequences which are provided for the Conveying operation executing section, an initialization sequence, a command generation sequence, a state monitor sequence, a retry sequence, a normal end sequence, an abnormal end sequence, and the like are provided. For example, the conveying operation executing section stores the number of state monitor sequence which is executed subsequently to the real table after completion of the execution of the command generation sequence.

According to the library apparatus of the invention, the virtual tables which are used to execute the command are provided in correspondence to the two accessors, the virtual tables are switched, and the contents of the selected virtual table is copied into the real table used by the operation program for one accessor. Due to this, the conventional operation program which can be executed by only one command system is used as it is and, for example, the input/output command is alternately issued to the two accessors, so that the simultaneous operation can be realized. This point is also similar to the case of the switching of the I/O ports to the accessor side on which only one accessor can be selected. That is, the virtual I/O port to designate either one of the I/O ports is provided in correspondence to the two accessors. By copying one of the virtual I/O ports into the real I/O table, either one of the two I/O ports is switched and connected, the input/output command is, for example, issued to the two accessors and they can be simultaneously operated. Therefore, a busy ratio is reduced by the simultaneous operation of the accessors and the performance of the library apparatus can be remarkable improved. By merely switching the virtual tables and the virtual I/O tables without modifying the conventional operation program, one operation program is regarded as two operation programs and the two accessors can be simultaneously operated. The software resources accumulated in the conventional library apparatus can be effectively used. On the other hand, the simulating means for falsely executing the conveying operation for the operating command from the accessor controller is provided for the machine controller of the accessor, so that the function of the operation program of the accessor controller can be confirmed in a short time.

Further, according to the invention, a library apparatus which can reduce the recovering process of the placement error fault and can avoid the collision of the media during the recovering process is provided. In the invention, therefore, a command executing section, a placement error fault processing section, and an interface fault processing section are provided for the conveyance control section of the library apparatus. The command executing section takes out the medium by the accessor from the moving side address designated by the medium conveyance information of the moving command and carries and stores the medium into the moving destination address. In the case where a placement error fault such that the conveyed medium cannot be stored because another medium has already been stored in the moving destination address occurs, the placement error fault processing section stores the medium held by the accessor to the first shunt cell. Another medium stored in the moving destination address is taken out by the same accessor and stored to the second shunt cell. Further, placement error medium information indicating that the medium has been stored in each of the first and second shunt cells is stored and the processes are finished as a fault. After the media in the moving side address and moving destination address were shunted, if the medium to be shunted to the moving destination address doesn't exist, a repositioning process such that the medium in the first shunt cell is conveyed to the moving destination address by using the same accessor is executed. In the case where a placement error fault occurs by the repositioning process, it is determined that the fault of the accessor itself occurred, so that it is alternated to the spare accessor, thereby conveying the medium in the first shunt cell to the moving destination address. In this instance, when a placement error fault again occurs in the alternated spare accessor, the repositioning process to convey the medium in the first shunt cell to the moving destination address by using the spare accessor is executed. When the placement error fault further occurs by the repositioning process by the spare accessor, it is determined that there are faults in both of the accessors, so that the processes are finished.

Since the recovering process by the alternation of the accessor is started by the alignment error after the medium was shunted, the processing time which is required to recover the placement error fault can be reduced as compared with the case where the medium is shunt through the alternating process of the accessor in the conventional apparatus. After the medium from the moving destination address was shunted, when the medium exists in the moving destination address, the processes are finished as a placement error fault and the number of collisions of the media so far can be reduced to the first one time.

According to the invention, a library apparatus in which the inhibition of the operation of the accessor which becomes a CE call fault in the case where, for example, the interface system fault and the placement error fault overlap is avoided and the fault can be recovered is provided. For this purpose, in addition to the command executing section and the placement error fault processing section, the interface fault processing section is further provided for the conveyance control section of the library apparatus. When a fault of the interface system between the interface fault processing section and the upper-order unit occurs, the interface fault processing section discriminates the presence or absence of the media in the moving side address and the moving destination address by using the alternating path. When no medium exists in both of the moving side address and the moving destination address, this means that such an interface system fault is overlapped to the placement error fault. Therefore, the placement error medium information is checked. When there is a medium in the shunt destination address as a result of the examination of the placement error medium information, the first shunt cell is set to the moving side address and the medium is conveyed. Therefore, even if the interface system fault and the placement fault overlap, a system down in association with the inhibition of the accessor operation doesn't occur, the conveyance of the medium can be retried, and the invention largely contributes to the improvement of the reliability of the apparatus and the realization of a high processing speed.

The above and other objects, features, and advantages of the present invention will become more apparent from the following detailed description with reference to the drawings.

BRIEF DESCRIPTION OF THE DRAWINGS

FIG. 18 is an explanatory diagram of cell addresses allocated to the library apparatus;

FIG. 22 is an explanatory diagram showing the allocation of logical machine number addresses to the director;

FIG. 23 is an explanatory diagram of the allocation of the director machine numbers;

FIG. 24 is an explanatory diagram of the allocation of the accessor machine numbers;

FIG. 25 is an explanatory diagram of a director response status;

FIG. 36 is an explanatory diagram of the operation showing the reporting operation of busy cancellation;

FIG. 59 is an explanatory diagram of a control table used in FIG. 58;

FIG. 60 is an explanatory diagram of an I/O table which is used in FIG. 58;

DETAILED DESCRIPTION OF THE PREFERRED EMBODIMENTS

[System construction and mechanism]

Figure 11:
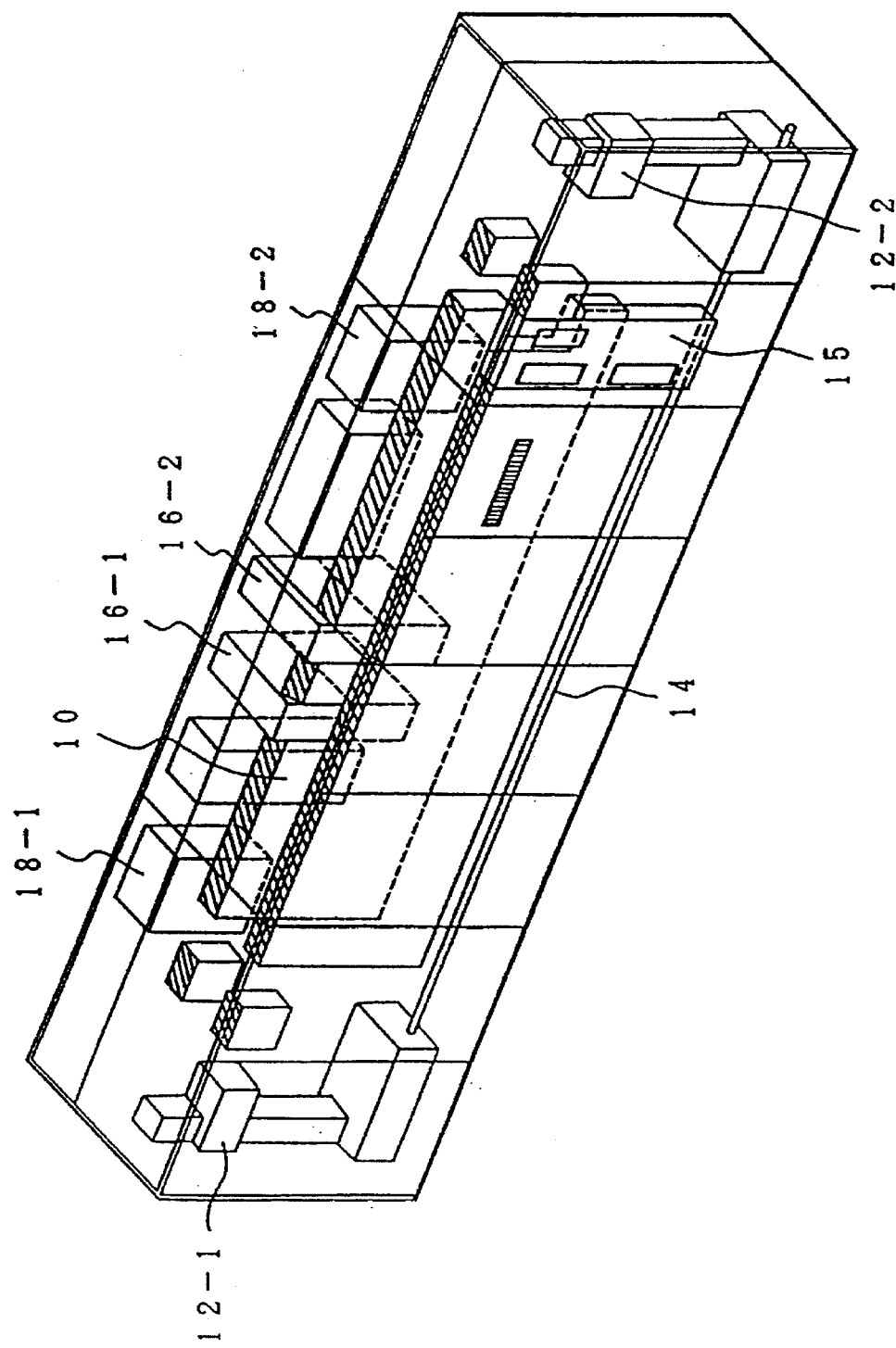
FIG. 11 is an explanatory diagram showing an embodiment of a construction of an apparatus of the invention.

FIG. 11 is a perspective view showing a whole construction of a library apparatus of the present invention. The library apparatus is divided into a plurality of frames. By combining those frames, the apparatus can be constructed. A cell block 10 as a medium stocker is provided in the library apparatus. A number of medium cartridges in each of which, for example, magnetic tapes are stored are enclosed in the cell block 10. A cartridge enclosing position in the cell block 10 is defined as a cell address. Accessors 12-1 and 12-2 as robot apparatuses which move on a rail 14 put in the lateral direction in the frame are provided for the library apparatus. Deck units 16-1 and 16-2 and control units 18-1 and 18-2 are attached to the cell block 10 on the side opposite to the sandwiched rail 14. The deck units 16-1 and 16-2 are provided for a plurality of recording and reproducing apparatuses. A cartridge conveyed from the cell block 10 is loaded by the accessors 12-1 and 12-2, thereby reading and writing data. Further, a medium inlet/outlet 15 is provided in the front surface of a frame of the library apparatus, thereby inserting or ejecting the cartridge.

Figure 12:
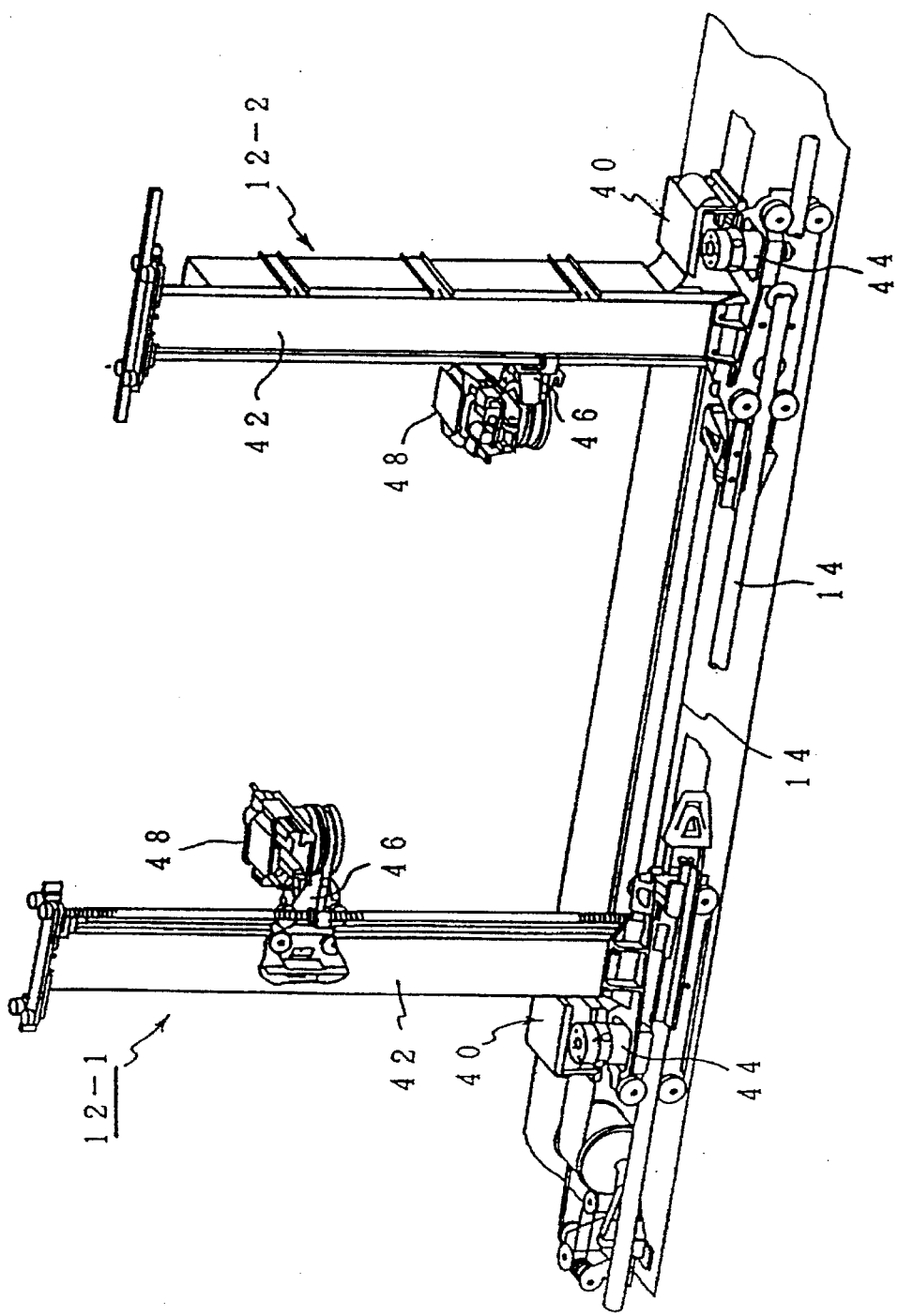
FIG. 12 is an explanatory diagram showing an accessor in FIG. 11.

FIG. 12 shows the accessors in FIG. 11. The accessors 12-1 and 12-2 run on the two rails 14 by a motor 44 arranged in a running section 40. A pillar is vertically attached on the running section 40. A robot hand 48 is attached to a lifting section 46 which can move vertically along the pillar 42.

Figure 13:
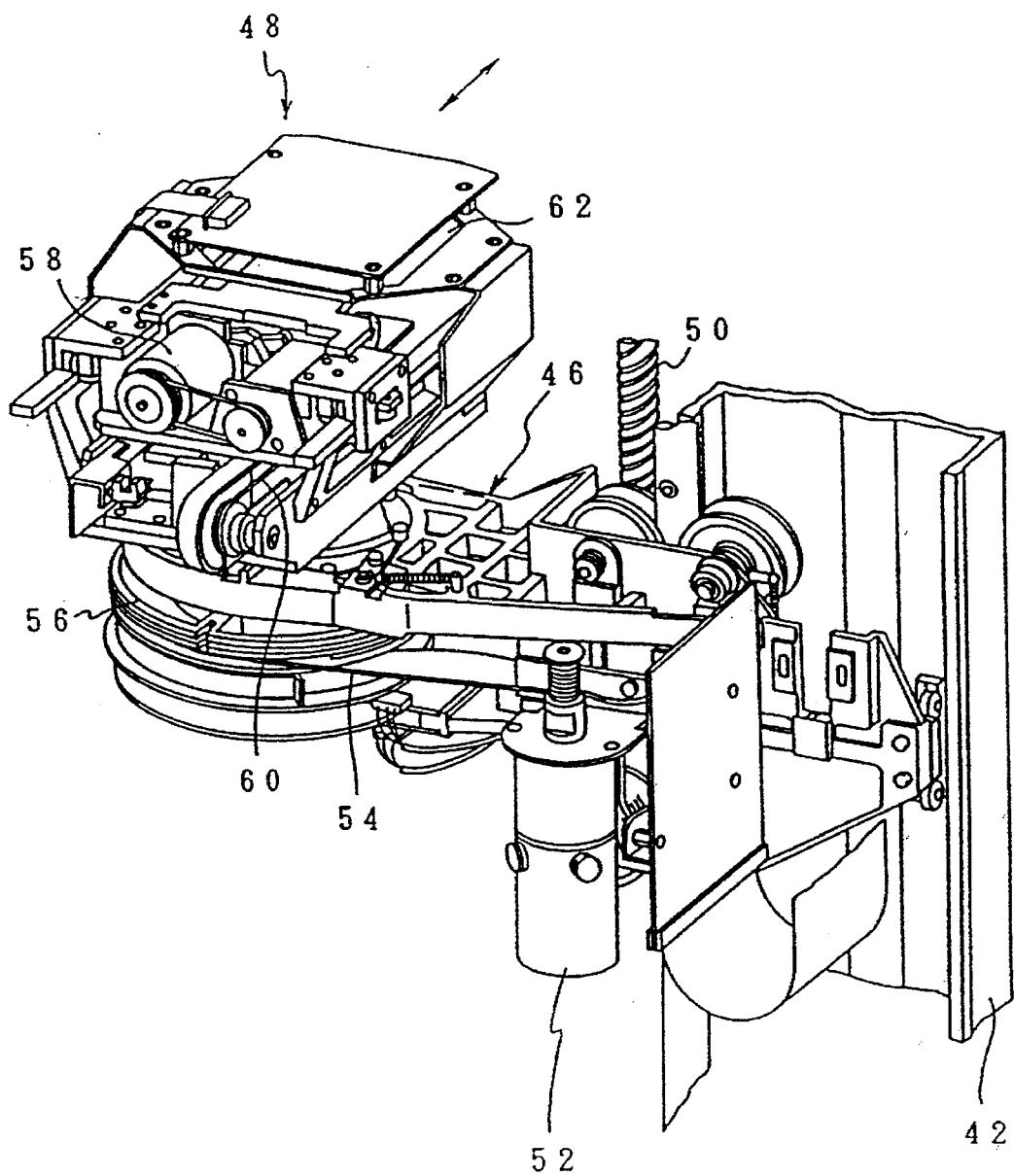
FIG. 13 is an explanatory diagram showing the details of a robot hand in FIG. 12.
Figure 14:
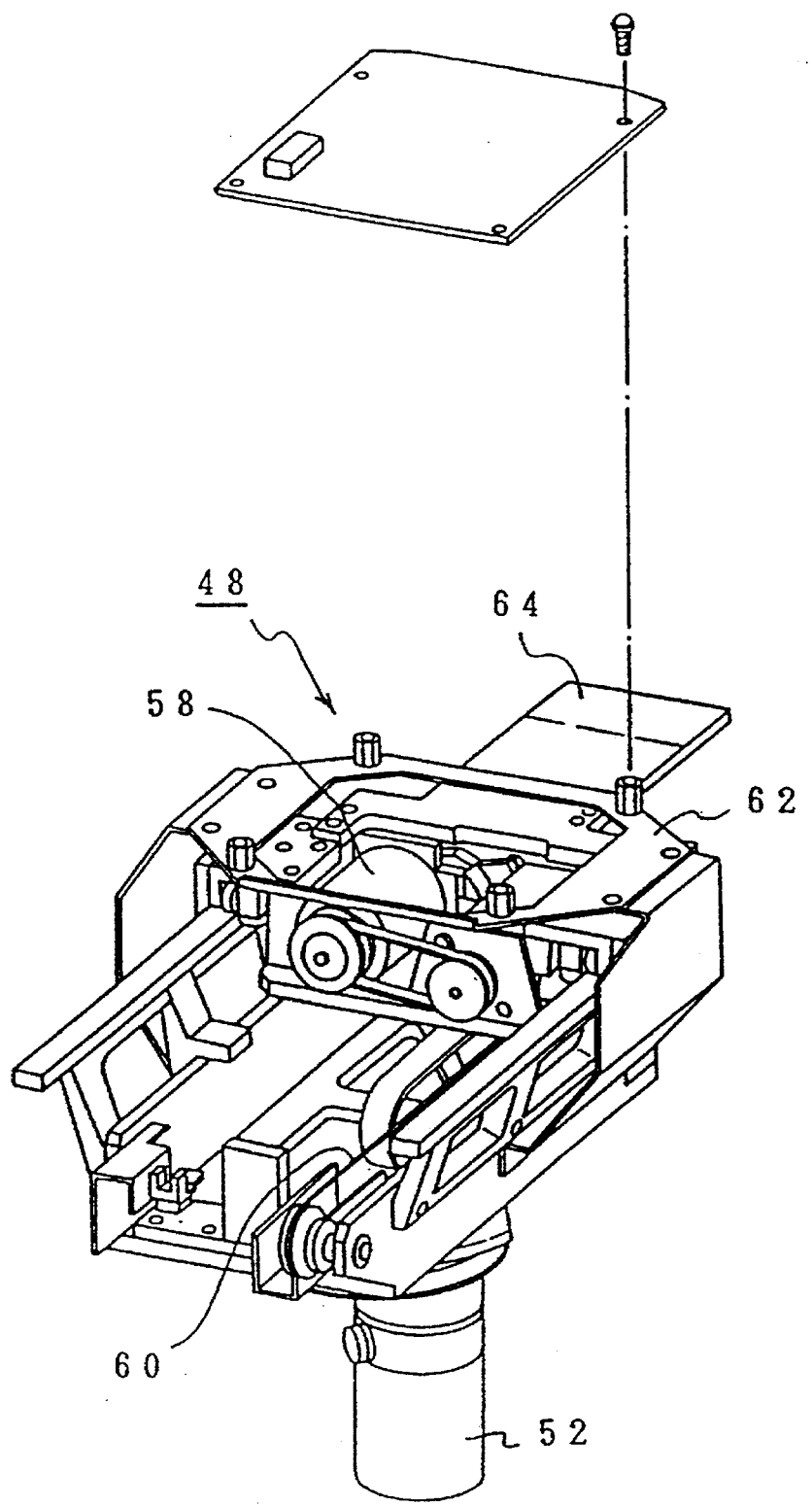
FIG. 14 is an explanatory diagram showing the details of the robot hand by removing an upper cover in FIG. 13.

FIG. 13 and FIG. 14 show the details of the robot hand 48. The robot hand 48 is mounted on the lifting section 46 and an elevating operation for the pillar 42 of the lifting section 46 is executed by the rotation of a screw shaft 50. A swing pulley 56 is provided for the lifting section 46. The swing pulley 56 transmits the rotation of a swing motor 52 by a wire belt 54, thereby rotating the robot hand 48 in the horizontal direction. A medium holding section 62 having a fixed plate 64 which can be seen in a state in which an upper cover in FIG. 14 was removed is arranged for the swing portion of the robot hand 48. The medium holding section 62 can be moved in the horizontal direction from a position shown in FIG. 13 to a forward position shown in FIG. 14 by the driving of the wire belt 60 by a sliding motor 58. In the state in which the medium holding section 62 was sent in the horizontal direction as mentioned above, a cartridge enclosed in the cell block or the like can be sandwiched between the fixed plate 64 and a movable plate (not shown) on the lower side.

[Hardware and functions of the library apparatus]

Figure 15:
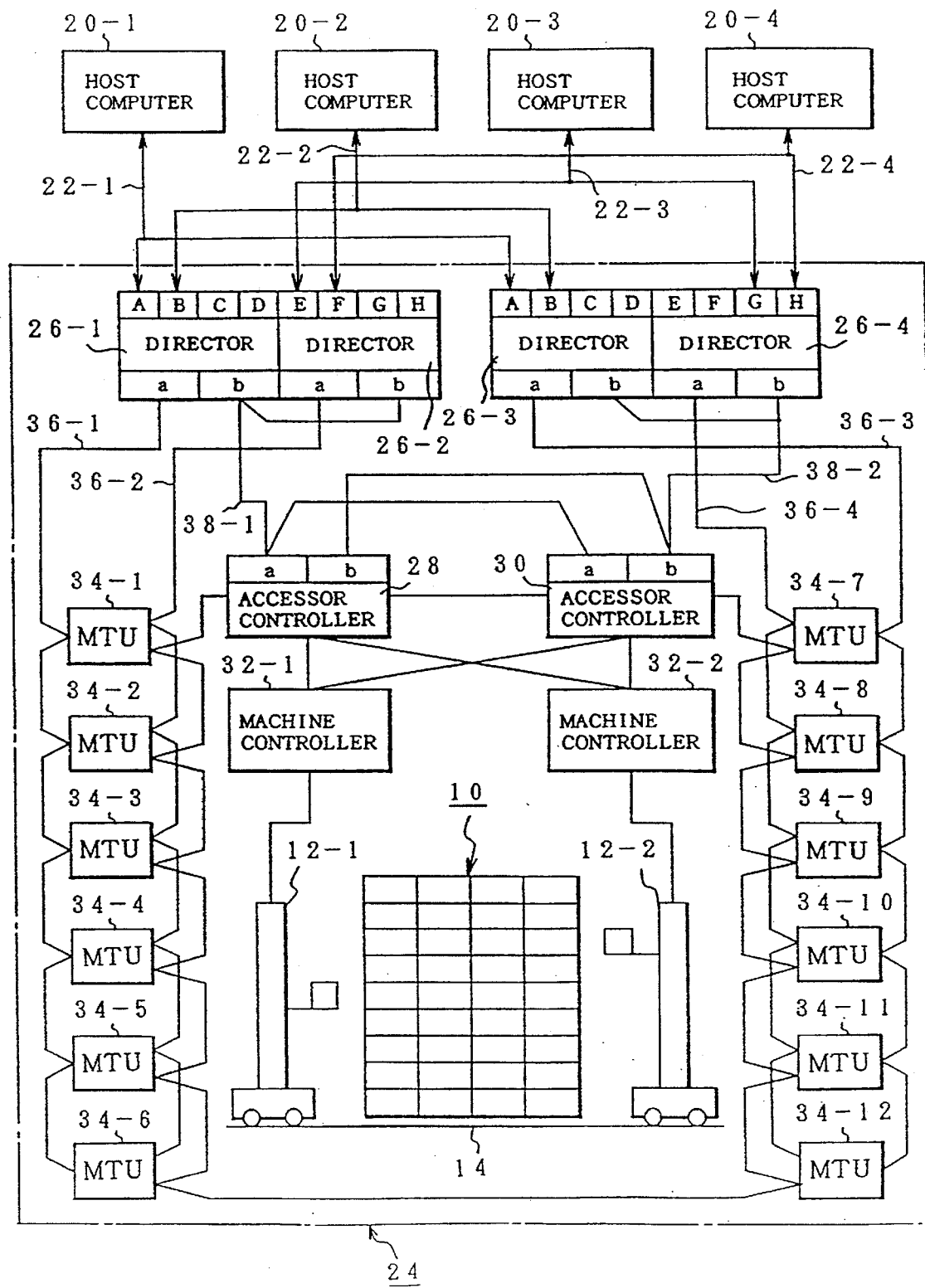
FIG. 15 is a block diagram showing the first embodiment of the invention.

In FIG. 15, the four host computers 20-1 to 20-4 are arranged as upper-order units for a library apparatus 24 in the embodiment. The host computers 20-1 to 20-4 are connected to the library apparatus 24 by channel interface buses 22-1 to 22-4, respectively. As channel interface buses 22-1 to 22-4, for example, block multiplexer channel interfaces or SCSI are used. Four directors 26-1 to 26-4, for example, are provided as a first control section for the library apparatus 24. Each of the directors 26-1 and 26-3 has channels (A, B, C, D) and each of the directors 26-2 and 26-4 has channels (E, F, G, H). Number of channels of each of the directors 26-1 to 26-4 can be set to up to six channels. The channel interface bus 22-1 from the host computer 20-1 is connected to the channels (A) of the directors 26-1 and 26-3. The channel interface bus 22-2 from the host computer 20-2 is connected to the channel (B). On the other hand, the channel interface bus 22-3 from the host computer 20-3 is connected to the channels (E) of the directors 26-2 and 26-4. The channel interface bus 22-4 from the host computer 20-4 is connected to the channel (F). The channels (C) and (D) of the directors 26-1 and 26-3 and the channels (G) and (H) of the directors 26-2 and 26-4 are not used in the embodiment.

Two channels (a) and (b) are provided on the terminal side of the directors 26-1 to 26-4, respectively. The channel (a) is used for a recording and reproducing apparatus and the channel (b) is used to control the accessor. The directors 26-1 and 26-2 commonly use six recording and reproducing apparatuses 34-1 to 34-6 which are arranged on the left side. Device buses 36-1 and 36-2 are connected from the channels (a) to the directors and 26-2. Therefore, the directors 26-1 and 26-2 can write or read for the recording and reproducing apparatuses 34-1 to 34-6 on the left side through the channels (a). On the other hand, the directors 26-3 and 26-4 commonly use six recording and reproducing apparatuses 34-7 to 34-12 which are likewise arranged on the right side. Device buses 36-3 and 36-4 are connected from the channels (a) to the devices 26-3 and 26-4. Consequently, the directors 26-3 and 36-4 can write or read for the recording and reproducing apparatuses 34-7 to 34-12 on the right side. Up to 16 recording and reproducing apparatuses can be installed on one side.

A device interface bus 38-1 pulled out from the channels (b) of the directors 26-1 and 26-2 is connected to a channel (a) of the accessor controller 28 as a second control section. A device interface bus 38-2 pulled out from the channels (b) of the directors 26-3 and 26-4 is connected to a channel (b) of the accessor controller 28 as a second control section. An accessor controller 30 is a spare apparatus, the device interface bus 38-1 from the channels (b) of the directors 26-1 and 26-2 is connected to a channel (a), and the device interface bus 38-2, from the channels (b) of the directors 26-3 and 26-4 is connected to a channel (b). The accessor controllers and 30 receive a command from either one of the directors 26-1 to 26-4 and execute the corresponding process. A machine controller 32-1 to control the accessor 12-1 and a machine controller 32-2 to control the accessor 12-2 are provided under the control of the accessor controller 28. The machine controllers 32-1 and 32-2 are also connected to the accessor controller 30 as a spare apparatus. In the ordinary state, the machine controllers 32-1 and 32-2 receive the instruction from the accessor controller 28 and execute the medium conveying operation by the accessors 12-1 and 12-2. In the following embodiments, for easy understanding, explanation will now be made with respect to the two directors 26-1 and 26-2, accessor controller 28, machine controllers 32-1 and 32-2, and accessors 12-1 and 12-2 which are provided on the left side in the library apparatus 24.

Each of the host computer 20-1 to 20-4 designates a logical machine number address (hereinafter, simply refereed to as a 'machine number address') #i on the basis of the generation of an input/output request for the library apparatus 24 in association with the execution of a job and generates a moving command which functions as an input/output activating command from its own allocated channel to the directors 26-1 and 26-2. When a normal reception response is obtained from the director side for the moving command, the host computer subsequently transmits a data byte (command parameter) as medium conveyance information. The data byte is transmitted to the machine controller 32-1 or 32-2 from the accessor controller 28 and the conveyance control of the cartridges is executed by the accessors 12-1 and 12-2. In this instance, as for the machine number addresses #i which are allocated to the directors 26-1 and 26-2, up to four addresses of #0 to #3 are set in this embodiment. The logical addresses which are actually used are decided by the number of slots of a machine number control table 100. In the embodiment, since every four slots are used, the machine number addresses which are used by the command generation to the director 26-1 are set to four addresses of #0 to #3 and the machine number addresses which are generated to the director 26-2 are also set to four addresses of #0 to #3.

[Command generating function of the host computer]

Figure 16:
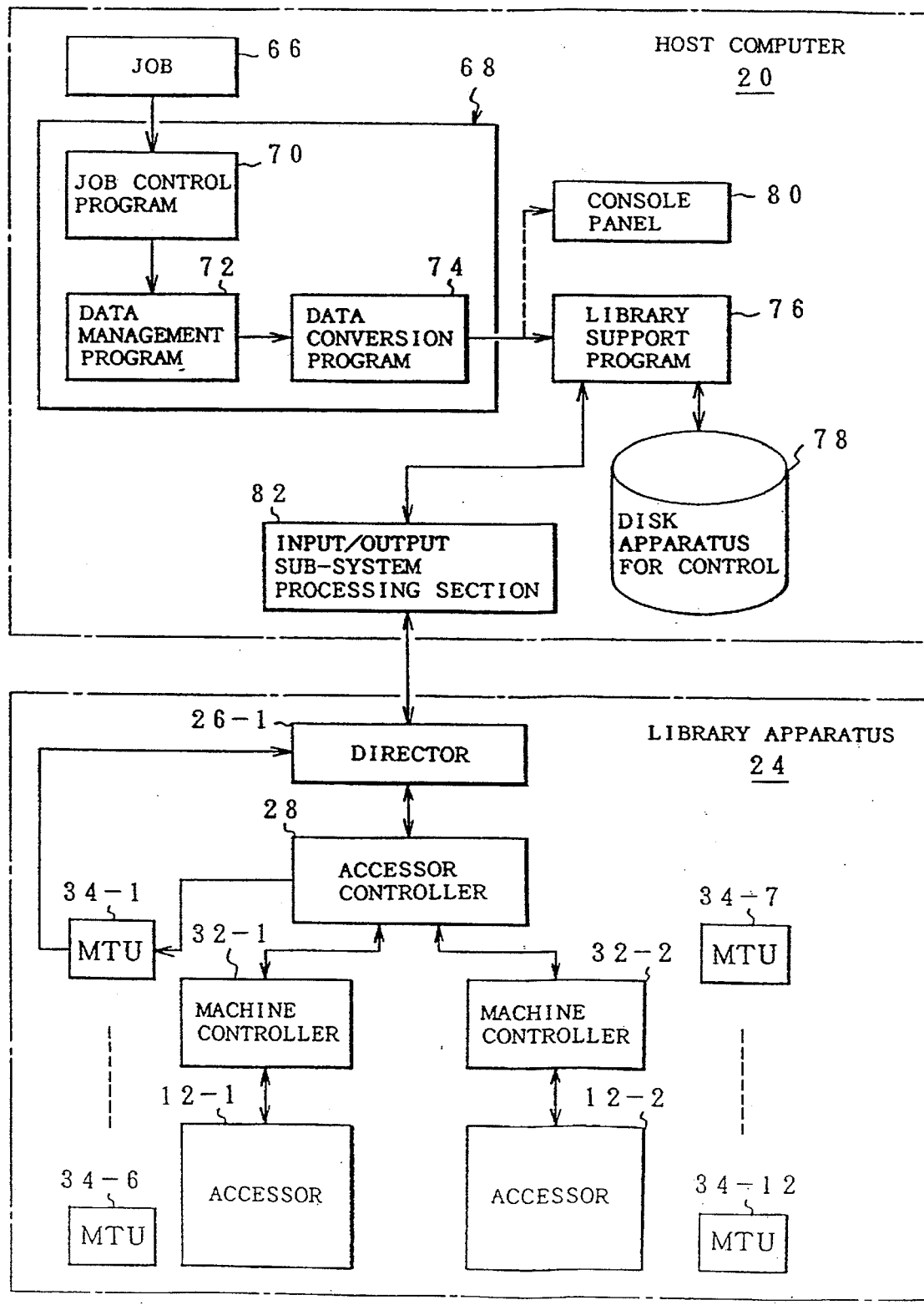
FIG. 16 is a block diagram showing the functions of a host computer in the invention.

FIG. 16 shows a processing function of input/output command for the library apparatus on the host computer side in FIG. 15. When an arbitrary job 66 is executed in the host computer 20, a job control program 70 of an operating system (referred to as 'OS', hereinafter) 68 is activated by the job 66. In this state, when an input/output request to the library apparatus 24 is generated, a reading command or a writing command is produced by a data management program 72, thereby accessing to a library support program 76 through a data conversion program 74. Since the library apparatus 24 is constructed on the assumption that it is operated by the operator as a prerequisite, the data conversion program 74 has inherently been converted into a data format to display data on a CRT provided for a console panel 80. The library support program 76 can receive the converted data as it is. A request command from the OS 68 to the library support program 76 designates at least the following parameters.

I. kind of command of reading or writing

II. medium number such as volume number or the like

III. sector address

IV. data length

Figure 17:
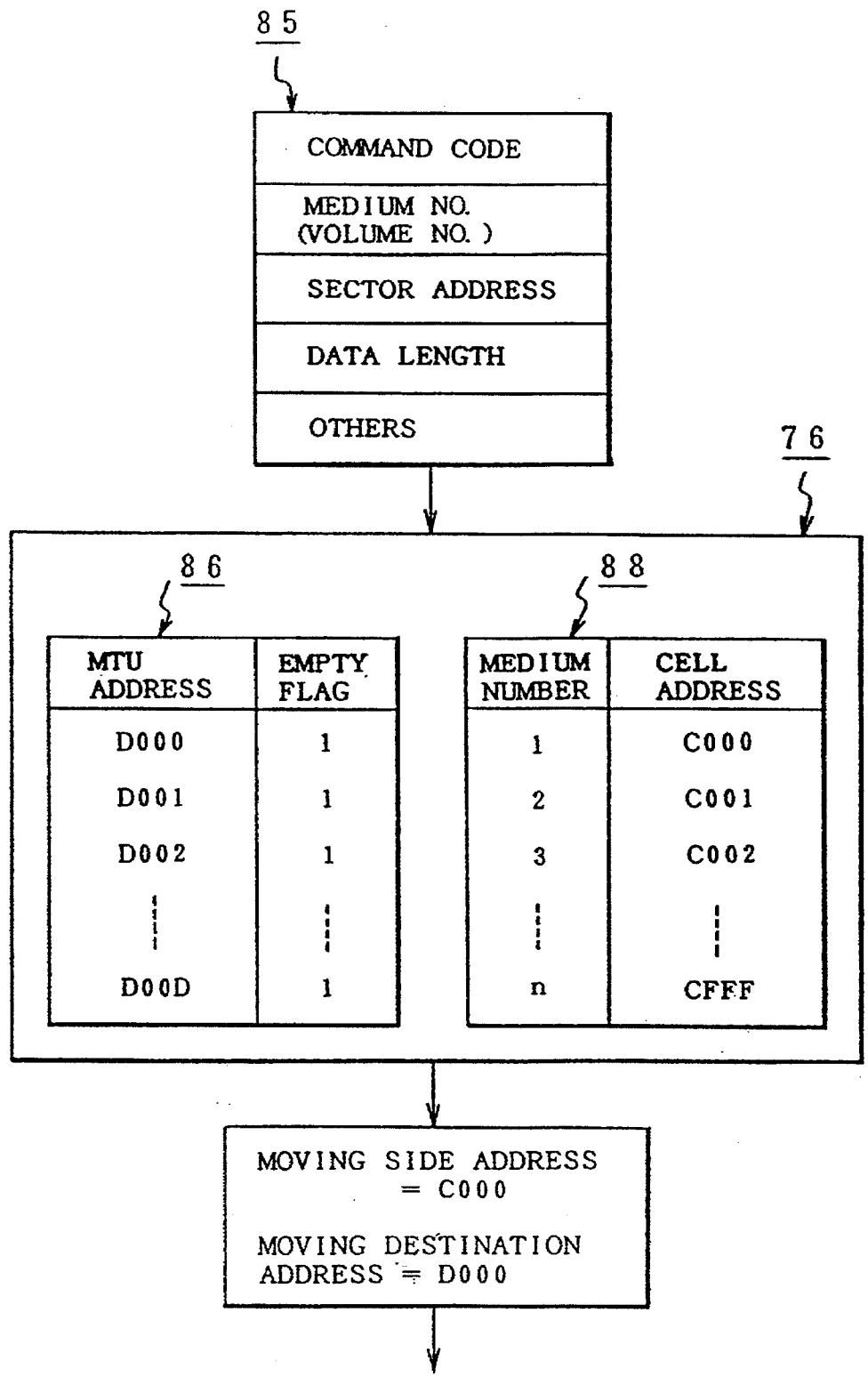
FIG. 17 is an explanatory diagram showing the generating operation of a moving command by a library support program.

The library support program 76 read out a conversion table from a disk apparatus 78 for control and generates a moving command as an input/output start command and medium conveyance information (data byte) to the library apparatus 24 by using the conversion table. When the moving command is generated, the machine number address #i of the library apparatus which has previously been allocated to the host computer 20 is used. For instance, in the host computer 20-1 in FIG. 15, the machine number addresses #0 to #3 which are handled in the director 26-1 are allocated and a moving command for input/output activation is generated by using the machine number address which is empty. When a response indicating that the moving command using the machine number address #i was correctly received is obtained, the host computer 20 generates a data byte as medium conveyance information. The generation of the medium conveyance information by the library support program 76 is executed by using an MTU table 86 and a cell table 88 as shown in FIG. 17.

For example, as shown in FIG. 18, a cell address has previously been allocated to a position to which the medium of the library apparatus 24 shown in FIG. 15 is moved. The cell address is shown by a hexadecimal number. Namely, cell addresses A000 and A001 are allocated to the robot hands of the accessors 12-1 and 12-2 and a cell address B000 is allocated to the medium inlet/outlet 15 shown in FIG. 11. Cell addresses C000 to CFFF are allocated to the cells in the cell block 10. Further, cell addresses D000 to D00D are allocated to the recording and reproducing apparatuses 34-1 to 34-12.

Referring again to FIG. 16, when the library support program 76 receives a mounting command 85 from the OS 68, by referring to the cell table 88, for example, in case of the medium number 1, the cell address C000 is extracted. By referring to the MTU table 86, for example, D000 is extracted as an MTU address in which an empty flag has been set to 1. Medium conveyance information in which a moving side address is set to the cell address C000 and a moving destination address is set to the MTU address D000 is generated to the library apparatus 24.

[Constructions and functions of the director and accessor controller]

Figure 19:
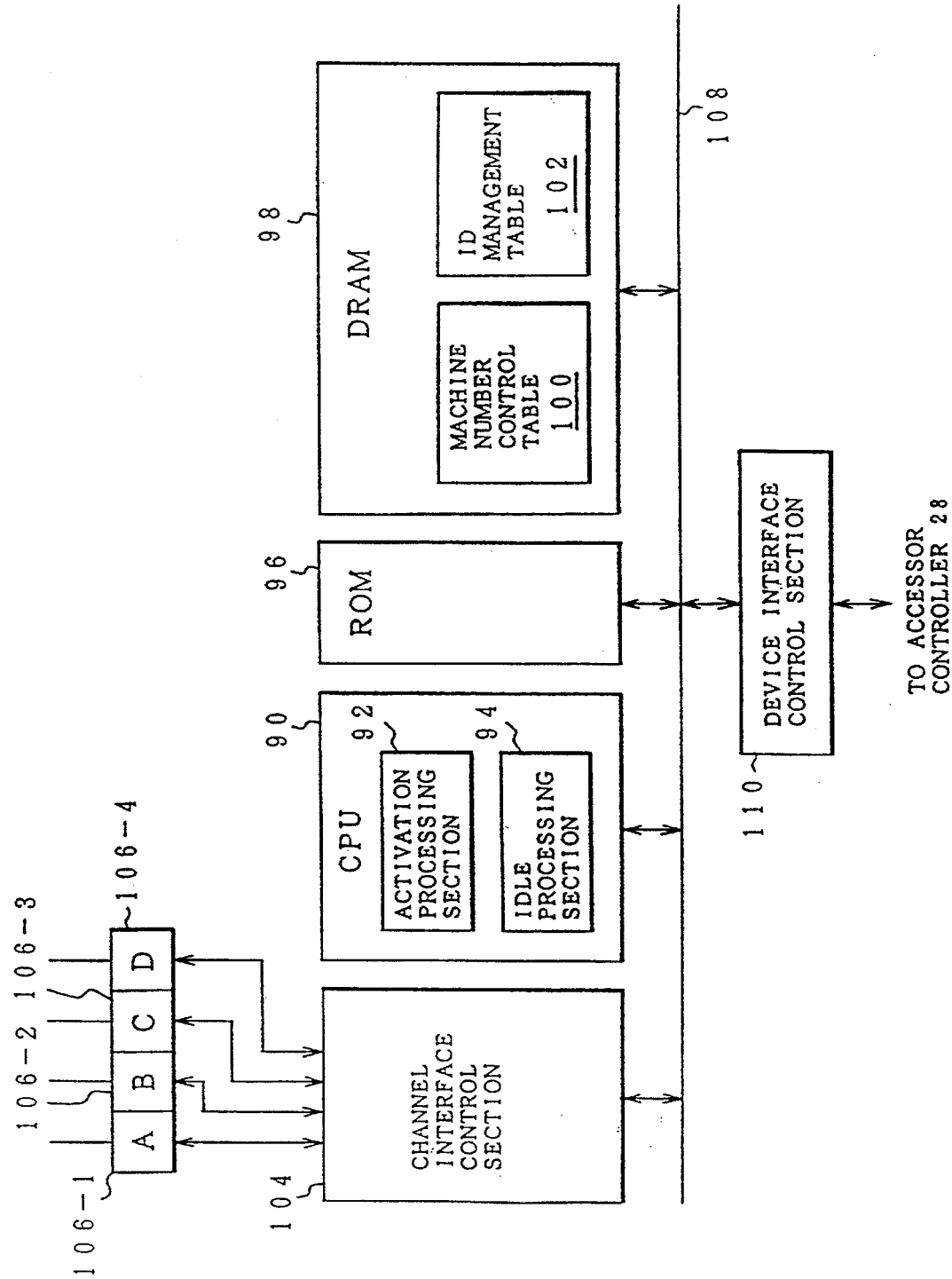
FIG. 19 is a block diagram showing an embodiment of a director in FIG. 15.

FIG. 19 shows an embodiment of the director 26-1 shown in FIG. 15. The director 26-2 also has the same construction as that of the director 26-1. A CPU 90 is provided for the director 26-1 as a first control section and the functions of an activation processing section 92 and an idle processing section 94 are realized by the program control. An ROM 96, a DRAM 98, a channel interface control section 104, and a device interface control section 110 are connected to a bus 108 from the CPU 90. Channel adapters 106-1 to 106-3 are connected to the channel interface control section 104, thereby performing the communication with the host computer. The device interface control section 110 performs the communication with the lower-order accessor controller 28. The machine number control table 100 and an ID management table 102 which are used for the processes of the activation processing section 92 and idle processing section 94 of the CPU 90 have been stored in the DRAM 98.

Figure 20:
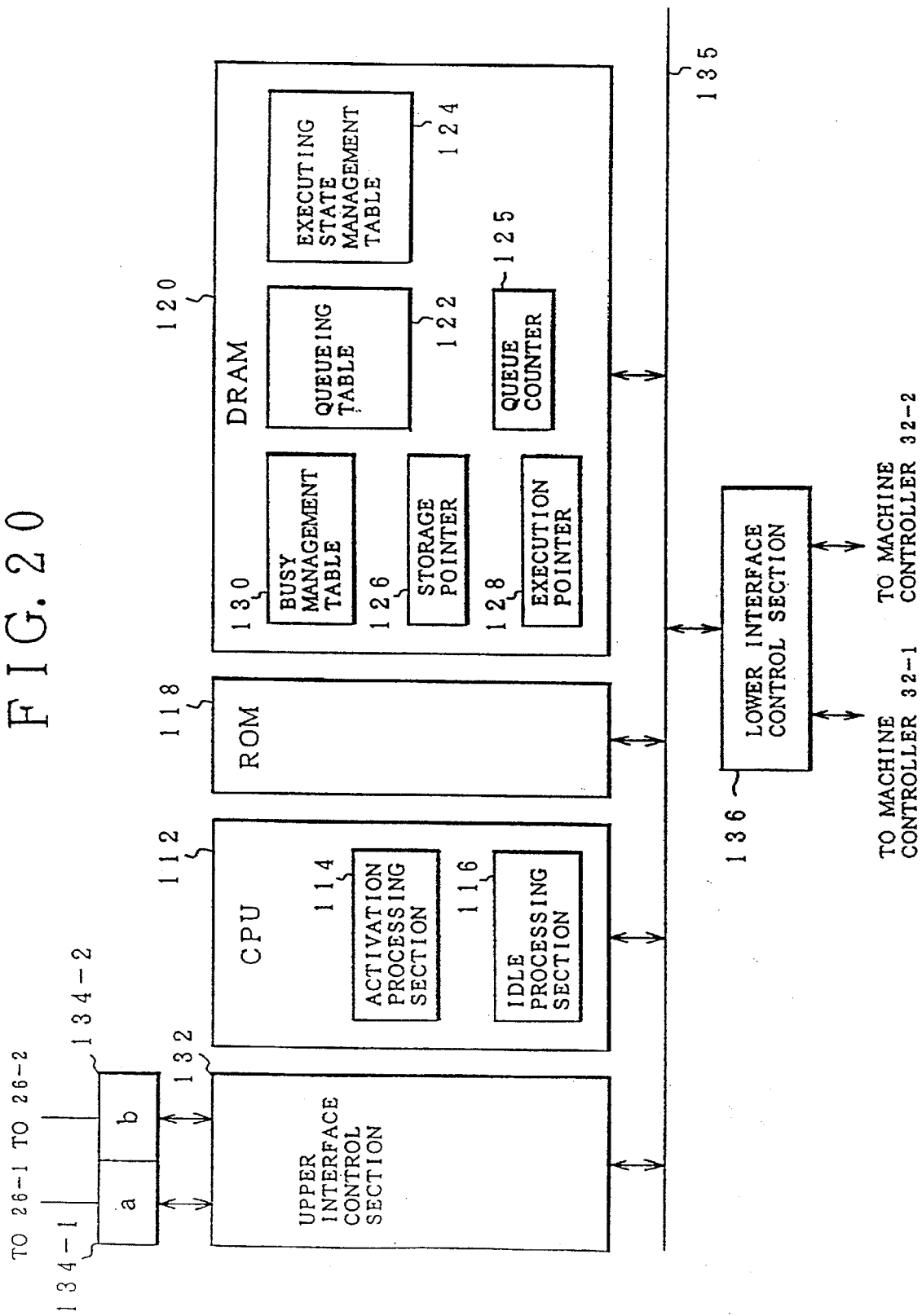
FIG. 20 is a block diagram showing an embodiment of an accessor controller in FIG. 15.

FIG. 20 shows the details of the accessor controller 28 shown in FIG. 15. The accessor controller 28 as a second control section has a CPU 112. An activation processing section 114 and an idle processing section 116 which are realized by the program control are provided in the CPU 112. An ROM 118, a DRAM 120, an upper interface control section 132, and a lower interface control section 136 are provided for a bus 135 of the CPU 112. The upper interface control section 132 performs the communication with the upper-order two directors 26-1 and 26-2 through the channels (a) and (b) of adapters 134-1 and 134-2. The lower interface control section 136 executes the communication with the machine controllers 32-1 and 32-2. A queueing table 122, which is used for processes of the activation processing section 114 and the idle processing section 116 of the CPU 112, an executing state management table 124, a queue counter 125, a storage pointer 126, an execution pointer 128, and a busy management table 130 are provided in the DRAM 120.

Figure 21:
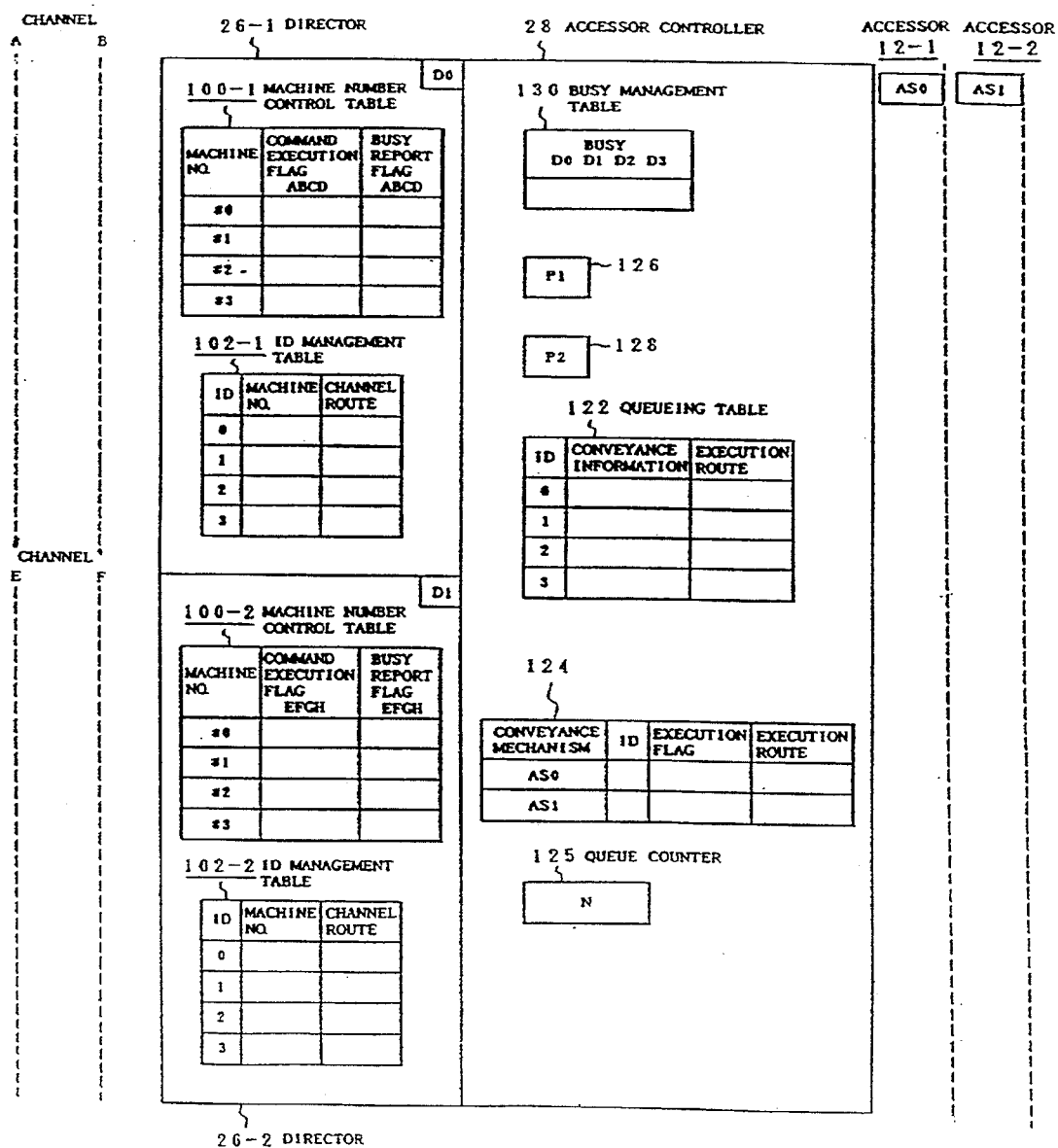
FIG. 21 is an explanatory diagram showing tables and pointers which are used in the director and the accessor controller in FIG. 15.

FIG. 21 shows the details of the directors 26-1 and 26-2 as a first control section in FIG. 19 and the tables and pointers of the accessor controller 28 as a second control section in FIG. 20. With respect to the machine number addresses from the host computer for the directors 26-1 and 26-2, as shown in FIG. 22, addresses of #0 to #3 are allocated to the director 26-1 and addresses of #0 to #3 are also allocated to the director 26-2. As for the physical machine number addresses of the directors 26-1 and 26-2 which are handled in following processes, as shown in FIG. 23, the director 26-1 is defined as D0 and the director 26-2 is defined as D1. Further, with respect to the physical machine number addresses of the accessors 12-1 and 12-2, as shown in FIG. 24, the accessor 12-1 is defined as AS0 and the accessor 12-2 is defined as AS1. In case of expressing the numerals of each machine number address by a general system, they are expressed by ASi and (i) indicates values of 0 to (n−1).

In FIG. 21, a machine number control table 100-1 is provided for the director 26-1. In this case, the director 26-1 has four channels of (A) to (D). In this embodiment, however, only two channels of (A) and (B) are used. The machine number control table 100-1 has four slots (four entries) in which the machine number addresses #0 to #3 which are handled in the director 26-1 are used as indexes. The table 100-1 can register a command execution flag and a busy report flag for each of the channels (A) to (D). As for a machine number control table 100-2 of another director 26-2, its fundamental construction is almost the same as that mentioned above. Namely, since four machine number addresses #0 to #3 are likewise allocated to the director 26-2, the machine number control table 100-2 has four slots (four entries) in which the machine number addresses #0 to #3 are used as indexes and a command execution flag and a busy report flag can be registered for each of the other four channels (E) to (H) with respect to each entry. ID management tables 102-1 and 102-2 are provided for the directors 26-1 and 26-2. The ID management tables 102-1 and 102-2 can register the machine number addresses #0 to #3 and channel routes which received a command with respect to four slots in which ID numbers in the queueing table 122 provided for the accessor controller 28, which will be explained hereinbelow, are used as indexes. That is, by referring to the ID management tables 102-1 and 102-2 by the ID numbers in the queueing table 122, the machine number addresses #i serving as indexes of the machine control tables 100-1 and 100-2 can be known. By referring to the machine number tables 100-1 and 100-2 by the machine number addresses #i, the channel route is known and the command execution flag or busy report flag can be determined.

The accessor controller 28 side will now be described. The queueing table 122 is provided for the accessor controller 28 and has four slots (four entries) in which the ID Nos. 0 to 3 are used as indexes. The medium conveyance information generated from the channel and the director machine number D0 or D1 indicative of an execution route as a system which received the medium conveyance information are stored into each slot. The executing state management table 124 is also provided. The executing state management table 124 has two slots (two entries) in which the machine numbers AS0 and AS1 of the accessors 12-1 and 12-2 are used as indexes. The ID number indicative of the position in the queueing table 122 of the command which is being executed, an execution flag indicating whether the command is being executed or not, and further, the director machine number D0 or D1 as an execution route are stored into each of the areas in which the accessor machine numbers AS0 and AS1 are used as indexes. Further, the storage pointer 126 and the execution pointer 128 are provided. The storage pointer 126 indicates a storing position of the medium conveyance information for the queueing table 122. The execution pointer 128 indicates a table position to be executed in the medium conveyance information stored in the queueing table 122. In an initial state in, which no medium conveyance information is stored in the queueing table 122, both of the pointer values P1 and P2 of the storage pointer 126 and execution pointer 128 are set to 0. Namely, by setting P1=0, the storage pointer 126 designates the storing position of the medium conveyance information in association with the next moving command to ID=0 in the queueing table 122.

Further, the queue counter 125 which counts the number of storage of the medium conveyance information for the queueing table 122 is provided. A count value (N) of the queue counter 125 is reset to 0 (N=0) in the initial state and the value (N) is increased by one every time the medium conveyance information is stored into the queueing table 122. The value (N) is decreased by one when the conveying command is generated to the accessor 12-1 or 12-2. Therefore, the count value (N) of the queue counter 125 indicates the number of medium conveyance information which at present in an execution waiting state. On the other hand, a maximum storage number Nmax which is decided by the number of slots of the queueing table 122 is equal to 4 in this embodiment (Nmax=4). Therefore, when the count value (N) of the queue counter 125 is less than 4, it will be understood that there is a vacancy in the queueing table 122. On the other hand, when the count value N=4, it will be understood that the queueing table is in a full state and there is no vacancy. When receiving the moving command from either one of the directors 26-1 and 26-2, the accessor controller 28 refers to the count value (N) of the queue counter 125. In this instance, when the count value (N) of the queue counter 125 is less than the maximum storage number Nmax (Nmax=4), it is judged that there is a vacancy in the queueing table 122. The medium conveyance information which was subsequently received is stored into a slot of the ID number in the queueing table 122 which is designated by a pointer value P1 of the storage pointer 126. When at least one medium conveyance information is stored into the queueing table 122, the conveying operation is instructed to the accessor 12-1 or 12-1. The designation of the medium conveyance information in the queueing table 122 to be executed is performed by a pointer value P2 of the execution pointer 128. The conveyance is instructed to the accessor 12-1 or 12-2, the ID number indicating the accessor machine number in the executing state management table 124 is stored. For example, the ID number indicating the position of the medium conveyance information in the queueing table 122 which instructed the conveyance with respect to the slot of the accessor machine number AS0 is stored. Further, the execution flag is set and the director machine number D0 or D1 is stored as an execution route. In this instance, the counting operation such that each of the pointer values P1 and P2 of the storage pointer 126 and execution pointer 128 is increased to 0, 1, 2, 3, and is again returned to 0 is repeated.

Further, a busy management table 130 is provided for the accessor controller 28. A busy flag can be set into the busy management table 130 for four director machine number addresses of D0 to D3. The busy flag is set when it is judged that there is no vacancy in the queueing table 122 for the reception notification of the moving command. On the other hand, when the medium conveyance information stored in the queueing table 122 is executed and there is a vacancy at the end of the execution, the busy flag is cleared. At the setting of the busy management table 130, a busy response is set to the directors 26-1 and 26-2 side. On the basis of the busy response, the directors 26-1 and 26-2 send a busy report to the corresponding channels. In this instance, flags are set to the channel positions corresponding to the busy report flags in the machine number control tables 100-1 and 100-2.

The functions of the activation processing section 92 and the idle processing section 94 shown in the CPU 90 in FIG. 19 which is provided for the directors 26-1 and 26-2 will now be described. The activation processing section 92 provided for the directors 26-1 and 26-2 receives mainly the moving commands from the channels and instructs the medium conveyance or the like to the accessor controller 28. The idle processing section 94 monitors mainly the end of the medium conveyance from the accessor controller 28 and sends the end report to the channels. The processing functions of the activation processing section 92 and the idle processing section 94 will be further explained hereinlater.

When receiving moving commands mainly from the directors 26-1 and 26L2, the activation processing section 114 provided for the accessor controller 28 in FIG. 20 executes a process to store the medium conveyance information subsequent to the moving command into the queueing table 122. The idle processing section 116 mainly executes the conveying instruction by a command format on the basis of the medium conveyance information in the queueing table 122 to the accessors 12-1 and 12-2. Further, the idle processing section 116 monitors the end of the medium conveyance by the accessors 12-1 and 12-2 and sends a conveyance end report to the directors 26-1 and 26-2. The activation processing section 114 and the idle processing section 116 of the accessor controller 28 will be also described further in detail hereinlater.

FIG. 25 shows a response Status from the directors 26-1 and 26-2 to the channels. First, an initial status is set to a code '00' and indicates that the moving command from the channel was normally received. The transfer of the next medium conveyance information is promoted by the response of the initial status. A channel end status is set to a code '08' and indicates that the medium conveyance information was normally received. A device busy is set to a code '10' and indicates that there is no vacancy in the queueing table 122. A device end status is set to a code '04' and indicates the end of conveyance of the medium by the accessor. Further, a busy cancellation status is set to a code '04' and indicates that there is a vacancy in the queueing table 122 and a new moving command can be received.

[Medium conveying operation of the library apparatus]

The operation of the library apparatus upon reception of the moving command will now be described hereinbelow with reference to FIGS. 26 to 36.

[Reception of the moving command from the channel]

Figure 26:
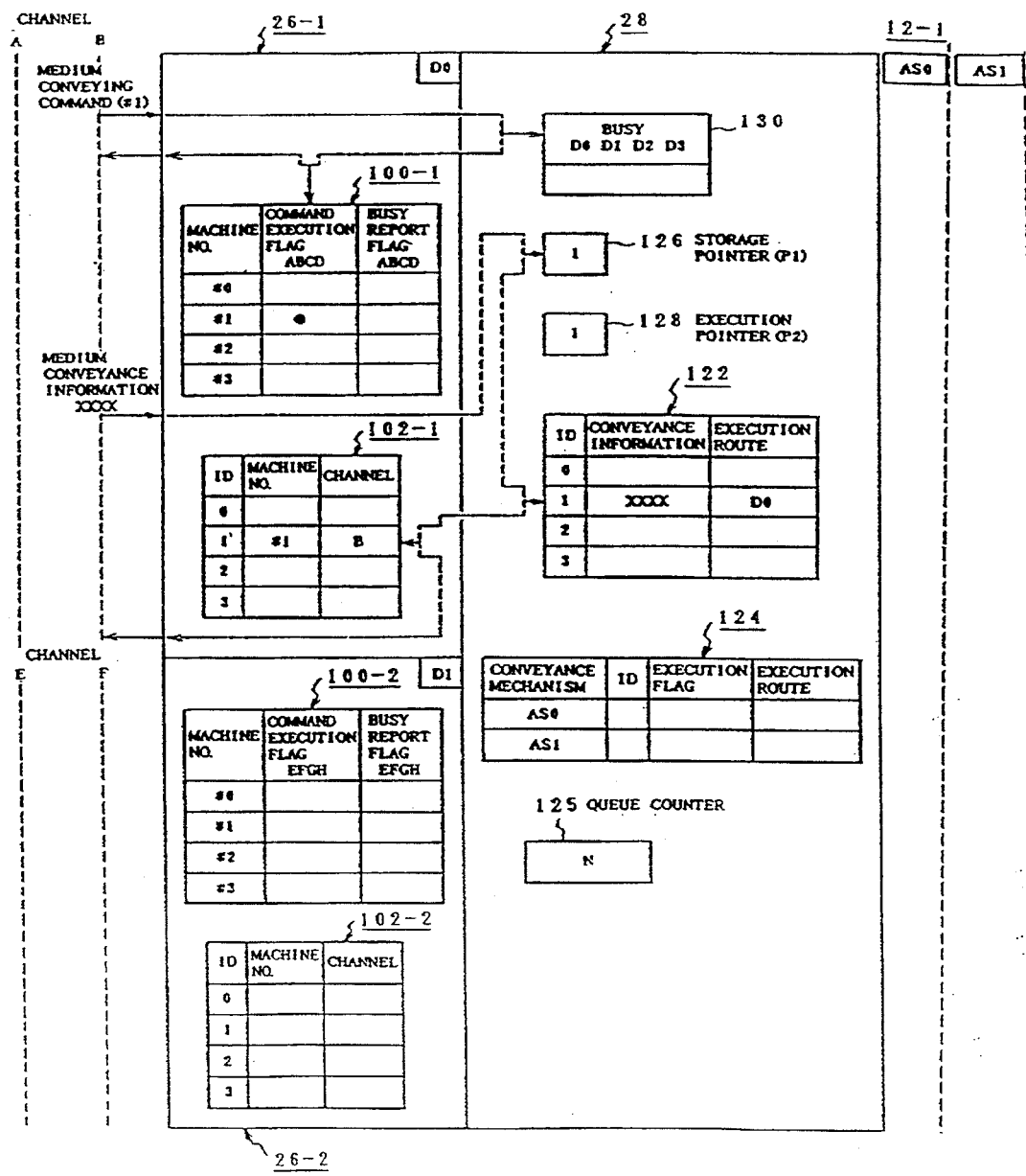
FIG. 26 is an explanatory diagram of the operation in the case where a moving command of a machine number address #1 is generated from a channel (B) to the director.

In FIG. 26, now assuming that the director 26-1 receives the moving command (medium conveying command) which designates the machine number address #1 from the channel (B), the director 26-1 instructs the conveyance to the accessor controller 28. When the conveying command is received from the director 26-1, the accessor controller 28 checks whether there is a vacancy in the queueing table 122 or not. Specifically speaking, by referring to the counter value (N) of the queueing counter 125, when the count value (N) is less than the maximum storage number Nmax, it will be understood that there is a vacancy in the queueing table 122. In this instance, when the count value (N) of the queue counter 125 is equal to 0, it will be understood that there is a vacancy in the queueing table 122. When the vacancy in the queueing table 122 is confirmed, the accessor controller 28 responds the reception to the director 26-1. When the director 26-1 receives the receipt response from the accessor controller 28, the director 26-1 sets a command execution flag to a position of the channel (B) on the slot of the machine number address #1 designated by the moving command in the machine number control table 100-1. In the following description, the flag set in the table is shown by a black dot, and in the case where the flag is cleared, it is shown by a white circle. After, the command execution flag was set, the director 26-1 reports the initial status of the code number '00' to the channel (B) which generated the moving command. The channel (B) which received the initial status from the director 26-1 subsequently generates medium conveyance information 'XXXX' having the moving side address and the moving destination address to the director 26-1. The director 26-1 transfers the medium conveyance information 'XXXX' from the channel (B) to the accessor controller 28. When receiving the medium conveyance information 'XXXX' from the director 26-1, the accessor controller 28 stores the received medium conveyance information 'XXXX' into the slot of the ID number in the queueing table 122 indicated by the pointer value (P1=1) of the storage pointer 126. In order to discriminate from which one of the directors 26-1 and 26-2 the instruction was made, the machine number 'D0' of the director 26-1 is stored into the execution route. After the storage of the medium conveyance information, the pointer value P1 of the storage pointer 126 is increased by one (P1=2), thereby designating the table position in the queueing table 122 to which the medium conveyance information which is subsequently received is stored. The count value of the queue counter 125 is increased by one. Further, the ID (ID=1) in the queueing table 122 which stored the medium conveyance information 'XXXX' is transferred to the director 26-1. The director 26-1 stores the channel number 'B' indicative of the channel route which received the machine number address '#1' and the command into the slot in the ID management table 102-1 by using the ID (ID=1) sent from the accessor controller 28 as a pointer. The director 26-1 finally reports the channel end status of the code number '08' to the channel (B) which generated the moving command. As mentioned above, a series of transferring processes of the moving command from the channel (B) to the director 26-1 are finished.

Figure 27:
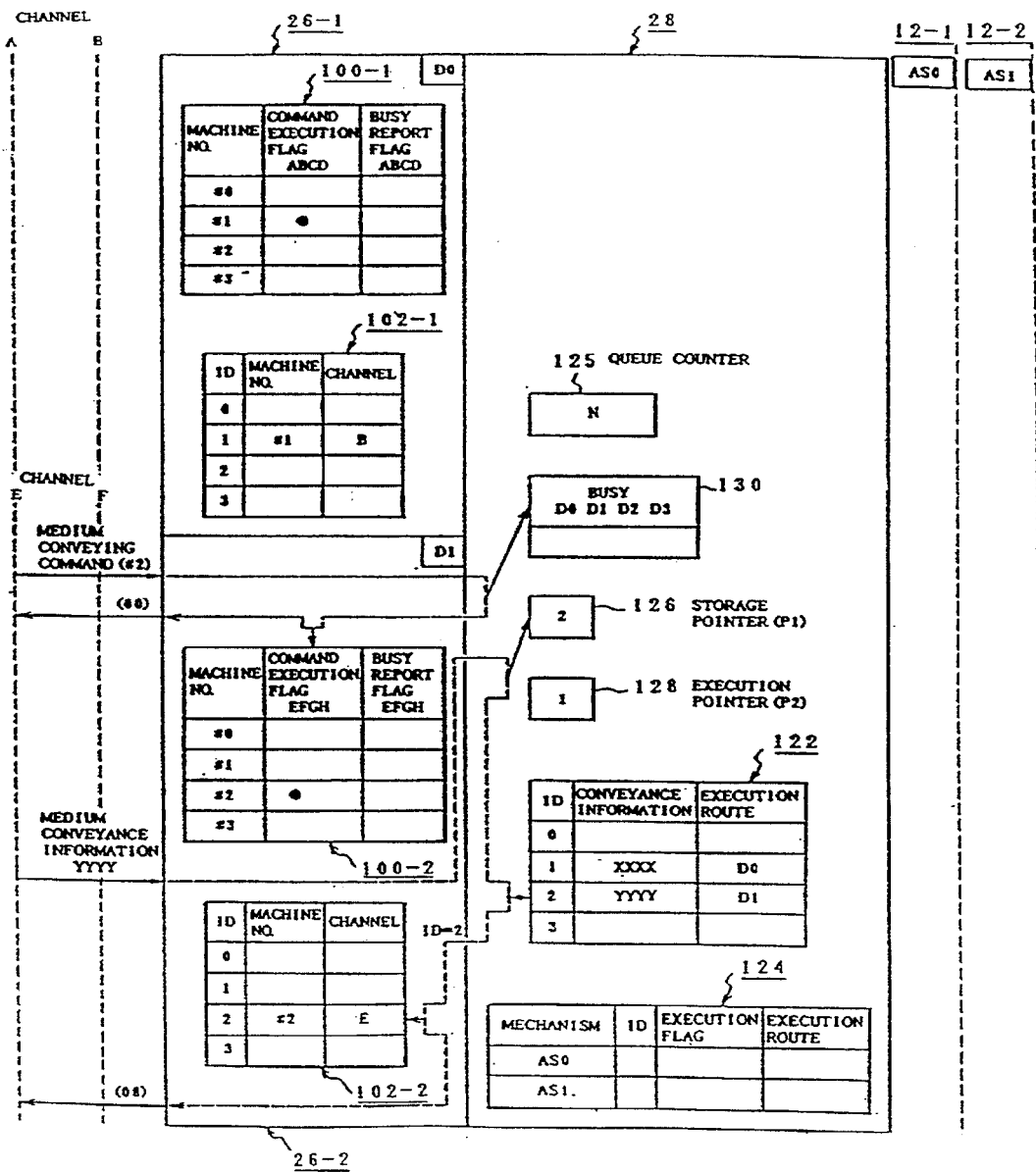
FIG. 27 is an explanatory diagram of the operation in the case where a moving command of a machine number address #2 is generated from a channel (E) to another director.

FIG. 27 shows the operation in the case where the moving command of the machine number address #2 is generated from the channel (E) to the director 26-2 subsequently to FIG. 26. Since there is also a vacancy in the queueing table 122 of the accessor controller 28 in this case, the initial status shown of the code '00' is reported to the channel (E) and medium conveyance information 'YYYY' is transferred. The medium conveyance information 'YYYY' is stored into the slot of ID (=2) in the queueing table 122 and the machine number 'D1' of the director 26-2 is stored as an execution route. The command execution flag is set into the machine number control table 100-2 at the position which is determined by the machine number address #2 and the channel (E). Further, the machine number address '#2' and the value of the channel 'E' indicating the channel route are stored into the ID management table 102-2 by using ID (=2) sent from the accessor controller 28 as a pointer. As will be obviously understood from the description of the operation in FIG. 27, even when the director 26-1 has already been executing the moving command, the moving command can be executed in parallel by another director 26-2.

Figure 28:
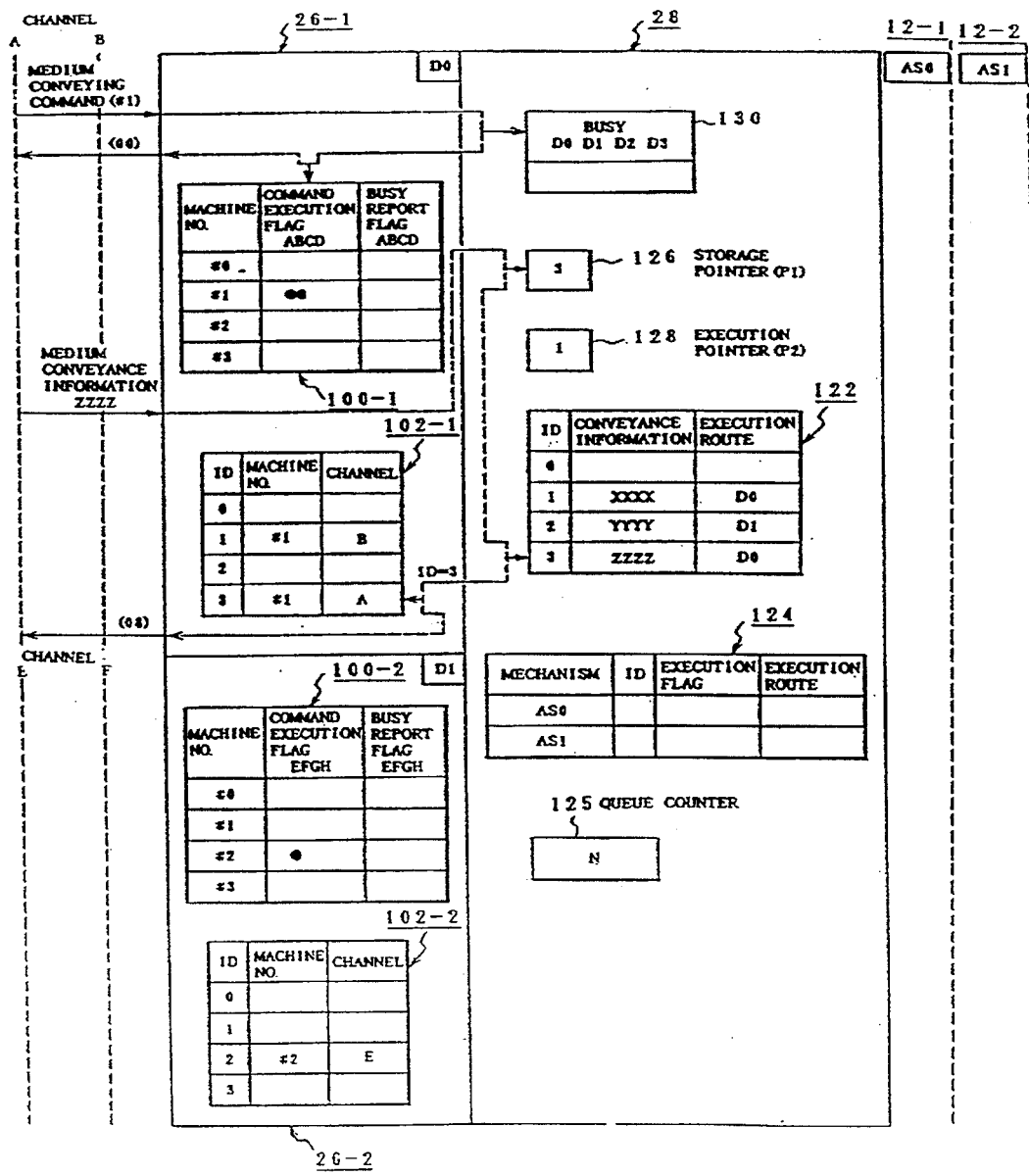
FIG. 28 is an explanatory diagram of the operation in the case where the moving command of the machine number address #1 is generated from a channel (A) to the director.

FIG. 28 shows the operation in the case where the moving command of the machine number address #1 is further generated from the channel (A) to the director 26-1 subsequently to FIG. 27. Since the count value (N) of the queue counter 125 is equal to (N=2) in this case and there is a vacancy in the queueing table 122, the initial status of the code '00' is reported to the channel (A) and medium conveyance information 'ZZZZ' is transferred. The received medium conveyance information 'ZZZZ' is stored into the slot of (ID=3) which is designated by the pointer value (P1=3) of the storage pointer 126 at that time in the queueing table 122. The machine number 'D0' of the director 26-1, indicative of an execution route is also stored. The command execution flag is set to the position which is determined by the machine number address #1 and the channel (A) in the machine number control table 100-1. Further, in the ID management table 102-1, the machine number address '#1' and the value of the channel (A) indicating the channel route are stored by using (ID=3) indicative of the storing position in the queueing table 122 sent from the accessor controller 28 as a pointer. As will be obviously understood from the operation in FIG. 28, the library apparatus in the present invention can execute the moving command generated by designating the same machine number address #1 from the different channels (A) and (B) to the same director 26-1.

Figure 29:
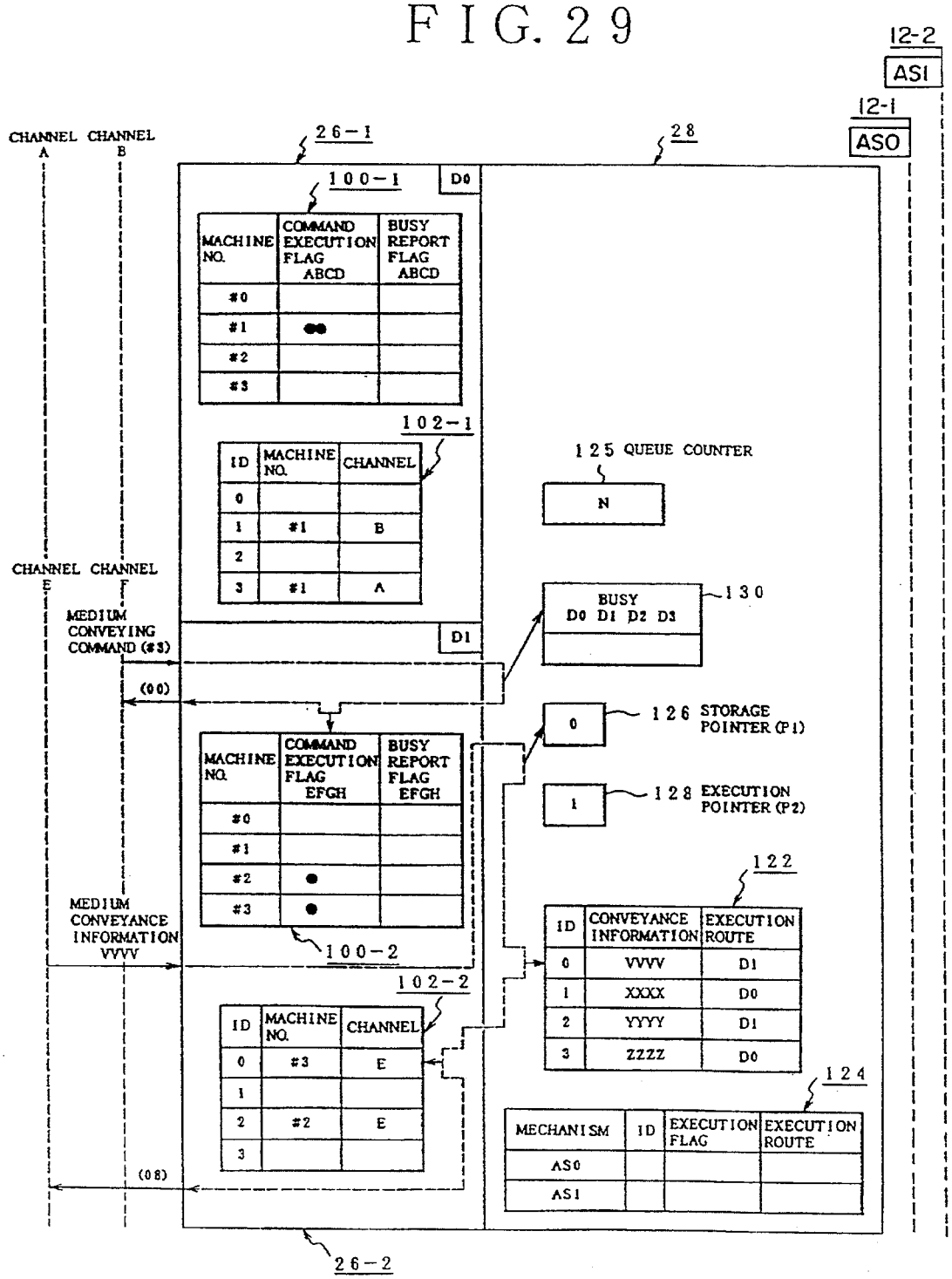
FIG. 29 is an explanatory diagram of the operation in the case where a moving command of a machine number address #3 is generated from a channel (F) to another director.

FIG. 29 shows the operation in the case where the moving command of the machine number address #3 is further generated from the channel (E) to the director 26-2 subsequently to FIG. 28. In this case, the count value of the queue counter 125 is equal to (N=3) and indicates that there is a vacancy in the queueing table 122 of the accessor controller 28. Therefore, the initial status of the code '00' is reported, medium conveyance information 'VVVV' is transferred from the channel (E), and the conveyance information 'VVVV' is stored into the slot of (ID=0) in the queueing table 122 which is designated by the pointer value (P1=0) in the storage pointer 126. The machine number 'D1' in the director 26-2 is also stored as an execution route. The command execution flag is set into the machine number control table 102 at the position which is decided by the machine number address #3 and the channel (E). Further, the machine number address '#3' and the value of the channel (E) indicating the channel route are stored into the ID management table 102-2 by using (D1=0) reported from the accessor controller-28 as a pointer. As will be obviously understood from the operation of FIG. 29, in the library apparatus in the present invention, two moving commands generated by designating the different machine number addresses #2 and #3 from the same channel (E) can be executed.

[Operation when there is no vacancy in the queueing table]

Figure 30:
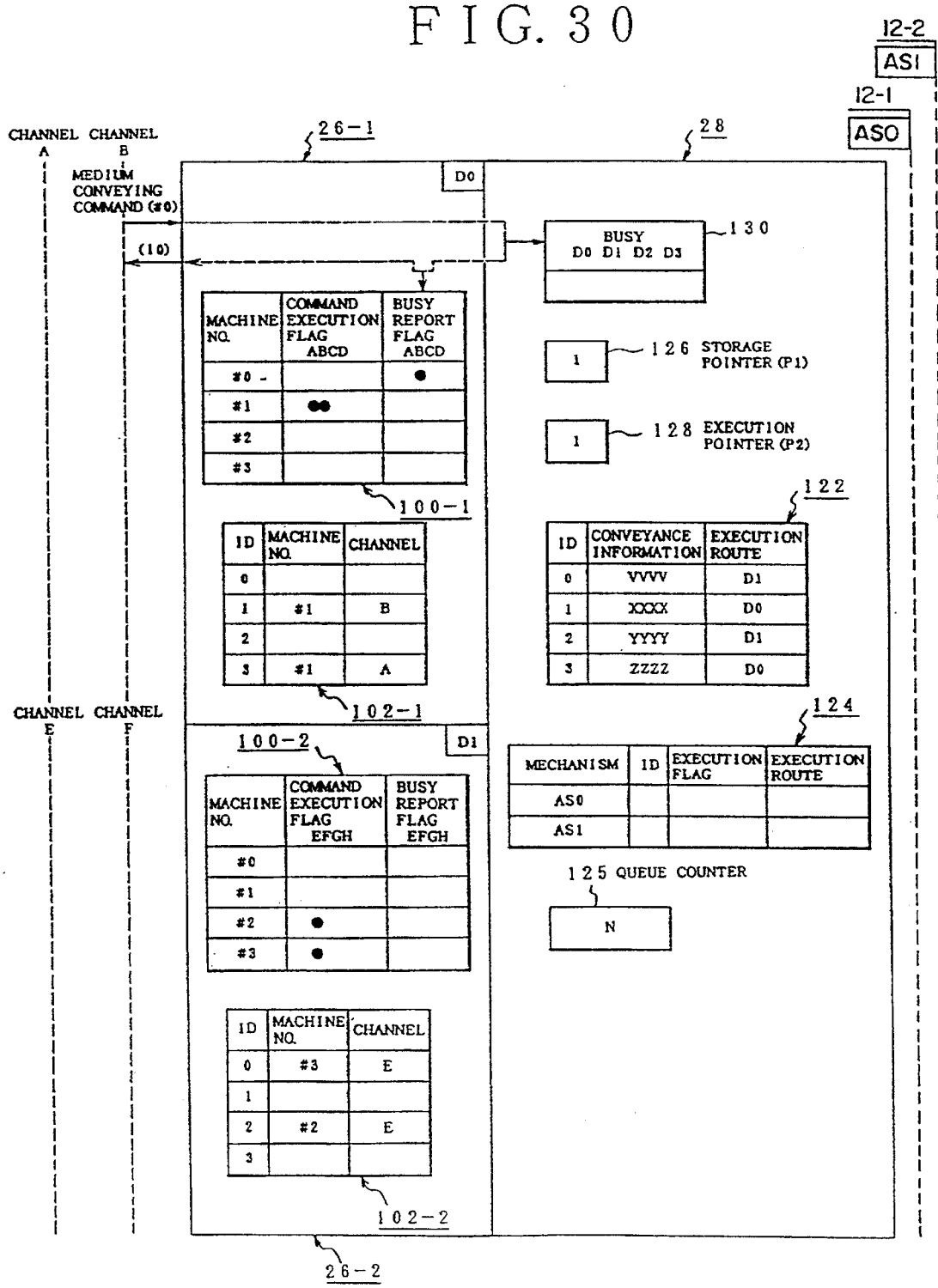
FIG. 30 is an explanatory diagram of the operation at the time of busy response in a full state of a queueing table.

FIG. 30 shows the operation in the case where a moving command which designates the machine number address #0 is issued from the channel (B) to the director 26-1 subsequently to FIG. 29. In this instance, since the queueing table 122 is in a full state, the library apparatus recognizes it and reports 'device busy' to the channel (B). Explaining in detail, when the moving command of the machine number address #0 is received from the channel (B), the director 26-1 issues a conveying command to the accessor controller 28. When the conveying command from the director 26-1 is received, the accessor controller 28 refers to the count number (N) of the queue counter 125 and checks to see if there is a vacancy in the queueing table 122 or not. In this instance, the count value (N) of the queue counter 125 is N=4 which coincides with the maximum storage number Nmax, and it is confirmed that there is no vacancy in the queueing table 122. When it is confirmed that there is no vacancy in the queueing table 122, a busy response is returned to the director 26-1. A busy flag is set into the bit position corresponding to the director machine number address D0 in the busy management table 130. When the busy response from the accessor controller 28 is received, the director 26-1 sets a busy report flag into the bit corresponding to the channel (B) of the busy report flag existing on the slot of the machine number address #0 in the machine number control table 100-1 and reports 'device busy' of the code (10) to the channel (B).

The generation of the 'device busy' in the library apparatus of the invention depends on the number of slot (the number of entries) in the queueing table 122. Therefore, when the slot number in the queueing table 122 is set to the sum of (m×n) which is obtained in a manner such that the number of channels in each of the directors 26-1 and 26-2 is multiplied by the total number (n) of the machine number addresses, no 'device busy' occurs due to the full state of the queueing table 122. Specifically explaining, in case of channel number m=4 and machine number address number n=4 of the two directors 26-1 and 26-2 in the library apparatus of the invention, by setting that (4×4)+(4×4)=32 slots if 32 slots are used, no 'device busy' due to the full state in the queueing table 122 occurs. In FIGS. 26 to 30, since used channel number is set to m=2 and used machine number address number is set to n=2, in this case, when (2×2)+(2×2)=8 slots no 'device busy' due to the full state of the queueing table 122 occurs. This is because when each channel has used all of the usable machine number addresses and issued the moving command to the directors 26-1 and 26-2, no more moving command can be issued, so that the channel waits until the machine number address which is in use is opened by the response of the end of the medium conveyance from the library apparatus and issues the next moving command.

[Medium conveyance operation by the accessor controller]

Figure 1:
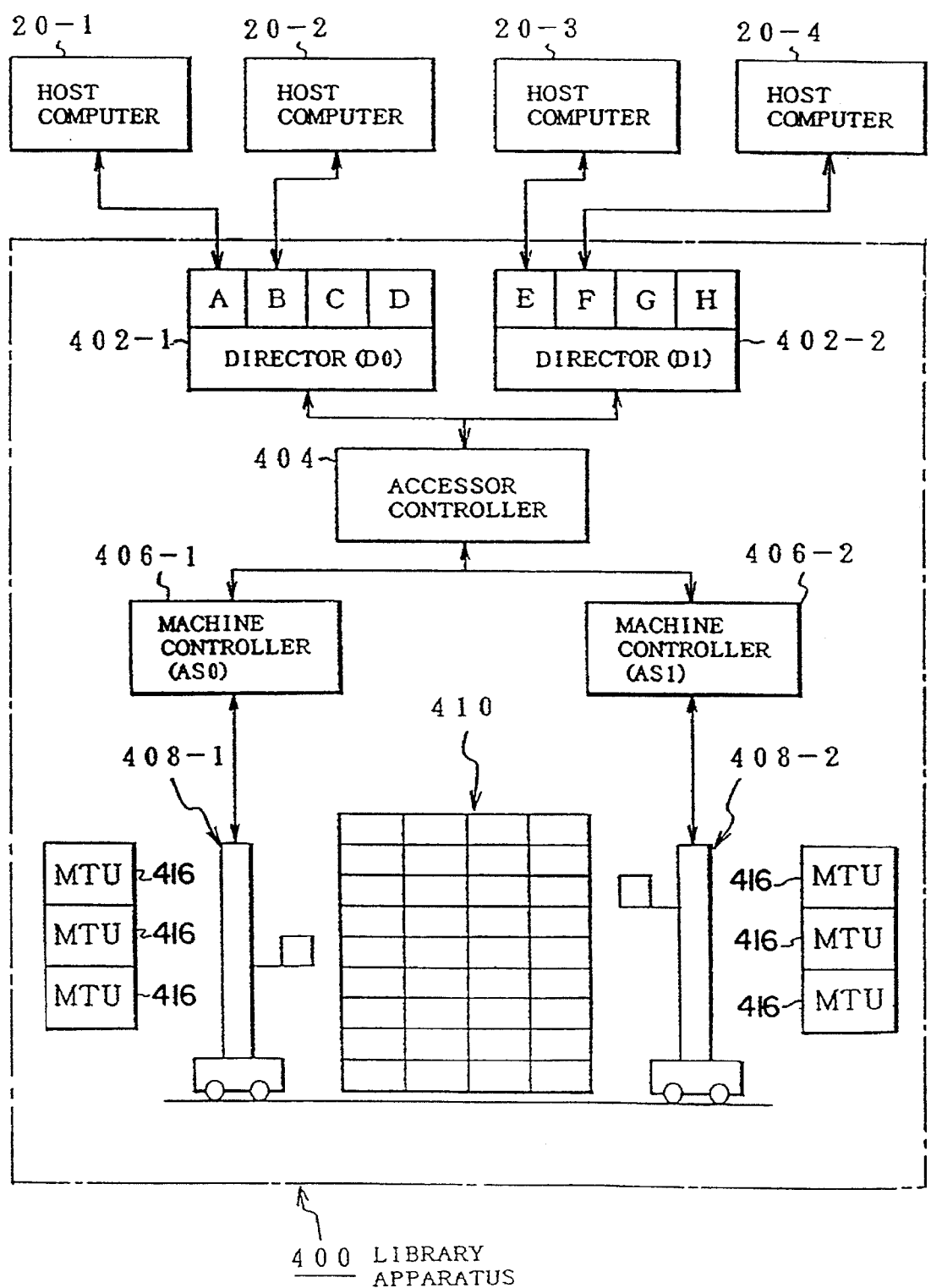
FIG. 1 is a block diagram of a conventional apparatus.
Figure 2:
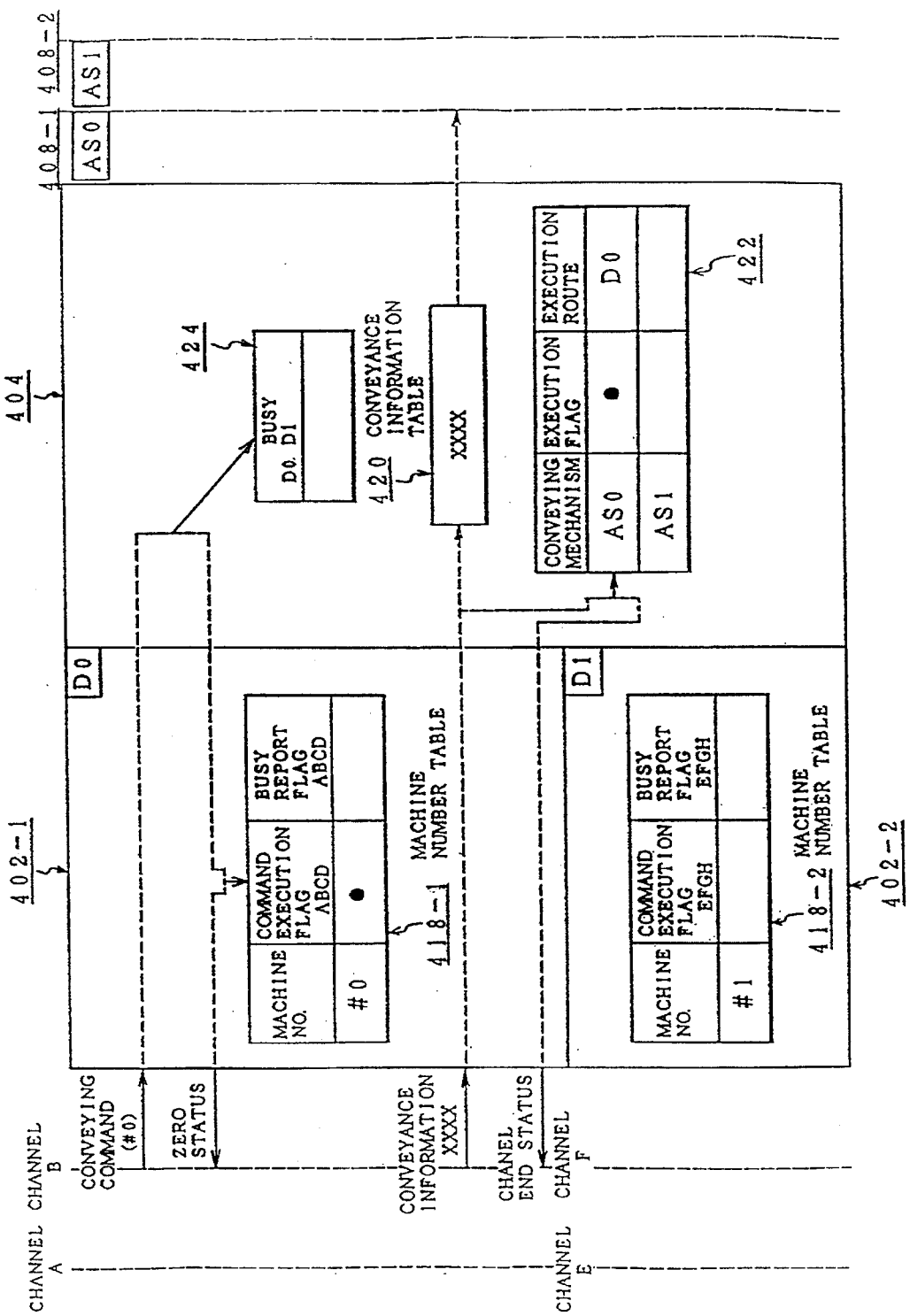
FIG. 2 is an explanatory diagram of the operation in the case where a moving command from a channel (B) to a director is generated in FIG. 1.
Figure 3:
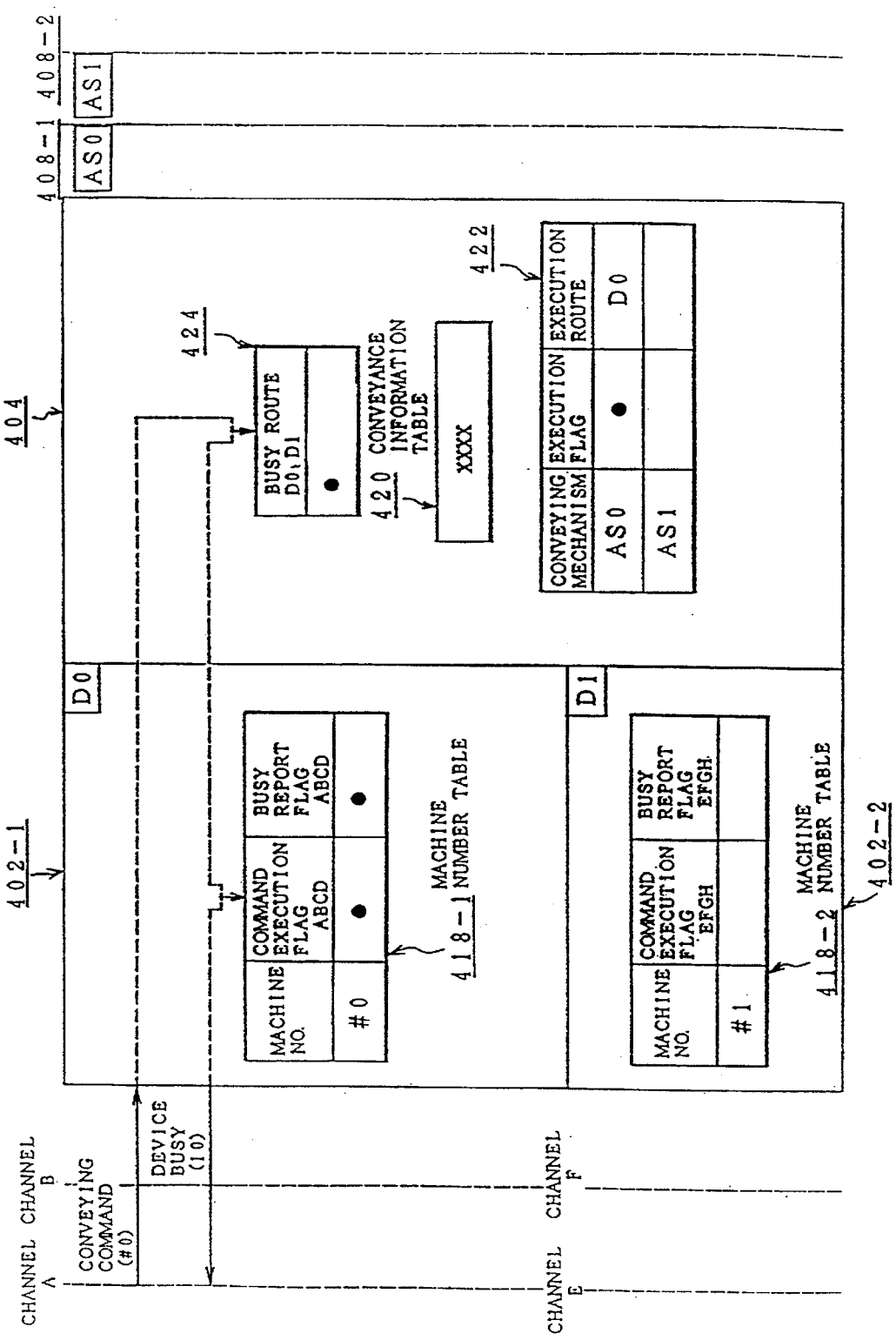
FIG. 3 is an explanatory diagram of the operation of a busy response to a moving command which was generated from the channel (A) to the same director in FIG. 1.
Figure 4:
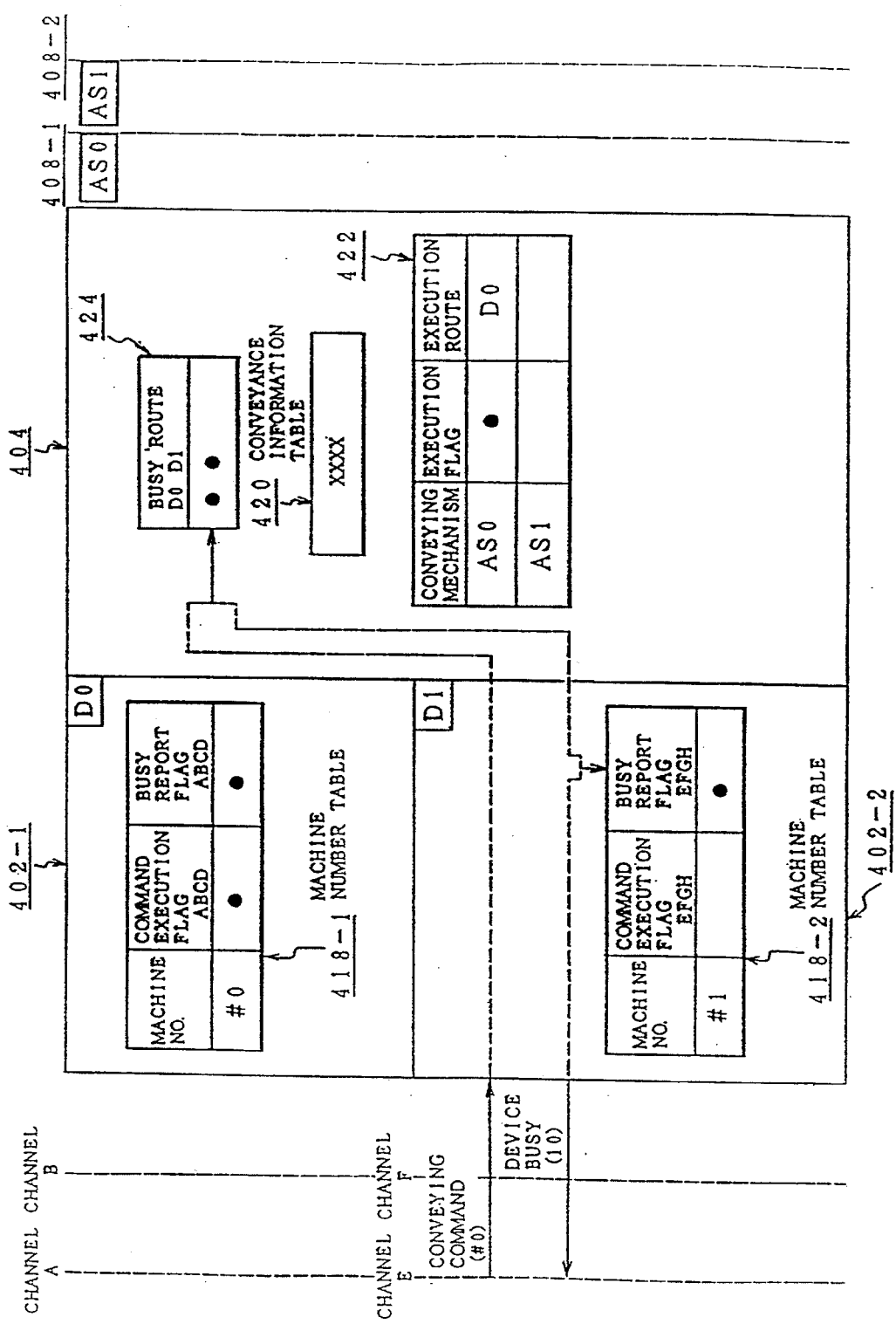
FIG. 4 is an explanatory diagram of the operation of a busy response to a moving command which was generated from a channel (E) to another director in FIG. 1.
Figure 5:
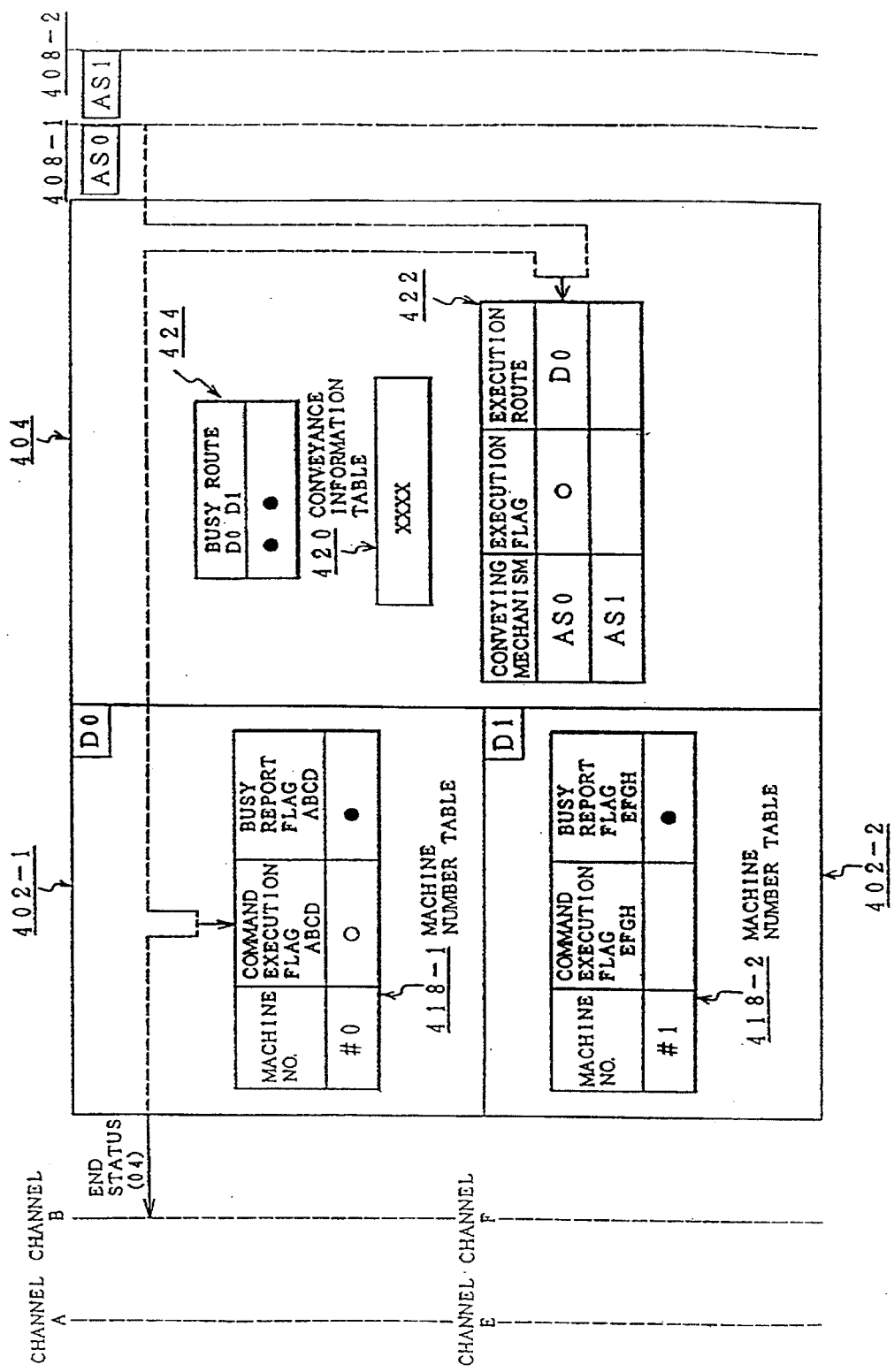
FIG. 5 is an explanatory diagram of the operation of a busy cancellation upon completion of a medium conveyance in the conventional apparatus.
Figure 6:
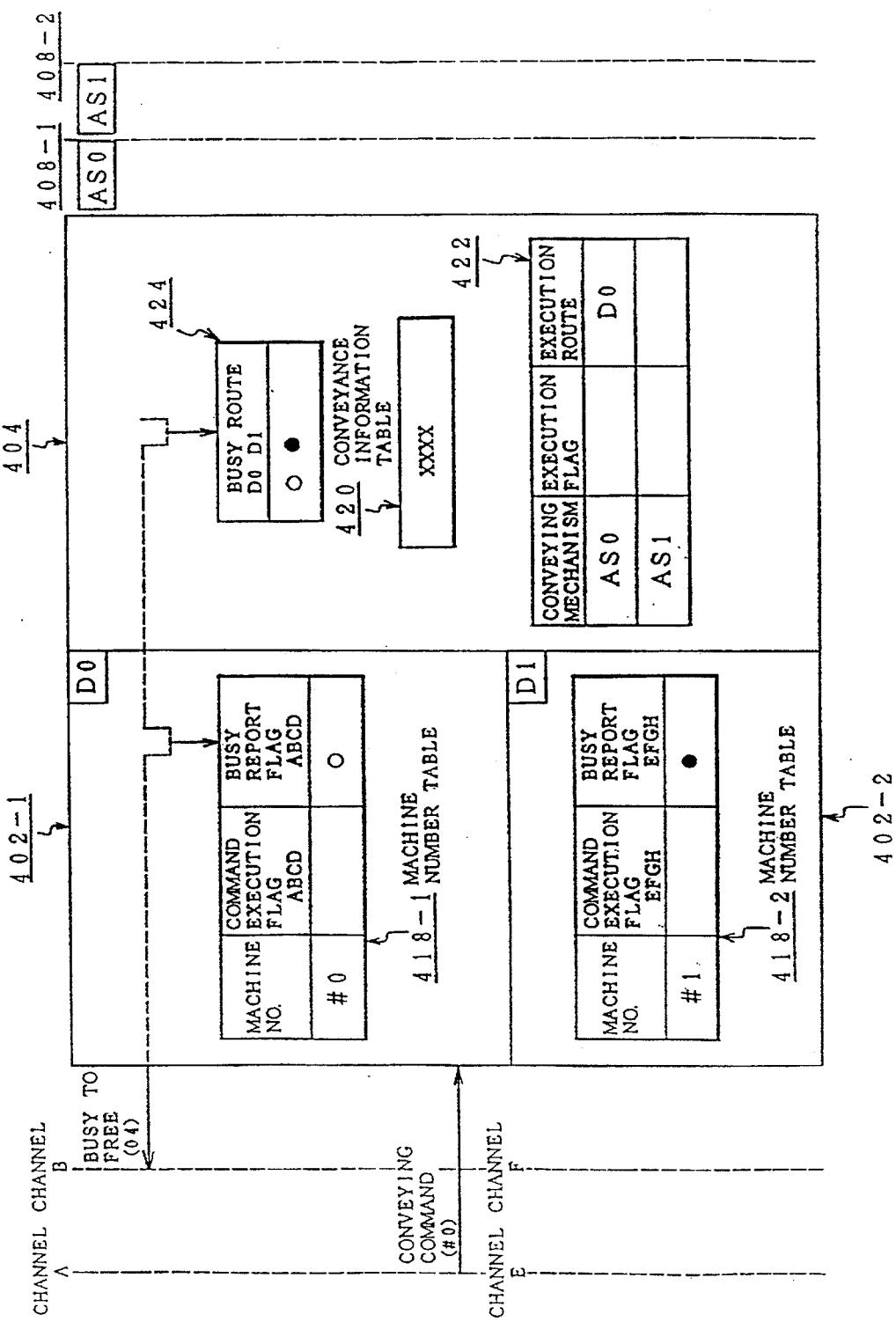
FIG. 6 is an explanatory diagram of the operation showing a report of busy cancellation to a channel and a regeneration of the moving command in the conventional apparatus.
Figure 7:
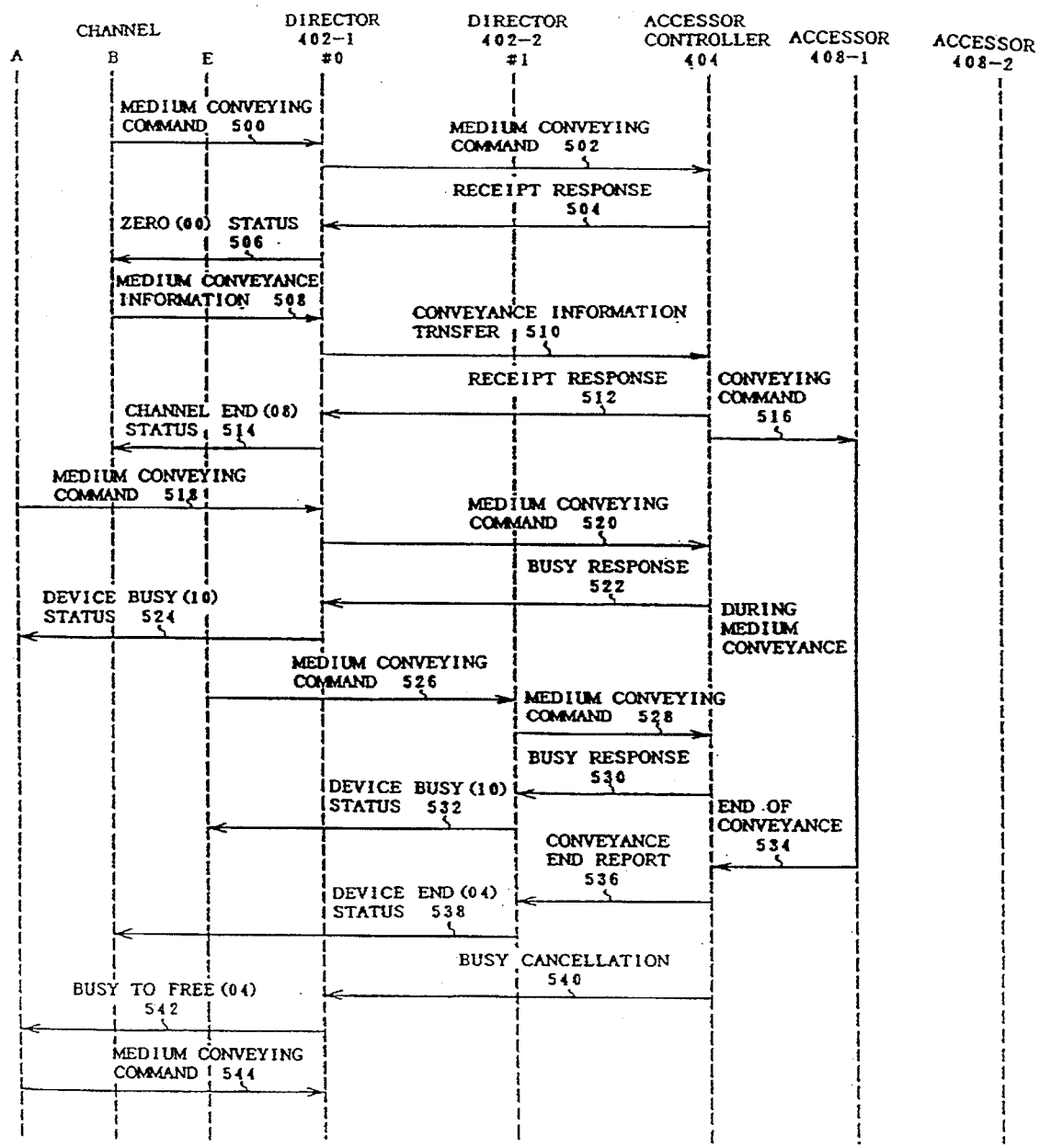
FIG. 7 is a time chart showing the operations in FIG. 2 to FIG. 6 in a lump.
Figure 8:
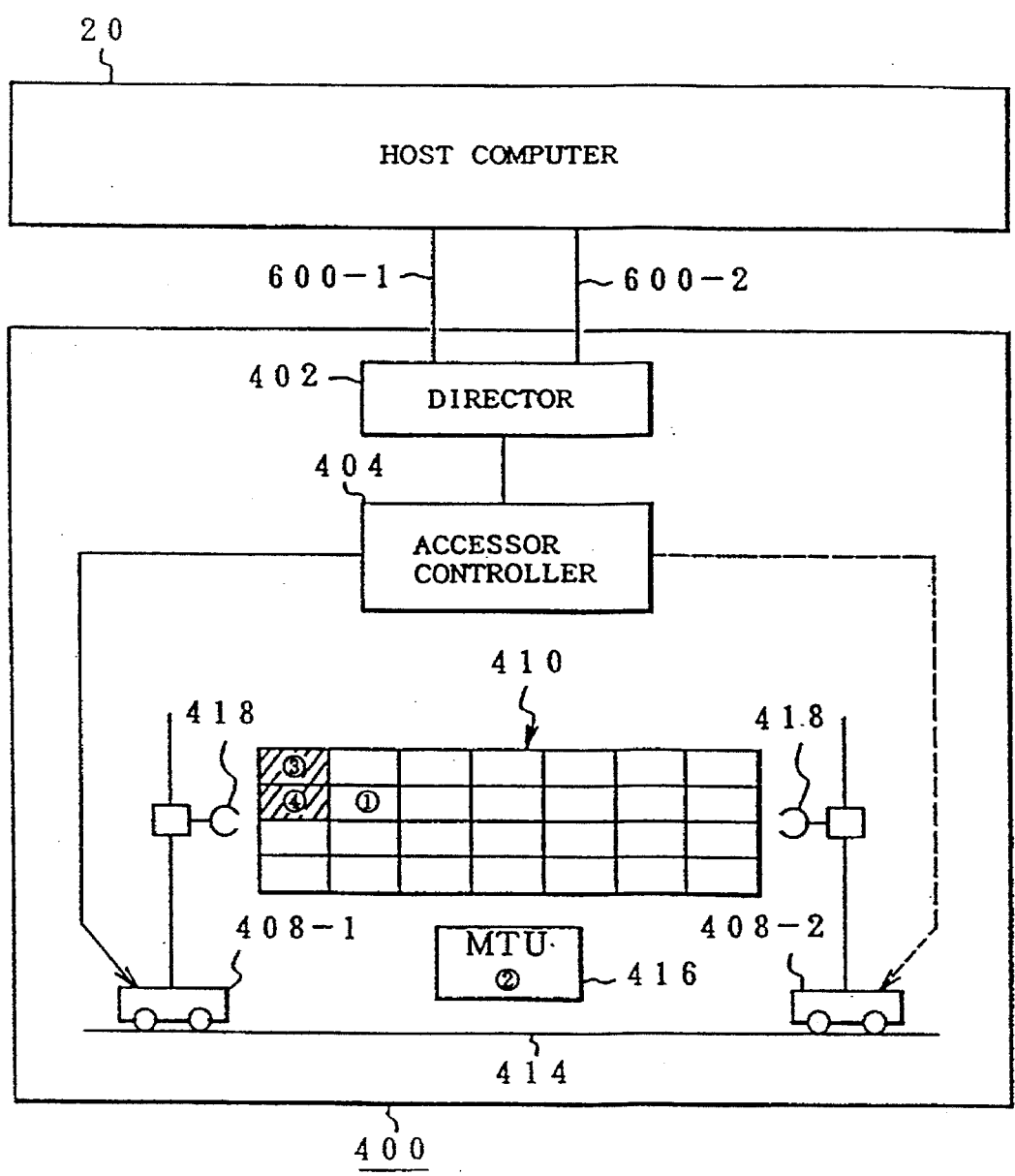
FIG. 8 is an explanatory diagram showing a situation of the occurrence of a fault in the conventional library apparatus.
Figure 9:
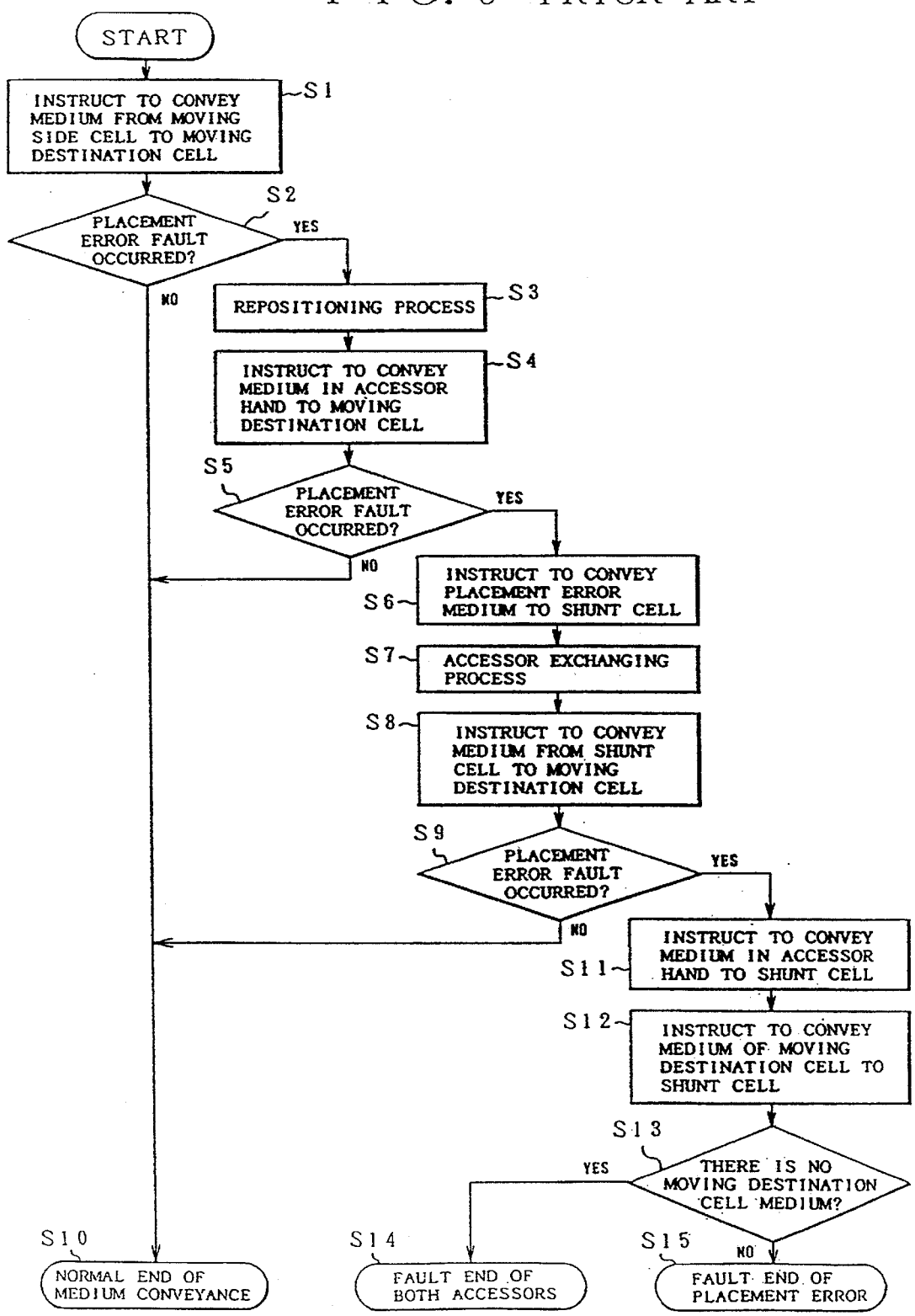
FIG. 9 is a flowchart showing a conventional recovering process of a placement error fault.
Figure 10:
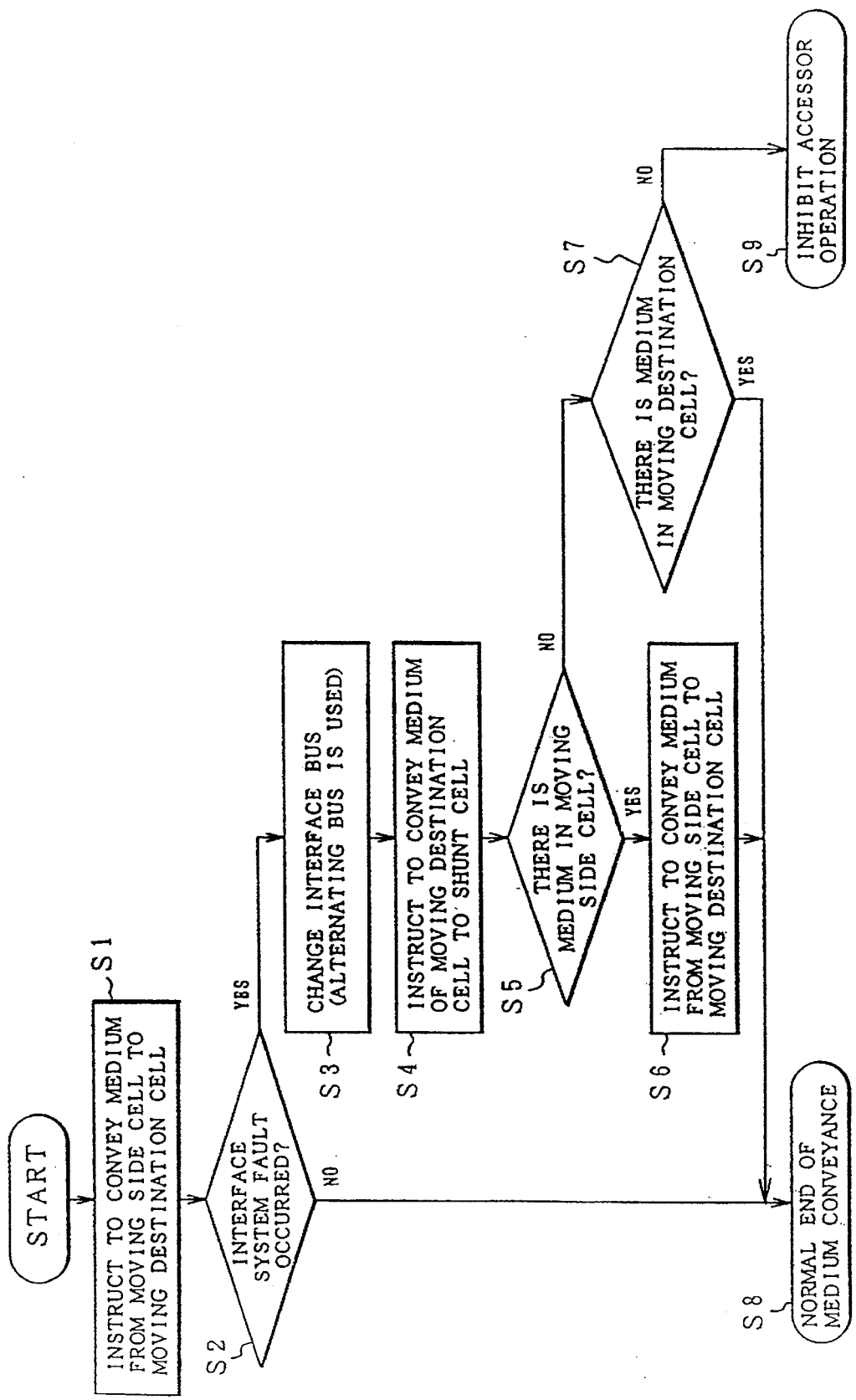
FIG. 10 is a flowchart showing a conventional recovering process of an interface bus system fault.
Figure 31:
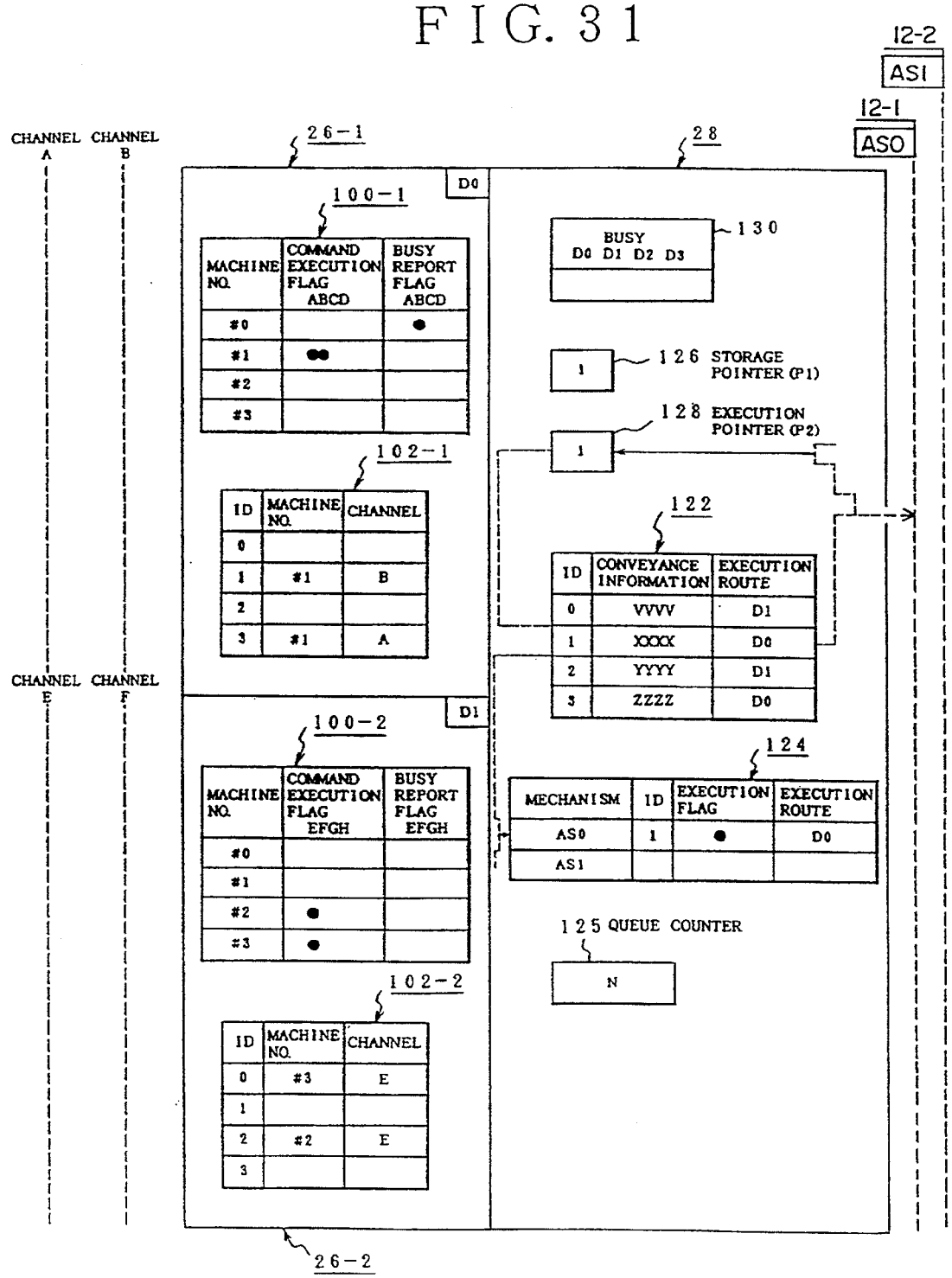
FIG. 31 is an explanatory diagram of the operation in the case where a conveying operation is instructed to an accessor.

FIG. 31 shows the operation in the case where the accessor controller 28 instructed the accessor 12-1 of the accessor machine number AS0 to convey the medium in a state in which the queueing table 122 is in the full state in FIG. 30. First, the accessor controller 28 refers to the executing state management table 124 in order to select either one of the accessors 12-1 and 12-2 which is in a vacant state. In this instance, since both of the accessors 12-1 and 12-2 are in the vacant state, the accessor 12-1 of the accessor machine number AS0 is selected. A pointer value P2=1 which is indicated by the execution pointer 128 at this time is stored into the ID number. The execution flag is set and, further, the director machine number 'D0' is stored as an execution route. Subsequently, with reference to the slot of the ID number which coincides with the pointer value P2=1 of the execution pointer 128, the accessor controller 28 extracts the medium conveyance information 'XXXX' and indicates in a command format to the selected accessor 12-1, specifically speaking, the machine controller 32-1 shown in FIG. 6. The medium conveyance information 'XXXX' has a moving side cell address and a moving destination cell address. Therefore, the accessor 12-1 which received the medium conveyance information 'XXXX' takes out, for example, a cartridge from the designated cell in the cell block designated as a moving side address and carries the cartridge to the recording and reproducing apparatus designated as a moving destination address, and loads the cartridge. The accessor controller 28 increases the pointer value P2 of the execution pointer 128 by one to thereby set P2=2 in association with the generation of the command to the accessor 12-1. Further, the accessor controller 28 decreases the value of the queue counter 125 by one and decreases the count value (N) by one, thereby setting N=3.

Figure 32:
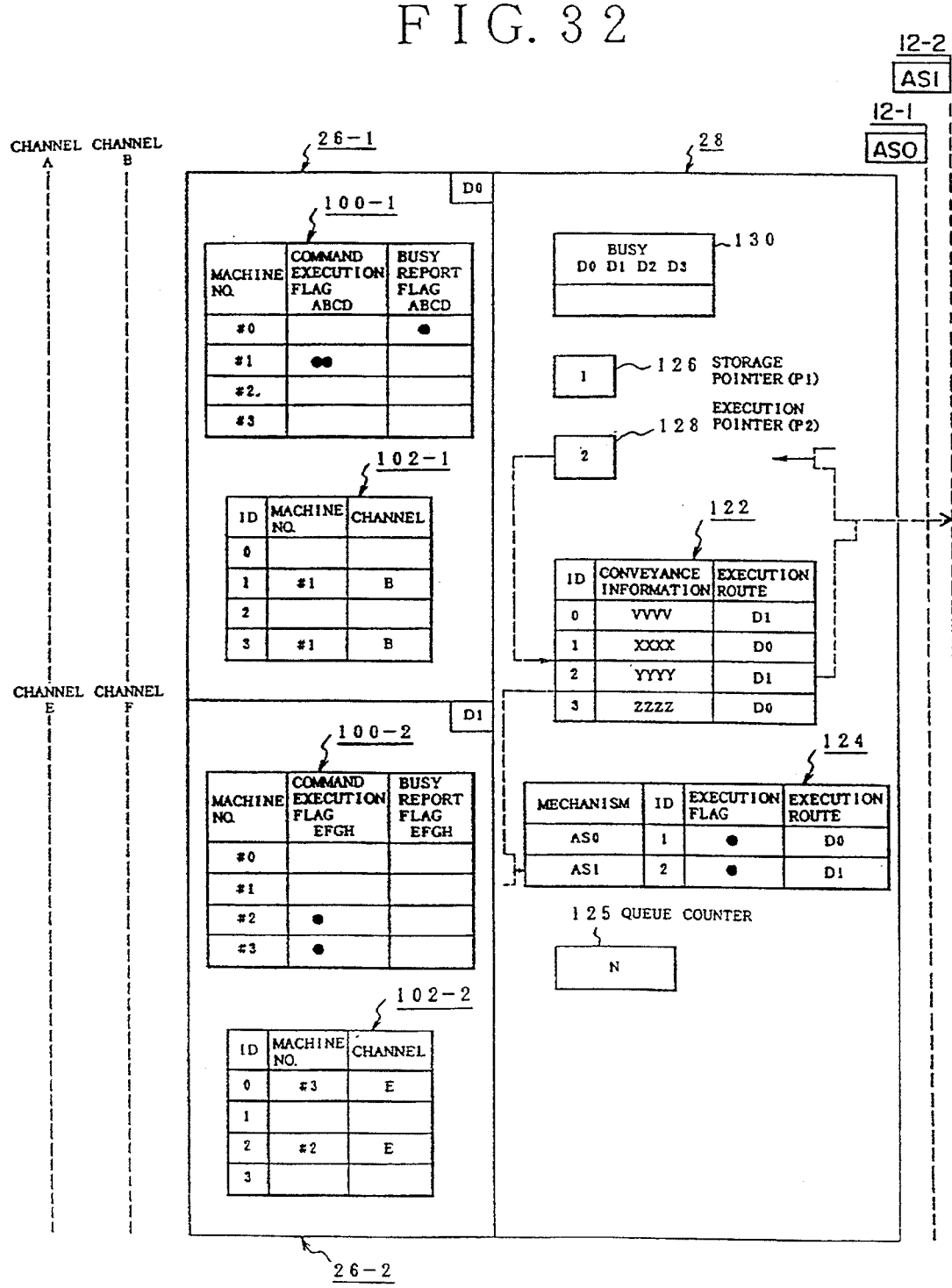
FIG. 32 is an explanatory diagram of the operation in the case where a conveying operation is instructed to another accessor.

FIG. 32 shows the operation in the case where the accessor controller 28 instructed the conveying operation to another accessor 12-2. That is, the accessor controller 28 refers to the executing state management table 124. In this instance, since the accessor 12-2 of the accessor machine number AS1 is vacant, the accessor 12-2 is selected and the pointer value P2=2 of the execution pointer 128 is stored. An execution flag is set and, further, the director machine number 'D1' is stored as an execution route. The medium conveyance information 'YYYY' is extracted from the slot of ID=2 of the queueing table 122 which is designated by the pointer value P2=2 of the execution pointer 128. The conveyance is instructed to the accessor 12-2 in a command format. When the medium conveyance is instructed to the accessor 12-2, the pointer value P2 of the execution pointer 128 increased by one, thereby setting P2=3. The accessor controller 28 decreases the value of the queue counter 125 by one, thereby setting N=2. As will be apparent from FIG. 32, in the library apparatus of the invention, by issuing the moving command to the two accessors 12-1 and 12-2 provided, they can be made operative simultaneously.

Figure 33:
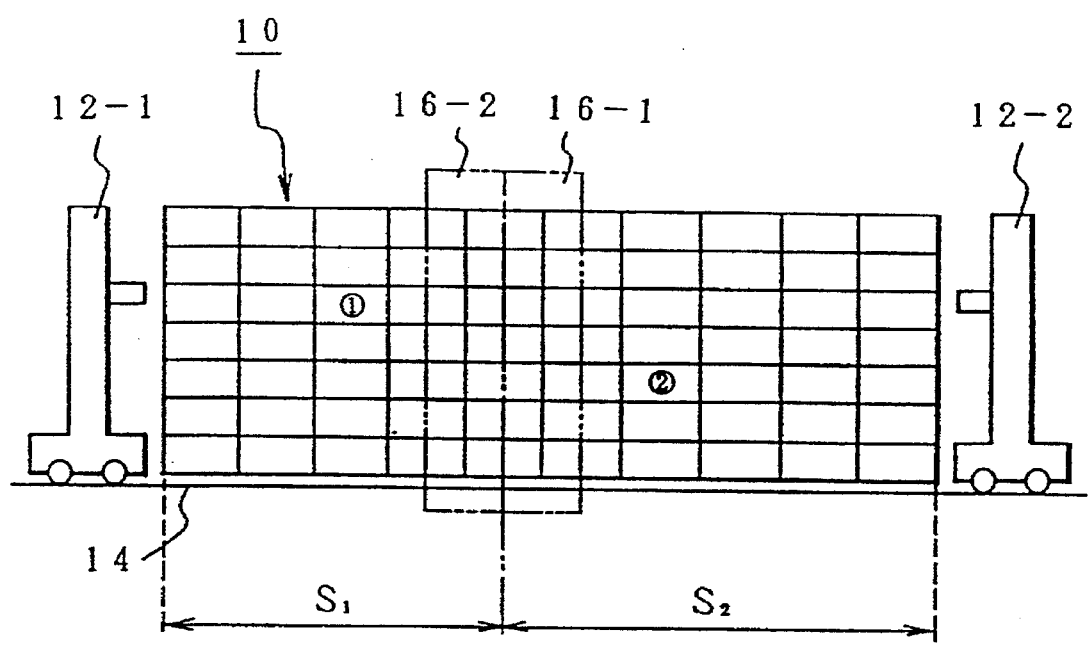
FIG. 33 is an explanatory diagram of the allocation of areas which can be accessed when two accessors are simultaneously operated.

In case of simultaneously operating the accessors 12-1 and 12-2, it is necessary to select the medium conveyance information from the queueing table 122 and instruct the conveying operation so that the moving ranges of the accessors 12-1 and 12-2 are not overlapped. FIG. 33 shows a basic idea of an allocating process of the commands when the two accessors 12-1 and 12-2 are operated simultaneously. As shown in FIG. 11, the deck units 16-1 and 16-2 are provided for the cell block 10 at the center so as to face each other while sandwiching the rail 14. In this case, the accessible region S1 of the accessor 12-1 is the left half region including the deck unit 16-1. The accessible region S2 of the accessor 12-2 is the right half region including the deck unit 16-2. Therefore, with respect to the simultaneous operations of the accessors 12-1 and 12-2, as for the accessor 12-1, a command by the medium conveyance information having, for example, the moving side cell address (1) which is in the cell block of the accessible region S1 is issued. As for the accessor 12-2, it is sufficient to issue a command based on the medium conveyance information having, for example, the moving side cell address (2) included in the accessible region S2. The cell address of the moving command is allocated at random to the cell block 10. The cell addresses are not issued equally in the accessible regions S1 and S2. Therefore, according to circumstances, there is a command which is executed later among the medium conveyance information stored in the queueing table. In such a case, the time until the medium conveyance information stored in the queueing table 122 is executed is monitored. When an overtime such that it is not executed even after the elapse of a predetermined time, the medium conveyance information is forcedly executed by setting the execution order to the top priority, thereby preventing that the specific medium conveyance information is left in the queueing table. FIG. 33 shows an example of the case where the deck units 16-1 and 16-2 are provided at the center of the cell block 10 so as to face each other. When the deck units 16-1 and 16-2 are separately arranged on both sides of the cell block 10, the accessible regions S1 and S2 are dynamically set. For example, when the accessor 12-1 is executing the medium conveyance having the moving side cell address (1), the right side region of the cell address (1) is set to the accessible region S2 of the accessor 12-2. As mentioned above, when the deck units 16-1 and 16-2 are arranged separately on both sides of the cell block 10, a processing efficiency by the simultaneous operations of the accessors 12-1 and 12-2 is improved although the control is complicated.

[Operation at the end of medium conveyance]

Figure 34:
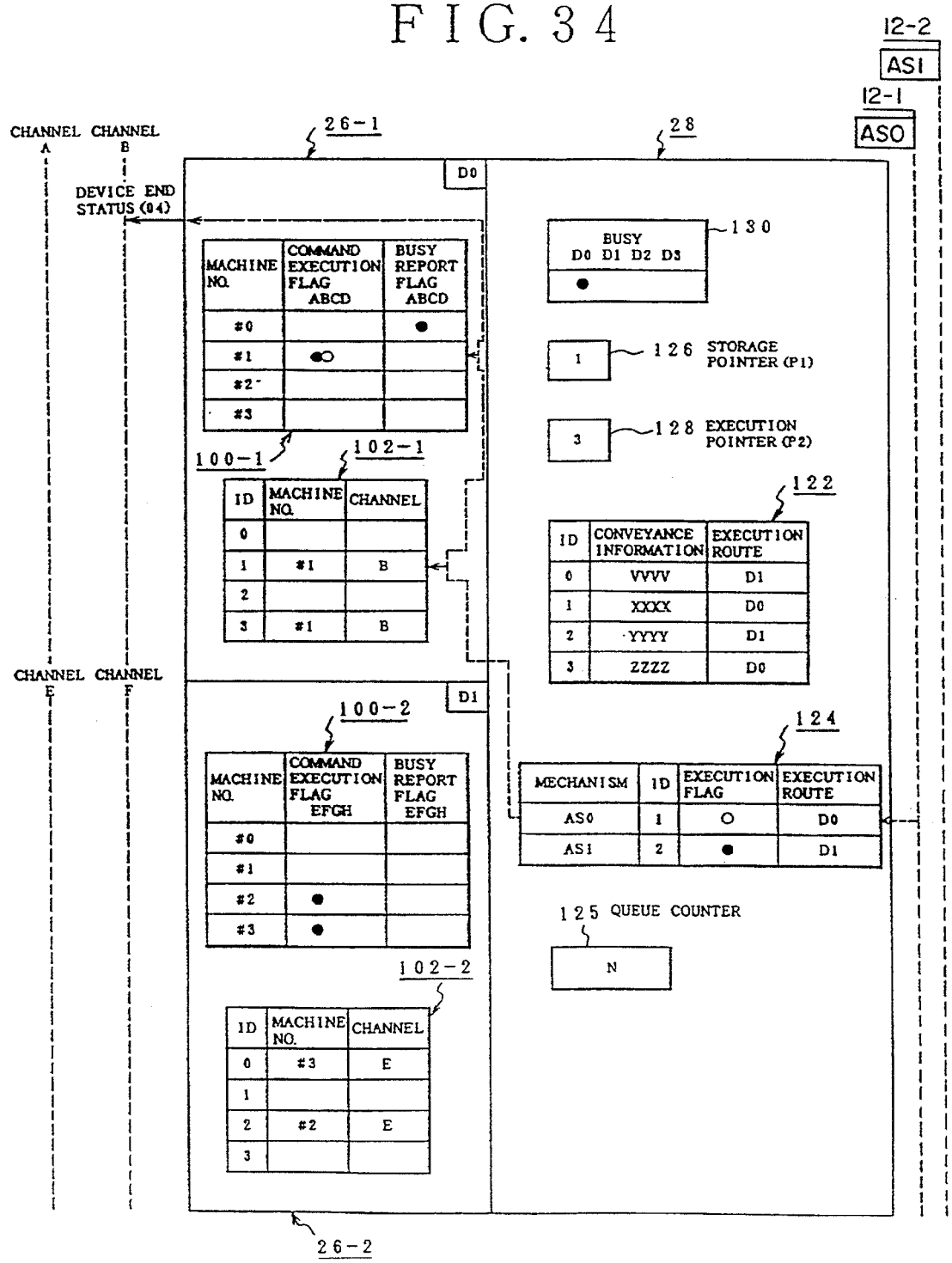
FIG. 34 is an explanatory diagram of the operation in the case where a conveyance end report is received from an accessor.

Following to FIG. 33, FIG. 34 shows the operation when the medium conveyance is finished by the accessor 12-1. When an end report of the medium conveyance is received from the accessor 12-1, namely, the machine controller 32-1, the accessor controller 28 refers to the executing state management table 124 and resets the execution flag of the accessor machine number AS0. The accessor controller 28 also transfers ID=1 which was read out from the slot of the accessor machine number AS0 to the director 26-1. The director 26-1 refers to the ID management table 102-1 while setting ID=1 which was transferred from the accessor controller 28 into a pointer and reads out the machine number address #1 and the channel (B) indicating the channel route which have been stored in the slot of ID=1. Subsequently, the director 26-1 retrieves the command execution flag in the ID management table by the machine number address #1 and the channel (B) which were read out from the ID management table 102-1. The director 26-1 clears the corresponding command execution flag in the machine number control table 100-1. Finally, the director 26-1 reports a device end status of the code '04' indicating the end of medium conveyance to the retrieved channel (B).

Figure 35:
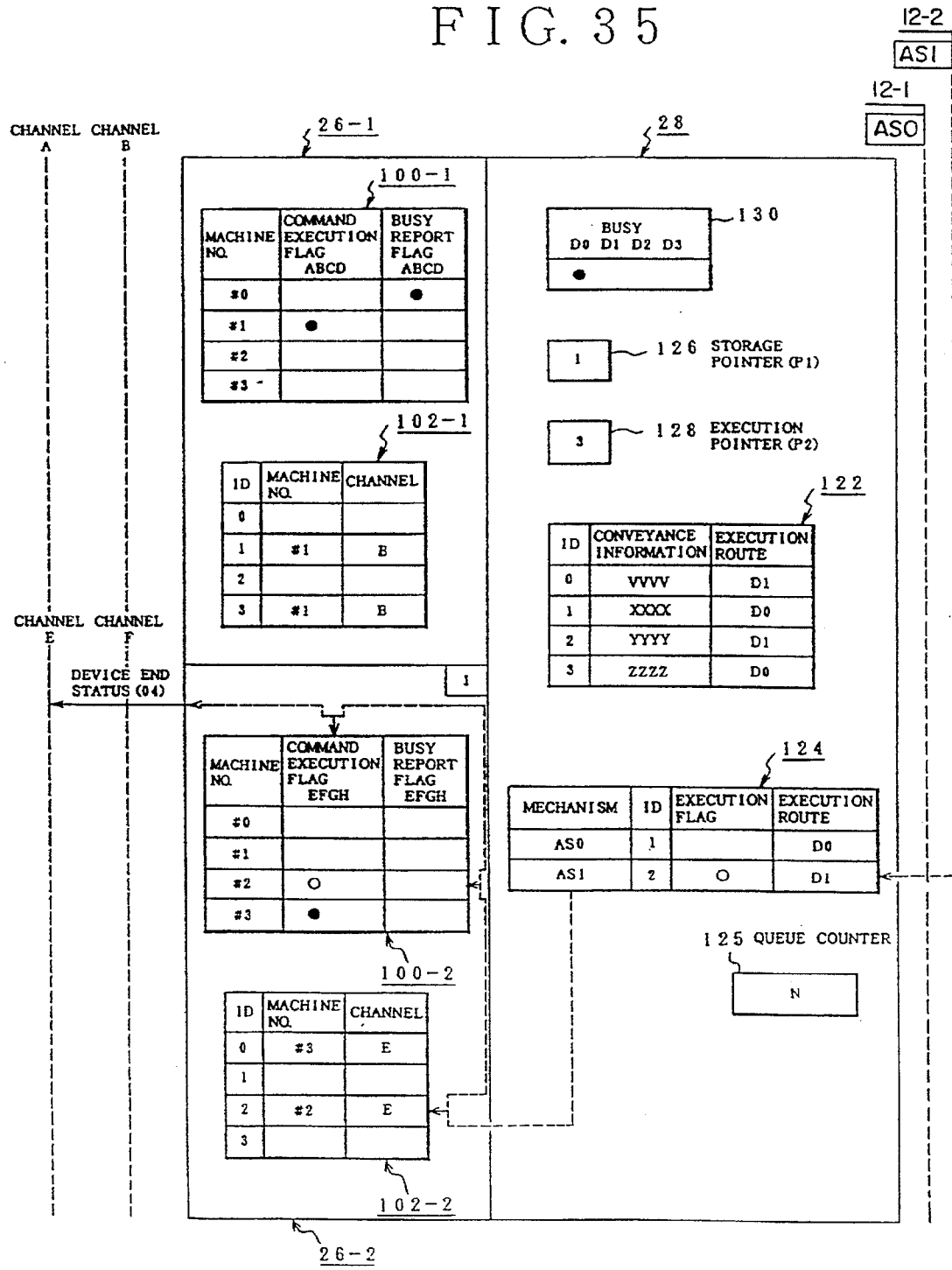
FIG. 35 is an explanatory diagram of the operation in the case where a conveyance end report is received from another accessor.

FIG. 35 shows the operation when the medium conveyance by the accessor 12-2 is finished subsequently to FIG. 34. In this case as well, upon receipt of the conveyance end report from the accessor 12-2, specifically, the machine controller 32-2, the accessor controller 28 clears the execution flag of the accessor machine number AS1 in the executing state management table 124 and transfers ID=2 to the director 26-1. The director 26-1 refers to the ID management table 102-2 by using ID=2 as a pointer and reads out the machine number address #2 and the channel (E). Due to this, the command execution flag specified by the machine number address #2 in the machine number control table 100-2 and the channel (E) is retrieved and cleared. The device end status is reported to the retrieved channel (E).

FIG. 36 shows the operation at the time of the busy cancellation report which is executed subsequently to FIG. 35. With reference to the queue counter 125, when the count value (N) is less than the maximum storage number Nmax, it is confirmed that there is a vacancy in the queueing table 122, a busy cancellation is reported to the director 26-1. At this time, the busy flag set in the director machine number D0 in the busy management table 130 is cleared. When receiving the busy cancellation report from the accessor controller 28, the director 26-1 refers to the busy report flag in the machine control table 100-1 and reports the busy cancellation status of the code '04' to the channel (B) which reported 'device busy'. The director 26-1 also clears the busy report flag. The channel (B) which received the busy cancellation status from the director 26 recognizes that the machine number address #0 is vacant, designates the machine number address #0, and reissues the moving command which was busy at the previous time.

[Overall operation sequence]

Figure 37:
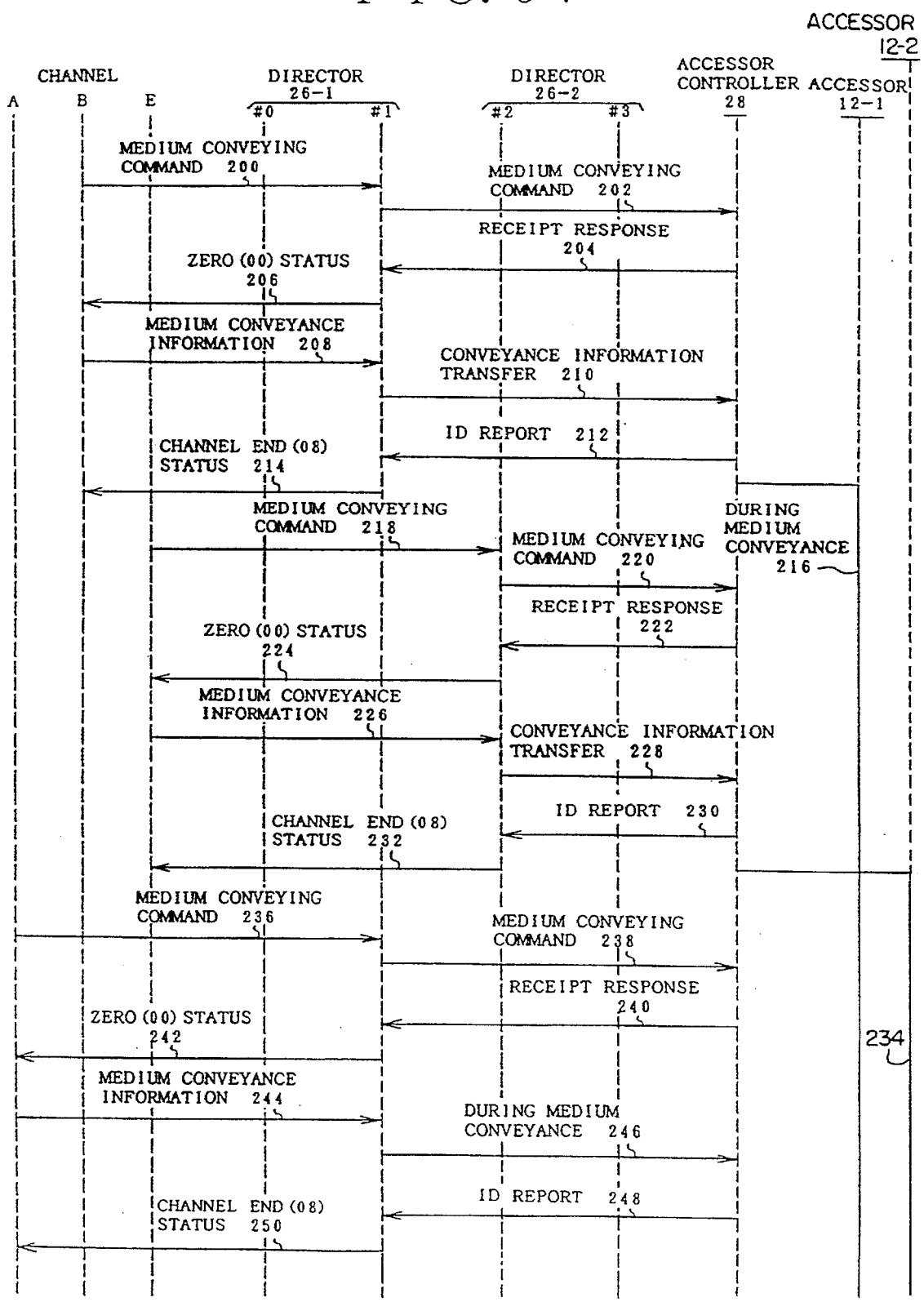
FIG. 37 is a time chart collectively showing a series of operations of FIGS. 26 to 36.
Figure 38:
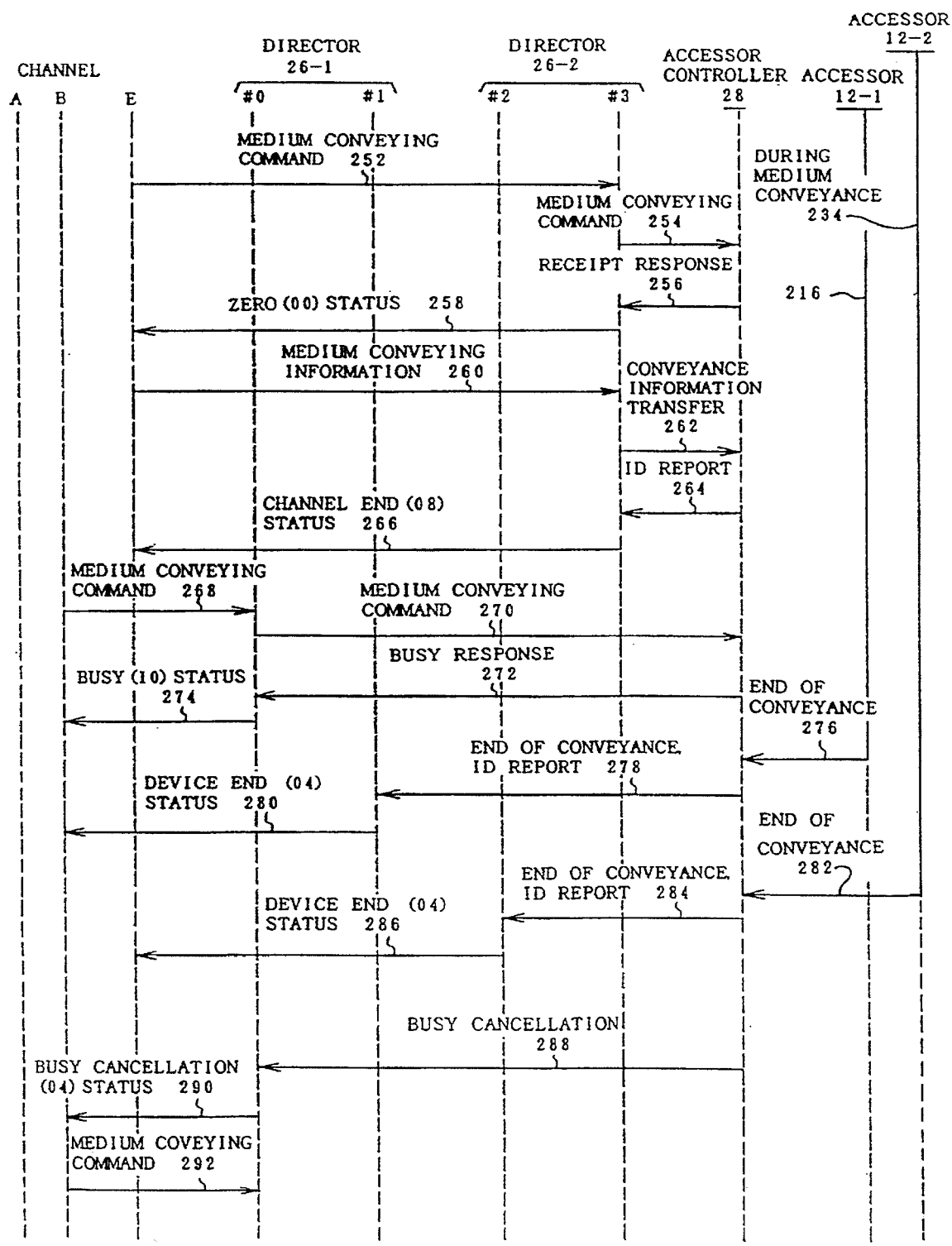
FIG. 38 is a time chart showing a continuation of FIG. 37.

Time charts of FIGS. 37 and 38 show a series of operation in FIGS. 26 to 36 in a lump. In FIG. 37, first, the machine number address #1 of the director 26-1 is designated from the channel (B) and a moving command (medium conveying command) 200 is issued. The moving command 200 is transferred to the accessor controller 28 as a medium conveying command 202, a receipt response 204 is returned, and the director 26-1 returns a zero status 206 to the channel (B). The channel (B) issues medium conveyance information 208 in response to the zero status 206. The medium conveyance information 208 is sent to the accessor controller 28 as a conveyance information transfer 210 via the director 26-1 and is stored into the queueing table 122, and an ID report 212 is returned. In return for the ID report 212, the director 26-1 reports a channel end status 214 to the channel (B). When the medium conveyance information is stored into the queueing table 122 of the accessor controller 28, the accessor 12-1 is instructed to convey the medium, so that 'during medium conveyance' 216 is obtained. The machine number address #3 of the director 26-2 is designated from the channel (E) and a moving command 218 is issued. The moving command is transferred to the accessor controller 28 as a medium conveying command 220. Since there is a vacancy in the queueing table 122, a receipt response 222 is returned. In response to the receipt response 222, the director 26-2 returns a zero status 224 to the channel (E). The channel (E) generates medium conveyance information 226. The medium conveyance information 226 from the director 26-2 is sent to the accessor controller 28 as a conveyance information transfer 228 and stored into the queueing table 122. After the storage was completed, an ID report 230 is returned. The director 26-2 returns a channel end status 232 to the channel (E). When the medium conveyance information 226 is stored into the accessor controller 28 by the conveyance information transfer 228, the accessor 12-2 is instructed to convey the medium, thereby setting the accessor 12-2 into 'during medium conveyance' 234 state. The machine number address #1 of the director 26-1 is designated from the channel (A) and a moving command (medium conveying command) 236 is issued and transferred to the accessor controller 28 as a medium conveying command 238. Since there is a vacancy in the queueing table 122, a receipt response 240 is returned and a zero status 242 is reported to the channel (A). In response to the zero status 242, medium conveyance information 244 is issued from the channel (A) and sent to the accessor controller 28 as a conveyance information transfer 246 from the director 26-1 and stored into the queueing table 122. An ID report 248 is returned and the director 26-1 reports a channel end status 250 to the channel (A).

In FIG. 38, when the machine number address #3 of the director 26-2 is designated from the channel (E) and a moving command 252 is issued, the moving command 252 is transferred to the accessor controller as a medium conveying command 254. Since there is a vacancy in the queueing table 122 at this time, a receipt response 256 is returned and reported as a zero status 258 to the channel (E). In response to the zero status 258, medium conveyance information 260 is issued from the channel (E) and transferred to the accessor controller 28 as a conveyance information transfer 262 via the director 26-2 and stored into the queueing table 122. After the storage was completed, an ID report 264 is returned and a channel end status 266 is reported to the channel (E). Further, the machine number address #0 of the director 26-1 is designated from the channel (B) and a moving command 268 is issued and notified as a medium conveying command 270 to the accessor controller 28. Since the queueing table 122 is in the full state because of the previous receipt of the moving command 252, however, a busy response 272 is returned and a busy status 274 is reported to the channel (B). When the medium conveyance by the accessor 12-1 in execution is finished and an end of conveyance 276 is notified to the accessor controller 28 after that, an end of conveyance and ID report 278 is executed to the director 26-1. A device end status 280 is reported to the channel (B). Subsequently, when an end of conveyance 282 by the accessor 12-2 is reported to the accessor controller 28, an end of conveyance and ID report 284 is executed to the director 26-2. A device end status 286 is reported to the channel (E). Subsequently, the accessor controller 28 confirms a vacancy in the queueing table 122 and notifies a busy cancellation 288 to the director 26-1. The director 26-1 reports a busy cancellation status 290 to the channel (B). In response to it, the channel (B) again generates a same moving command 292 as the moving command 268 issued at the previous time.

[Processing operation of the activation processing section of the director]

Figure 39:
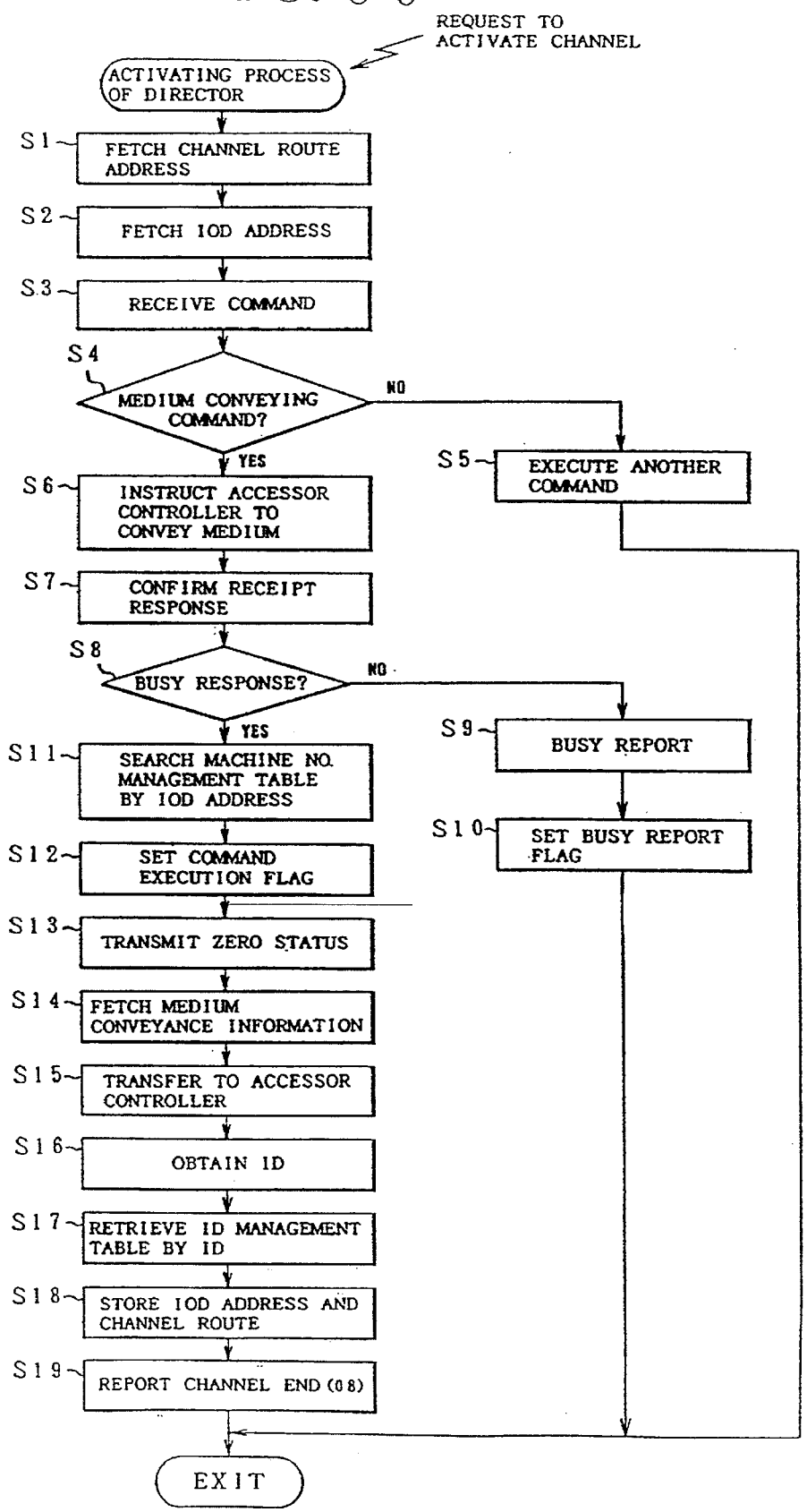
FIG. 39 is a flowchart showing the processing operation of an activation processing section provided for the director FIG. 19.

A flowchart of FIG. 39 shows the processing operation of the activation processing section 92 provided for the director in FIG. 19. The activation processing section 92 mainly receives a moving command from the channel and instructs a medium conveyance or the like to the accessor controller. When there is a channel activation request from the channel by issuing a moving command, an address of the channel route on which the activation was requested is fetched in step S1 and, further, a command is received in step S3. In step S4, the command received in step S3 is decoded and a check is made to see if it is a moving command or not. When it is not a moving command, step S5 follows and another command is processed. When it is a moving command, step S6 follows and a medium conveyance is instructed to the accessor controller. In step S7, a receipt response is checked. A check is made in step S8 to see if the receipt response from the accessor controller is a busy response or not. If there is no vacancy in the queueing table 122 and a busy response was returned, a busy report is sent to the channel in step S9 and a busy report flag is set into the machine number control table. When it is not a busy response in step S8, step S11 follows and the machine number control table is retrieved by the machine number address #i fetched in step S2 and a command execution flag is set to the slot position of the corresponding channel. Subsequently, a zero status is reported to the channel in step S3. In return for the report of the zero status, medium conveyance information is issued from the channel side. The medium conveyance information is fetched in step S14 and transferred to the accessor controller 28 in step S15. After the medium conveyance information for the queueing table 17-2 was stored on the accessor controller 28 side, an ID number is returned. In step S16, the ID number is received. An ID management table is retrieved by using the ID number obtained in step S17 as a pointer. In step S18, a channel route address fetched in step S1 showing the machine number address #i and the channel route is stored. Finally, a channel end status is reported to the channel in step S19.

[Processing operation of the idle processing section of the director]

Figure 40:
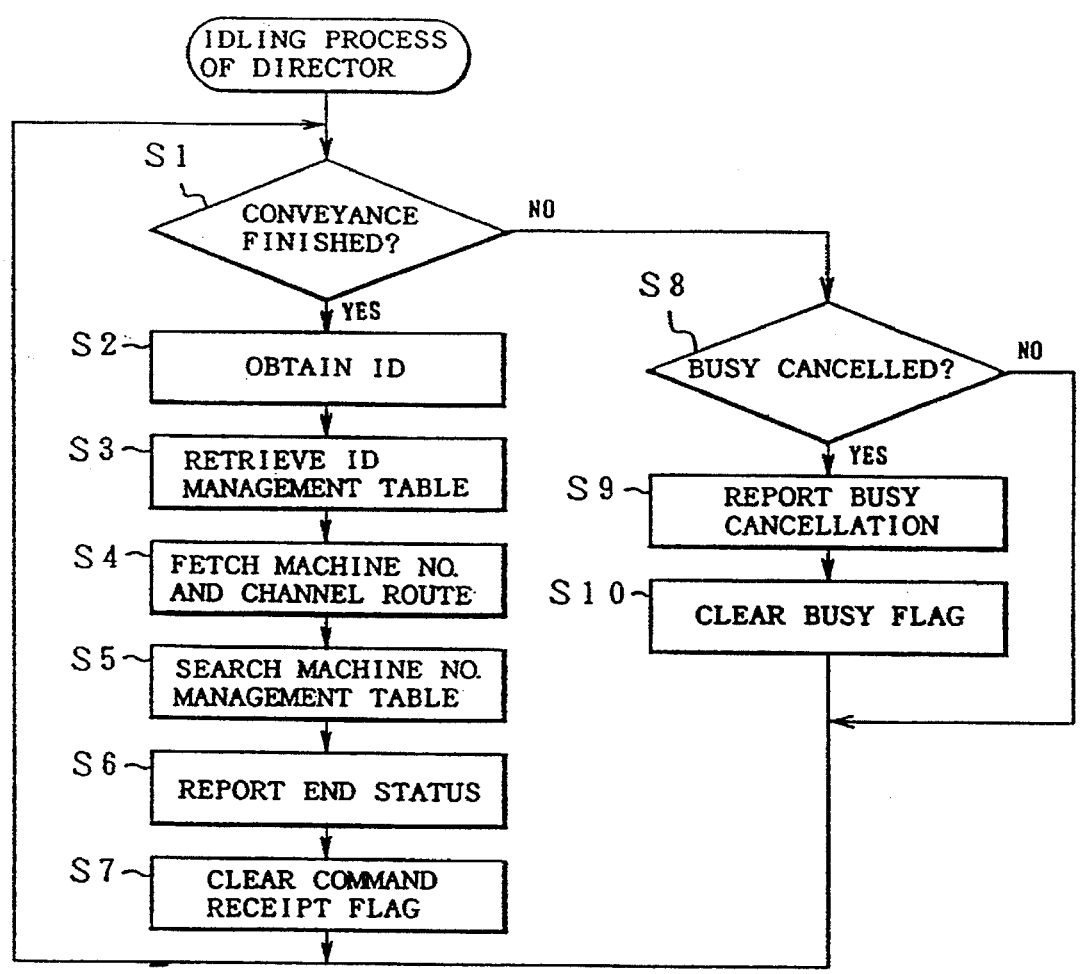
FIG. 40 is a flowchart showing the processing operation of an idle processing section provided for the director in FIG. 19.

A flowchart of FIG. 40 shows the processing operation of the idle processing section 94 provided for the directors 26-1 and 26-2 in FIG. 19. The idle processing section 94 monitors mainly the end of medium conveyance from the accessor controller 28 and sends an end report to the channel. As for the director 26-1 as an example, a conveyance end command from the accessor controller 28 has been confirmed in step S1. When the conveyance end command is received, step S2 follows and the ID number sent from the accessor controller 28 is obtained. In step S3, the ID management table 102-1 is retrieved by the ID number obtained. The corresponding machine number address #i and the channel route address are extracted in step S4. Subsequently, the ID management table 102-1 is retrieved by the machine number address #i and the channel route address in step S5. A conveyance end status is reported to the channel in the corresponding channel address in step S6. In step S7, a command receipt flag in the machine number control table 100-1 is cleared. On the other hand, when there is no conveyance end report from the accessor controller 28 in step S1, step S8 follows and the presence or absence of the busy cancellation report is checked. When the busy cancellation report is received, a busy cancellation status is reported to the channel route which executed the busy report in step S9 and a Busy report flag in the machine number control table 100-1 is cleared in step S10.

[Processing operation of the activation processing section of the accessor controller]

Figure 41:
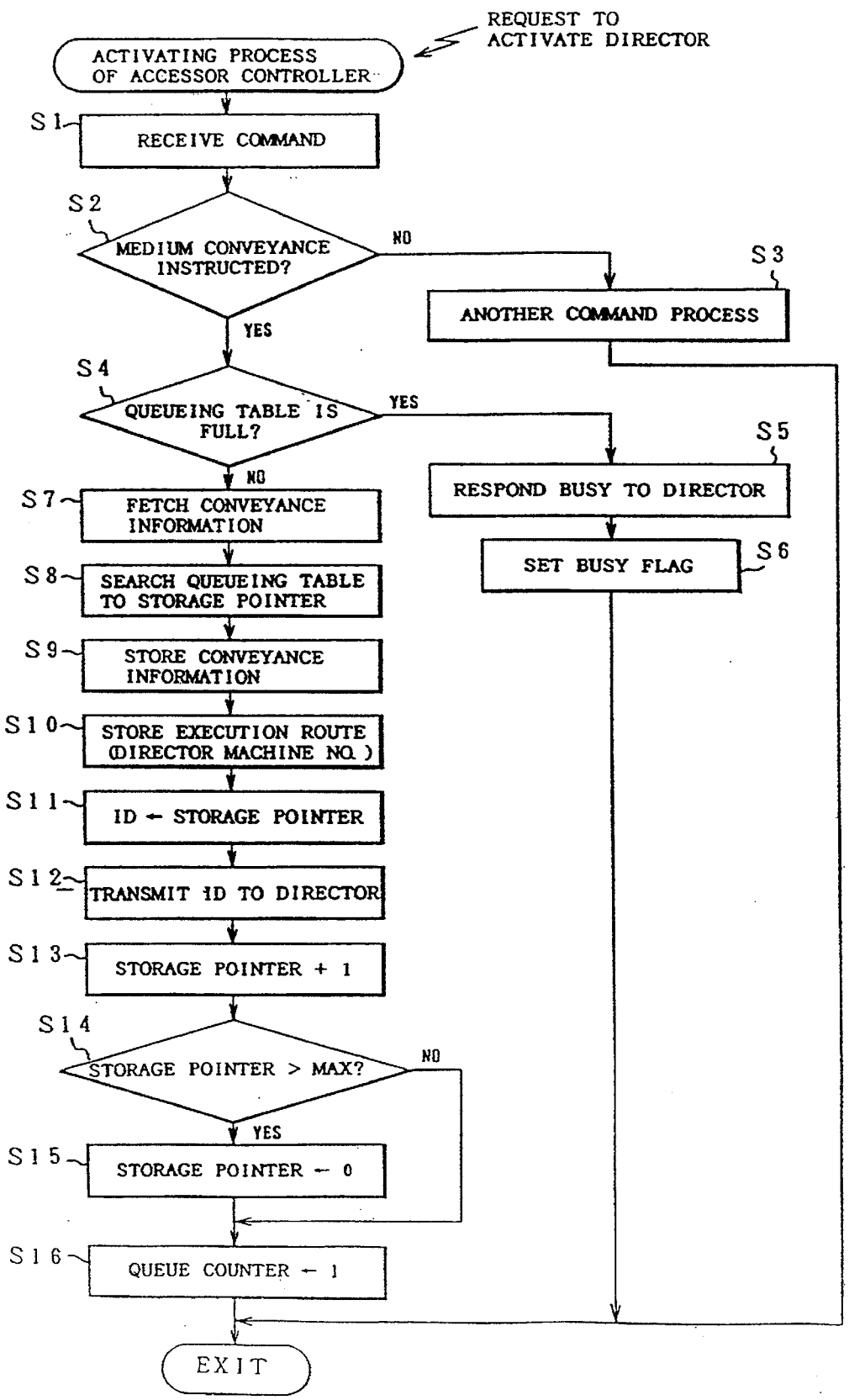
FIG. 41 is a flowchart showing the processing operation of an activation processing section provided for an accessor controller in FIG. 20.

A flowchart of FIG. 41 shows the processing operation of the activation processing section 114 of the accessor controller 28 shown in FIG. 20. The activation processing section 114 mainly receives an activation request command of the director 26-1 or 26-2. When the activation request command is a medium conveying command, the medium conveyance information is stored into the queueing table 122. For example, when the command from the director 26-1 is received in step S1, a check is made to see if the command is a medium conveying command or not in step S2. When it is not the medium conveying command, step S3 follows and another command process is executed. When it is the medium conveying command, step S4 follows and a vacant state of the queueing table 122 is checked, that is, a check is made to see if the queueing table 122 is in a full state or not. Specifically speaking, with reference to the count value (N) of the queue counter 125 shown in FIG. 21, when it coincides with the maximum storage number Mmax of the queueing table 122, it is judged that the queueing table 122 is in the full state, and processes in steps S5 and S6 are executed. That is, a busy report is sent to the director and a busy flag is set into the busy management table. On the other hand, when the count value (N) of the queue counter 125 is less than the maximum storage number Nmax and there is a vacancy in the queueing table 122, step S7 follows and the medium conveyance information from the director 26-1 is fetched. Subsequently, in step S8, an ID number in the queueing table 122 is searched by the storage pointer 126 and the medium conveyance information is stored into the slot of the ID number searched in step S9. Further, the director machine number indicating the route of the director 26-1 is stored in the position of the corresponding execution route of the same slot in the queueing table 122. When such a storage into the queueing table 122 is finished, the value P1 of the storage pointer 126 is set to the ID number in the queueing table 122 after completion of the storage in step S11. The ID number is transmitted to the director 26-1 in step S12. Subsequently, the value P1 of the storage pointer 126 is increased by one to designate the next storing position in step S13. In step S14, a check is made to see if the value P1 of the storage pointer 126 exceeds the maximum value MAX=3 or not. When the value exceeds MAX=3, step S15 follows and the value P1 of the storage pointer 126 is cleared to P1=0. That is, when the value P1 of the storage pointer 126 is set to MAX=3, P1=0, 1, 2, 3 is sequentially repeated in accordance with this order. In step S16, the value of the queue counter 125 is increased by one.

[Processing operation of the idle processing section of the accessor controller]

Figure 42:
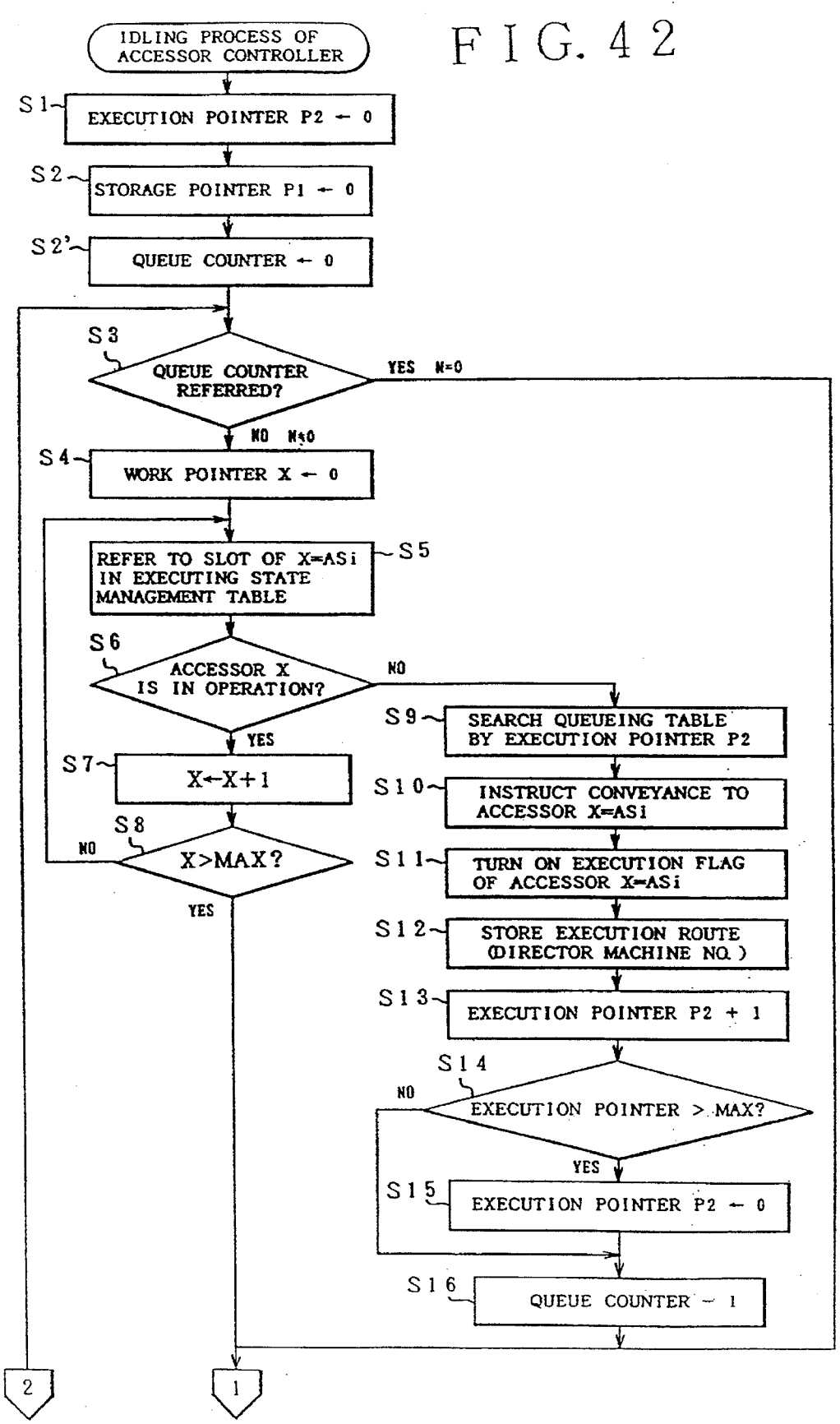
FIG. 42 is a flowchart showing the processing operation of an idle processing section provided for the accessor controller in FIG. 20.
Figure 43:
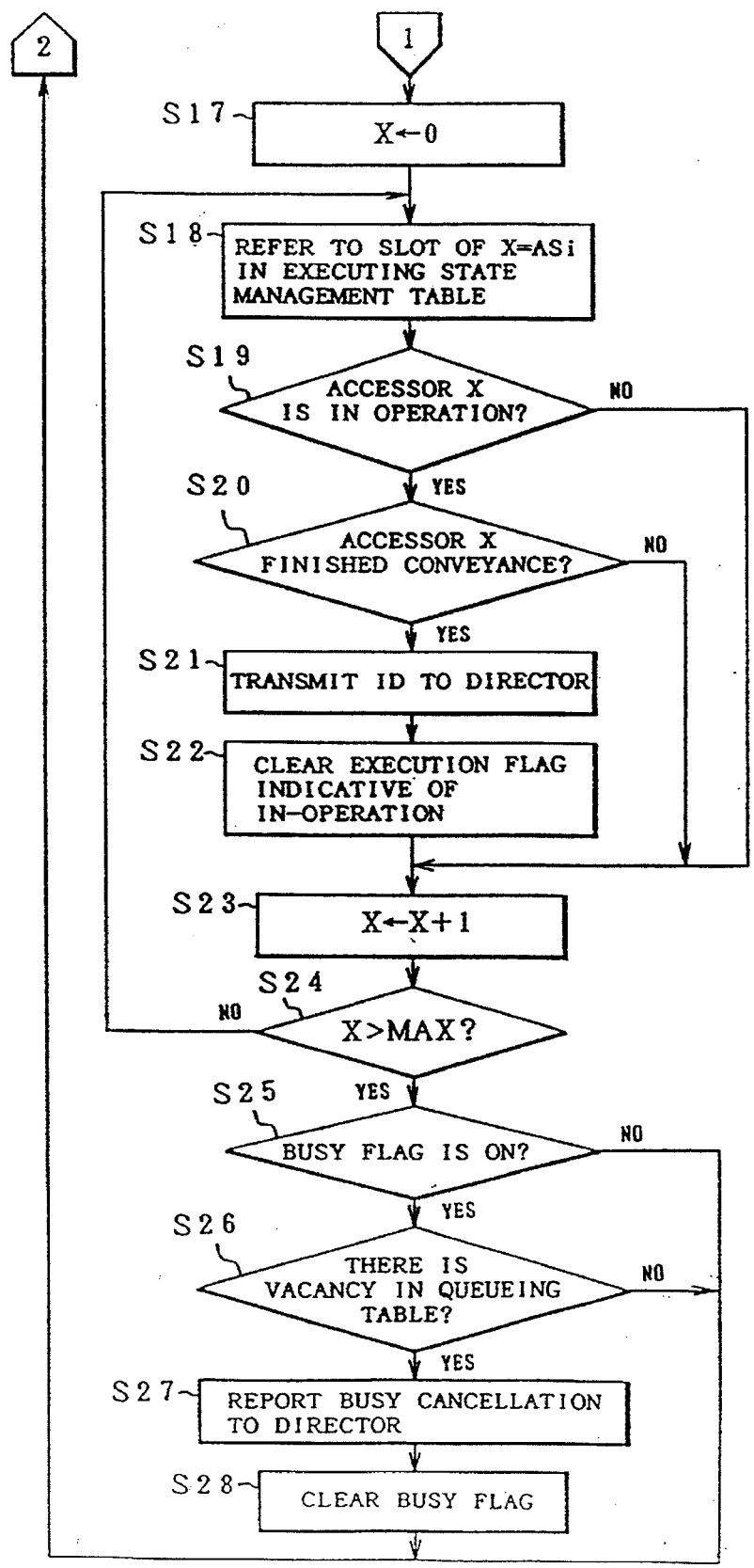
FIG. 43 is a flowchart showing a continuation of FIG. 42.

Flowcharts of FIGS. 42 and 43 show the processing operation of the idle processing section 116 of the accessor controller 28 shown in FIG. 20. The idle processing section 116 mainly instructs the conveyance to the accessors 12-1 and 12-2 and monitors the end of the medium conveyance and reports the end of the conveyance to the director. First, an initialization process at the time of turn-on of a power source or at the time of resetting is executed in steps S1 and S2. That is, the value P2 of the execution pointer 128 is cleared to 0 in step S1. The value P1 of the storage pointer 126 is cleared to 0 in step S2 and, further, the count value (N) of the queue counter 125 is cleared to 0 in step S2'. In step S3, the queue counter 125 is referred and if N=0, since the queueing table 122 is in a vacant state in which no medium conveying command to be executed is left in the queueing table 122, the processes in step S16 and subsequent steps in FIG. 43 are executed. When the value (N) of the queue counter 125 is equal to 1 or more, since at least one medium conveyance information has been stored in the queueing table 122, the process to instruct the conveyance to the accessors 12-1 and 12-2 shown in steps S4 to S15 is executed. First, a work pointer X is cleared to X=0 in step S4, a slot of the accessor machine number ASi which is designated by the work pointer X=0 in the executing state management table 124 is referred in step S5. By referring to the executing state management table 124, a check is made to see if an accessor 12-i designated as X=ASi is in operation or not from the operation flag. If it is in operation, the work pointer X is increased by one (X=1) in step S7. If it doesn't exceed the total accessor number MAX in step S8, the processing routine is returned again to step S5 and the executing state management table is referred by using the updated channel pointer X. If the accessor of the executing state management table 124 which was referred as a work pointer X=ASi is not in operation in step S6, step S9 follows. In step S9, the queueing table 122 is searched by setting a value P2 of the execution pointer 128 to (P2=ID), the conveyance based on the medium conveyance information which was read out from the queueing table 122 is instructed to the accessor 12-i of the machine number ASi selected by the work pointer X.

When the conveyance is instructed to the accessors 12-1 and 12-2, the execution flag of the executing state management table 124 in which the accessor machine number ASi which is designated by the work pointer X which instructed the conveyance is set to a pointer is turned on in step S11. A director machine number Di indicating the execution route of the same slot is stored in step S12. Further, the value P2 of the execution pointer 128 is increased by one in step S13 and the position of the queueing table 122 to be executed next is designated. Subsequently, a check is made to see if the value P2 of the execution pointer 128 exceeds the total slot number (total entry number) MAX of the queueing table 122 or not in step S14. If it exceeds, step S15 follows and the pointer value P2 of the execution pointer is cleared to 0

(P2=0). Further, the count value of the queue counter is decreased by one in step S16. Therefore, 0, 1, 2, ... MAX are repeated within a range of the slot number MAX of the queueing table 122 of the value P2 of the execution pointer 128.

Steps S17 to S23 in FIG. 43 show the processes at the time of the end of the medium conveyance. First, the work pointer X is cleared to (X=0) in step S17. The slot of the accessor machine number ASi which is designated by the work pointer X in the executing state management table 124 is referred in step S17. A check is made in step S19 to see if the accessor having the accessor machine number X=ASi is in operation or not by discriminating whether the execution flag has been set or not. If it is in operation, step S20 follows and the report of the conveyance end is confirmed. When the conveyance end report is confirmed, the ID number of the slot which is designated by the accessor machine number of X=ASi in the executing state management table 124 is transmitted to the director in step S21. In step S22, the execution flag indicating that the same slot is in execution is cleared and, further, the value (N) of the queue counter 125 is decreased by one. When the accessor is not in operation in step S19 or when the end of conveyance is not confirmed in step S20, the processing routine advances to the processes in step S23 and subsequent steps. In step S23, the work pointer X is increased by one. After the end of conveyance was confirmed with respect to all of the accessors 12-1 and 12-2 in step S24, step S25 follows. A check is made to see if the busy flag in the busy management table has been turned on or not in step S25. When the busy flag is ON, step S26 follows. When the value (N) of the queue counter 125 is less than the maximum storage number Nmax, it is judged that there is a vacancy in the queueing table 122 is judged and a busy cancellation is reported to the director 26-1 in step S27. The busy flag in the busy management table 130 is cleared in step S27. When the busy flag is not set in step S26 or when there is no vacancy in the queueing table 122 in step S26, the processing routine is returned to the process in step S3 in FIG. 42.

As mentioned above, according to the present invention, the library apparatus provides a plurality of logical machine number addresses to the upper channel, so that the medium conveyance information in association with the moving command from the upper-order unit can be continuously received and stored into the queueing table 122. The command can be efficiently communicated with the upper-order unit. It is also possible to store a plurality of medium conveyance information into the queueing table 122 and to make a plurality of medium conveyance mechanisms operative simultaneously. Therefore, the conveying ability of the medium is improved and the performance of the library apparatus can be considerably improved.

The invention is not limited by the number shown in the above embodiments. The number of directors, the number of channels for the directors, the number of accessors which can be simultaneously operated, the number of machine number addresses as input/output logic addresses depending on the number of the accessors which can be operated simultaneously, and further, the number of slots (the number of entries) of the queueing table can be properly decided as necessary.

[Library apparatus having command queue]

Figure 44:
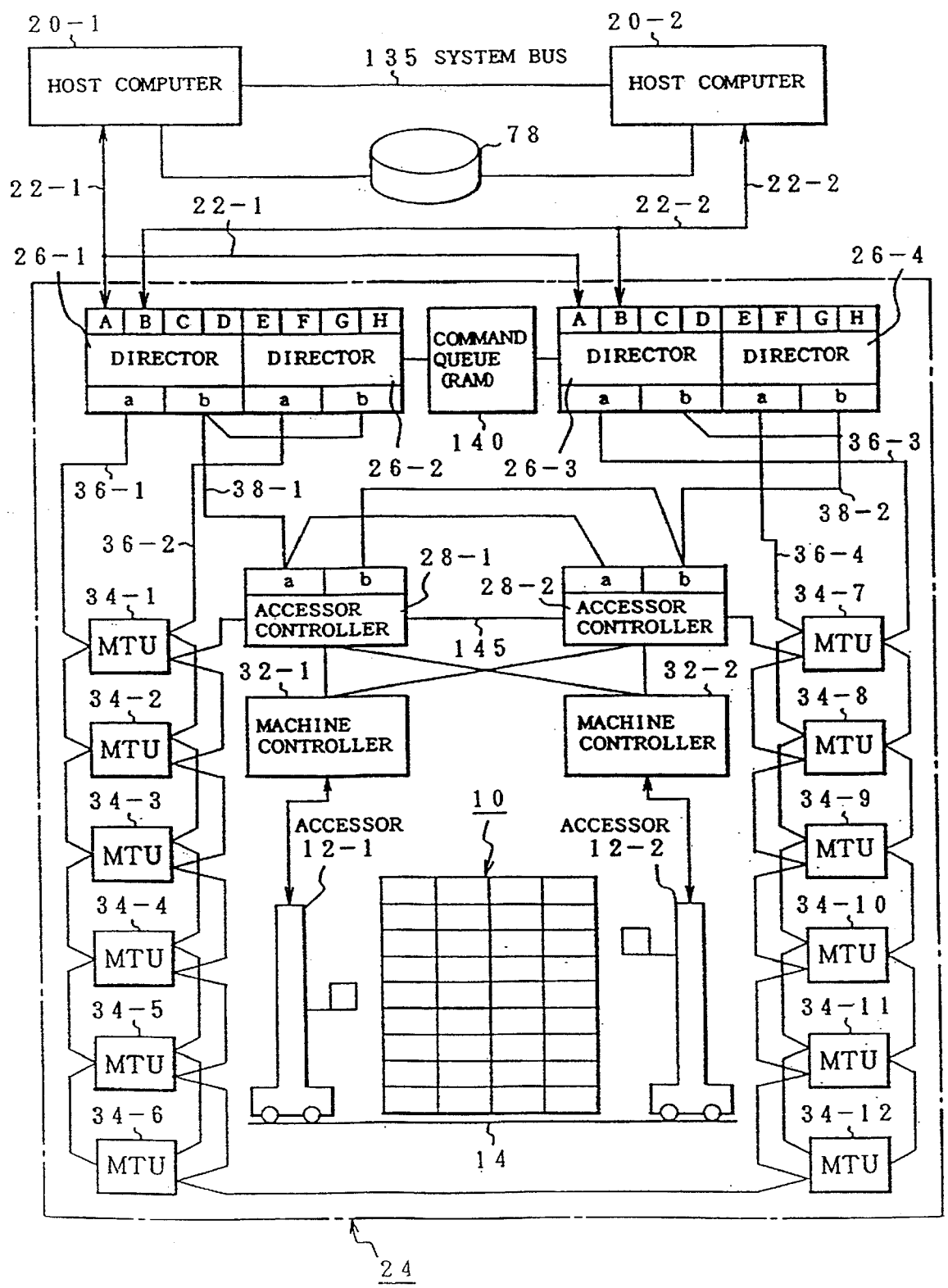
FIG. 44 is a block diagram showing the second embodiment of the invention.

FIG. 44 shows a hardware construction of the library apparatus according to the second embodiment of the invention. In the embodiment, a command queue 140 is newly provided for the directors 26-1 to 26-4. The medium conveyance information generated in association with the moving commands from the host computers 20-1 and 20-2 by two paths of the channel interface buses 22-1 and 22-2 is stored into the command queue 140. The medium conveyance information once stored in the command queue 140 is read out by a command allocating section of the director 26-1 or 26-2 which received the moving command so that an optimum medium conveyance control can be realized and is allocated to the main accessor controller 28-1. Thus, the accessor controller 28-1 makes the two accessors 12-1 and 12-2 operative simultaneously through the machine controllers 32-1 and 32-2, thereby allowing the conveying operation of the medium cartridge to be executed between the cell block 10 and the recording and reproducing apparatuses 34-1 to 34-12. For example, a dual port RAM which can be accessed from both of the directors 26-1 and 26-2 side and the directors 26-3 and 26-4 side is used as a command queue 140.

Two host computers 20-1 and 20-2 are used and connected by the system bus 135 and commonly use the magnetic disk apparatus 78. The construction other than the above is substantially the same as the hardware construction of FIG. 15.

Figure 45:
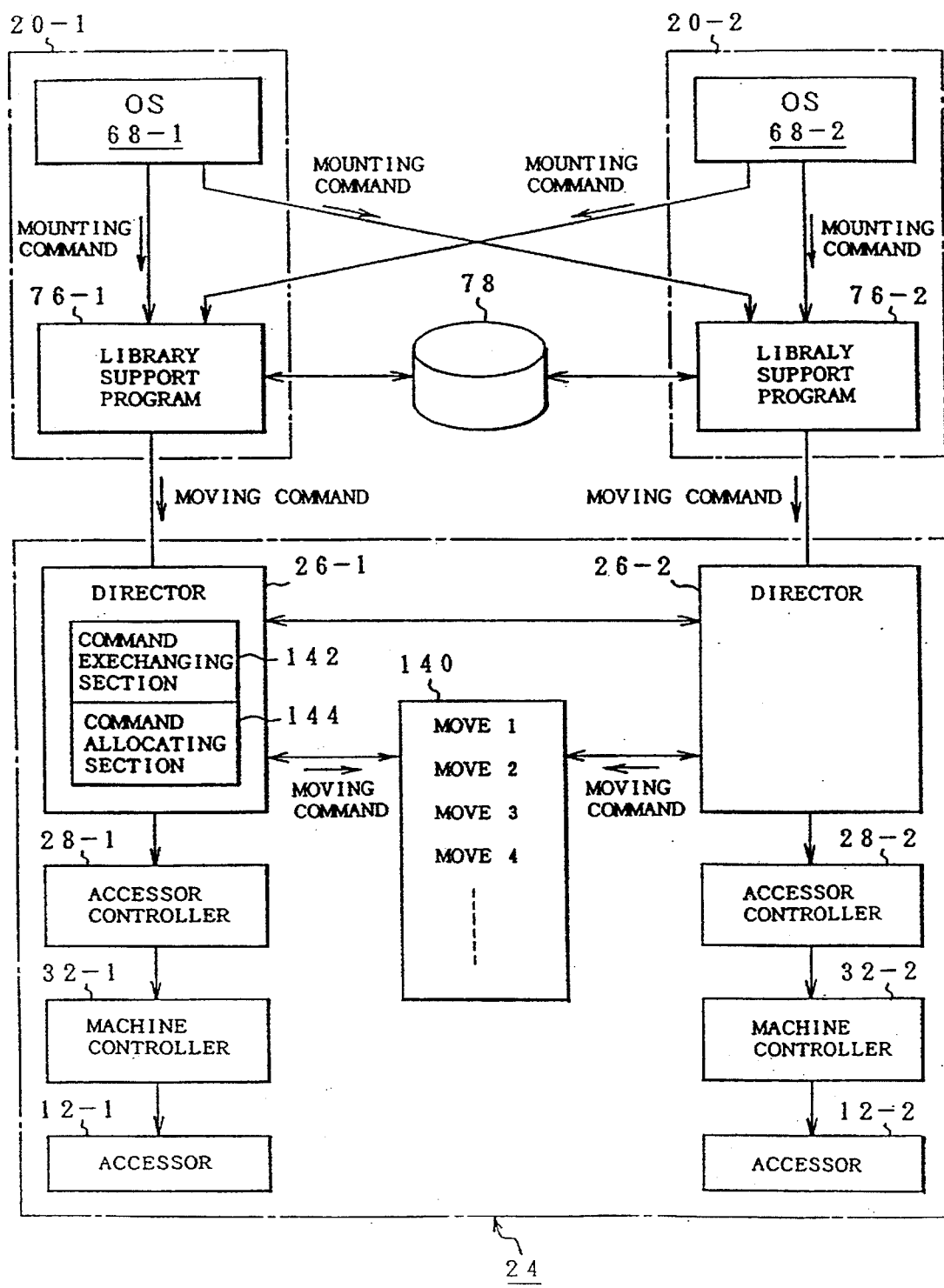
FIG. 45 is a block diagram showing a processing function in FIG. 44.

FIG. 45 shows the functions of the library apparatus of FIG. 44 together with the program structure on the host computer side. The host computers 20-1 and 20-2 have OS (operating systems) 68-1 and 68-2 and library support programs 76-1 and 76-2 for the library apparatus 24 of the invention as a target, respectively. By using a control table stored in the external magnetic disk apparatus 78, a moving command and the medium conveyance information serving as a command parameter of the moving command are formed for the library support programs 76-1 and 76-2. That is, each of the OS 68-1 and 68-2 generates a reading command or a writing command of the medium cartridge which is dealt by the library apparatus 24 according to the self application program as a mounting command to the library support programs 76-1 and 76-2. Each of the library support programs 76-1 and 76-2 which received the mounting command generates a moving command as an I/O start command which designates the logic address of the library apparatus 24. When there is an acceptable response from the library apparatus 24, medium conveyance information comprising a moving side address and a moving destination address and indicative of the position to take out the medium is issued. Further, the OS 68-1and 68-2 of the host computers 20-1 and 20-2 access the library support program of another host computer when the self library support programs 76-1 and 76-2 executed the mounting command which had already been generated and are in the busy state. When it is vacant, a moving command can be issued by using the library support program of another host computer. Such medium conveyance information including the moving side address and the moving destination address generated from the host computers 20-1 and 20-2 is received by the corresponding director 26-1 or 26-3 of the library apparatus 24 and is stored and held into the command queue 140 which is commonly provided, for example, as shown in MOVE1 to MOVE4. The medium conveyance information MOVE1 to MOVE4 stored in the command queue 140 are read out by a command allocating section 144 provided on the director 26-1 side on the primary side. In this case, the medium conveyance information is taken out from the command queue 140 and allocated to the accessor controllers 28-1 and 28-2 so that the accessors 12-1 and 12-2 can be simultaneously operated under the control of the machine controllers 32-1 and 32-2. The cell address in the library apparatus 24 shown in FIG. 44 is as shown in FIG. 18. A command exchanging section 142 is further provided to the directors 26-1 and 26-2. The command exchanging section 142 uses a vacant time during the medium conveyance operations of the accessors 12-1 and 12-2 and exchanges the executing procedure of a plurality of medium conveyance information stored into the command queue 140 on the basis of the simulation so as to optimize the executing procedure.

The processing procedure between the host computer and the library apparatus is as mentioned below.

I. A moving command as an I/O start command in which the host computer designates the logical address is issued.

II. The director which received the moving command checks a vacancy in the command queue 140 and returns the acceptable response when there is a vacancy. When there is no vacancy in the command queue 140, a busy response is returned.

III. The host computer which received the acceptable response generates the medium conveyance information.

VI. The director which received the medium conveyance information is stored into the command queue 140.

V. The director extracts the medium conveyance information from the command queue and sends to the accessor controller and allows the accessor to execute the conveying operation of the medium via the machine controller.

VI. When the conveying operation of the medium by the accessor is finished, the director notifies the end of the execution of the command to the host computer.

Figure 46:
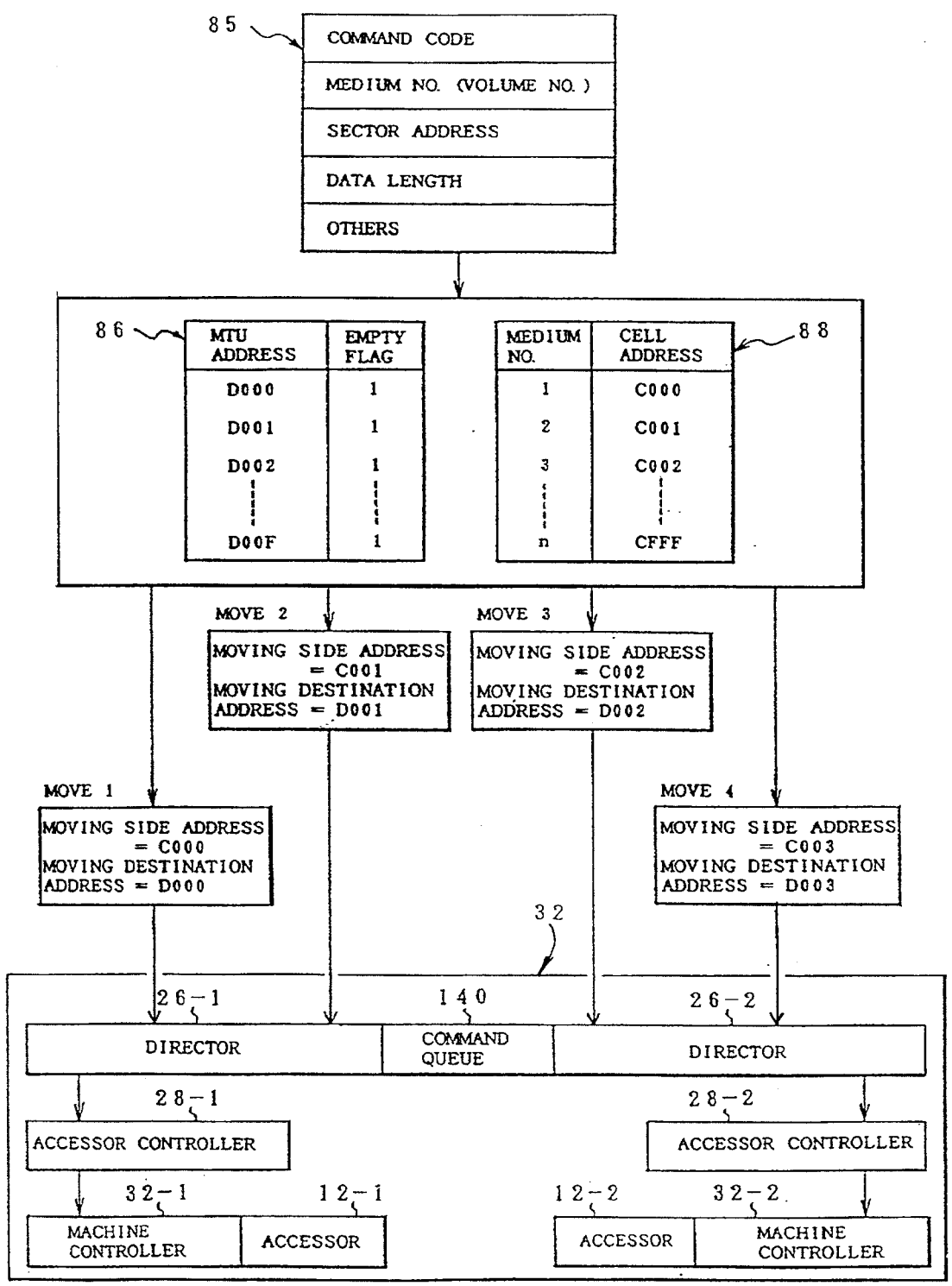
FIG. 46 is an explanatory diagram showing a generating function of medium conveyance information by a library support program.

FIG. 46 shows a state in which four medium conveyance information MOVE1 to MOVE4 are issued from the library support program 76. The library support program 76 first refers to the cell table 88 according to the medium number from the OS and obtains, for example, a cell address=C000 which indicates the position where the medium is enclosed. Simultaneously, the library support program 76 refers to the MTU table 86 and obtains, for example, an MTU address= D000 in which the head empty flag is set to '1' and which is in an unused state is obtained. The medium conveyance information MOVE1 in which the cell address C000 obtained from the cell table 88 is set to the moving address and the MTU address D000 obtained from the MTU table 86 is set to the moving destination address is generated to the library apparatus 24. With respect to the remaining medium conveyance information MOVE2 to MOVE4, cell addresses and MTU addresses as shown in the diagram are generated in correspondence to each mounting command. In FIG. 46, the generation of the four medium conveyance information MOVE1 to MOVE4 to convey the medium cartridge from the cell block to the recording and reproducing apparatus are shown as an example. When the writing or reading operation is completed after the medium cartridge was conveyed to the recording and reproducing apparatus and loaded, it is necessary to return the cartridge to the cell address in the original cell block from the recording and reproducing apparatus. Therefore, the library support program 76 simultaneously forms the medium conveyance information for returning corresponding to the medium conveyance information MOVE1 to MOVE4. The medium conveyance information for returning is issued as a moving command for returning after the notification of the completion status of the writing or the reading operation was received from the library apparatus 24.

Figure 47:
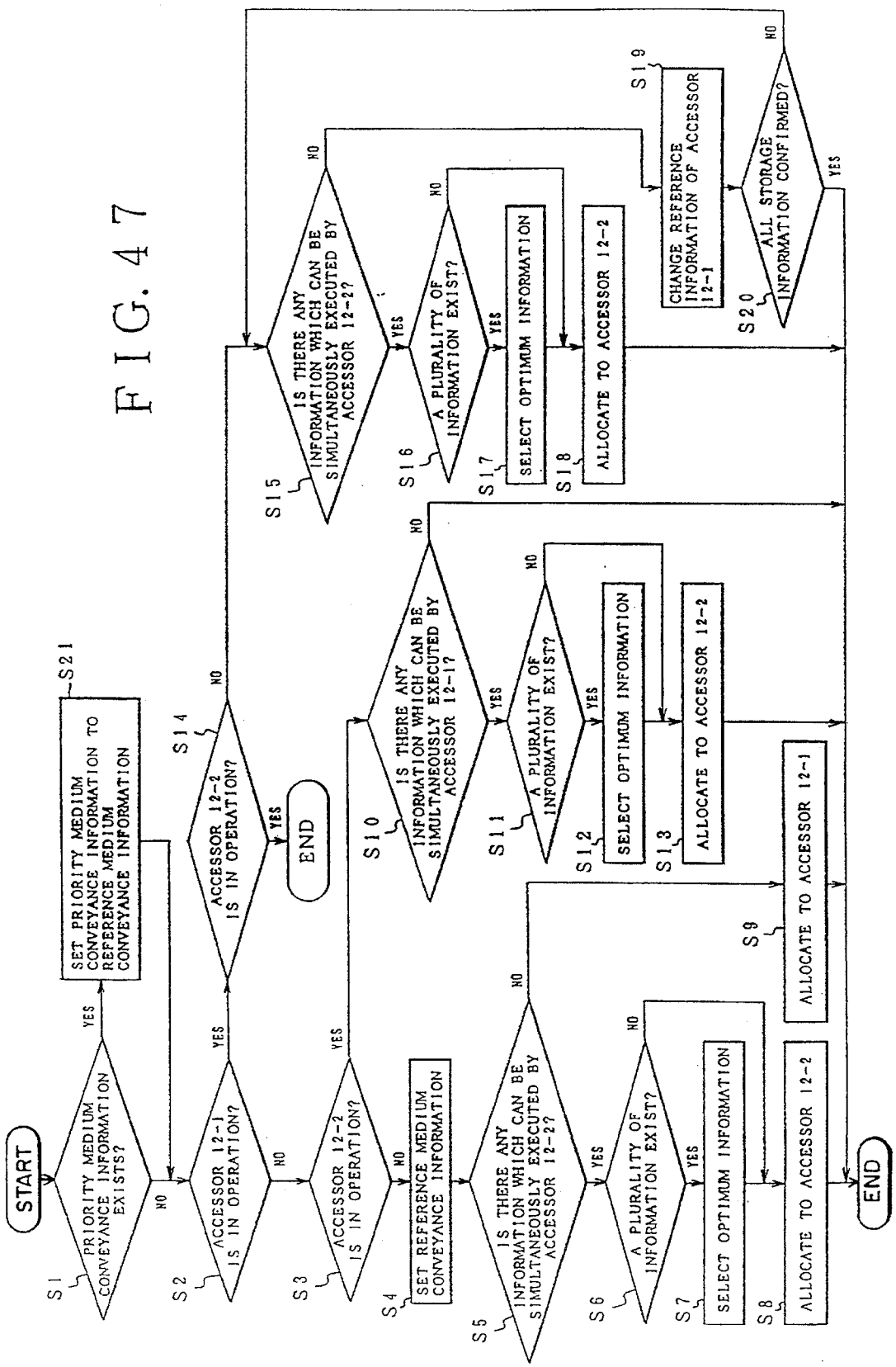
FIG. 47 is a flowchart showing the processing operation in FIG. 45.

A flowchart of FIG. 47 shows the processing operation based on the medium conveyance information stored in the command queue 140 by the command allocating section 144 provided for the director 26-1 in FIG. 45. This process is divided into the following four modes (Mode 1 to Mode 4) in accordance with the states of the accessors 12-1 and 12-2.

Mode 1: Both of the accessors 12-1 and 12-2 are in a standby state.

Mode 2: The accessor 12-1 is operating and the accessor 12-2 is in a standby state.

Mode 3: The accessor 12-1 is in a standby state and the accessor 12-2 is operating.

Mode 4: Both of the accessors 12-1 and 12-2 are operating.

[Process in Mode 1]

The process in Mode 1 is executed when both of the accessors 12-1 and 12-2 are in a standby state (ready state). In Mode 1, the medium conveyance information transferred from the host computers 20-1 and 20-2 is stored into the command queue 140. When a predetermined command extracting condition is satisfied, the process in FIG. 47 is started. The command extracting condition is such that at least two medium conveyance information are stored into the command queue 140. A proper command extracting condition can be also decided as necessary.

Figure 49:
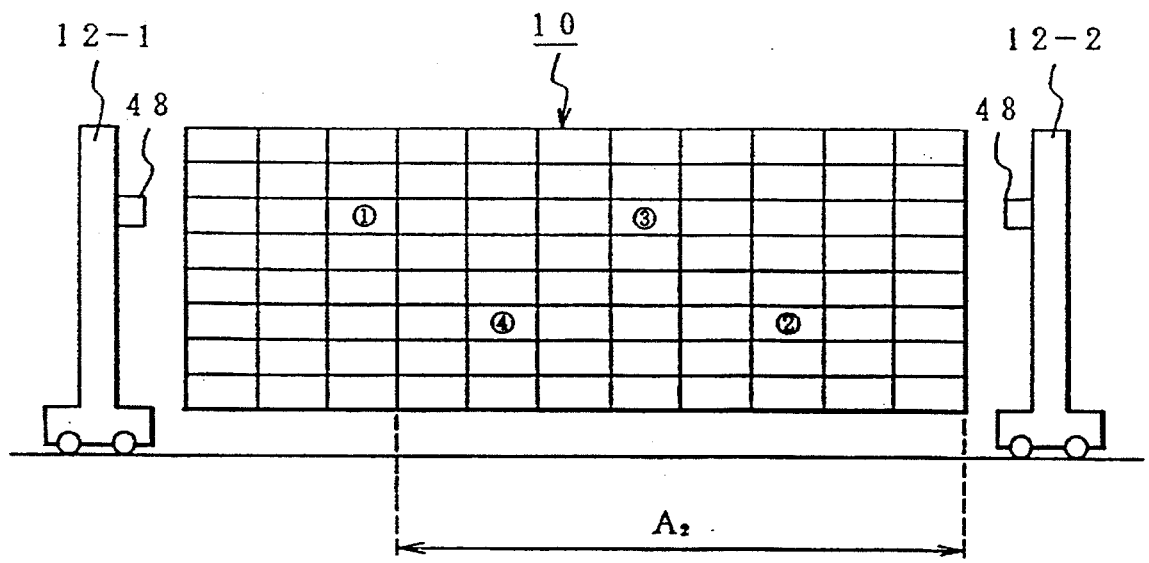
FIG. 49 is an explanatory diagram showing a relation between the medium conveyance information of a command queue and the cell address.

When the command extracting condition of the command queue 140 is satisfied and the process in FIG. 47 is started, the presence or absence of the priority medium conveyance information is checked in step S1. In this instance, the priority medium conveyance information denotes medium conveyance information such that the elapsed time from a time point when the medium conveyance information was stored into the command queue 140 exceeds, for example, five minutes and a time-over occurs. When no priority medium conveyance information exists in step S1, a check is made to see whether the accessor 12-1 is operating or not in step S2. Since the mode is Mode 1 at this time, the accessor 12-1 is in a stand by state. A check is now made to see if the accessor 12-2 is operating or not in step S3. In Mode 1, since the accessor 12-2 is also in a standby state, step S4 follows. One of the plurality of medium conveyance information stored in the command queue 140 is set to reference medium conveyance information in step S4. The oldest one of the plurality of medium conveyance information is set to the reference medium conveyance information. It is also possible to properly decide the way of setting the reference medium conveyance information as necessary. It is possible to set it on the basis of the position in the cell block or the like other than the time condition. For example, when the oldest medium conveyance information is set to the reference information in step S4, a check is made to see if there is medium conveyance information which can be simultaneously executed by the accessor 12-2 or not in step S5. The above processes will be specifically explained with reference to FIG. 49.

Four medium conveyance information (1) to (4) have been stored in the command queue 140. It is now assumed that the cell addresses designate the medium cartridges shown in (1) to (4) in FIG. 49. The oldest medium conveyance information (1) with respect to the time is set to the reference medium conveyance information and is allocated to the accessor 12-1 as a main apparatus. In step S5, a check is made to see if there is any medium conveyance information which can be simultaneously executed by the accessor 12-2 in this state. When the medium conveyance information (1) is allocated to the accessor 12-1, the right side of the cell address of the medium conveyance information (1) is set to a region A2 which can be accessed by the accessor 12-2.

Since there are medium positions designated by the cell addresses of the other medium conveyance information (2) to (4) in the accessible region A2, it is judged in step S5 that there are medium conveyance information which can be simultaneously executed by the accessor 12-2, so that step S6 follows. Since there are three medium conveyance information of (2) to (4) which can be simultaneously executed in step S6, step S7 follows and the optimum medium conveyance information among three medium conveyance information (2) to (4) is selected. The medium conveyance information which exists at the nearest position when the present position of the accessor 12-2 is set to a reference is selected as optimum medium conveyance information. In case of FIG. 49, the medium conveyance information (2) is selected as optimum information that is nearest to the accessor 12-2. The medium conveyance information (2) selected as optimum medium conveyance information as mentioned above is allocated on the accessor 12-2 side in step S8. On the other hand, when there is no medium conveyance information which can be simultaneously executed by the accessor 12-2 in step S5, the reference medium conveyance information is allocated to the accessor 12-2 in step S9. When the above allocation of the medium conveyance information to both of the accessors 12-1 and 12-2 or to only the accessor 12-1 is finished, the medium conveying operations by the accessors 12-1 and 12-2 are executed by the machine controllers 42-1 and 42-2 under the controls of the accessor controllers 28-1 and 28-2 to which the medium conveyance information were allocated. For example, in case of FIG. 49, the accessors 12-1 and 12-2 are simultaneously activated and the accessor 12-1 moves to the cell address of the medium conveyance information (1) and takes out the medium cartridge by the robot hand 48. Simultaneously, the accessor 12-2 moves to the cell address Of the medium conveyance information (2) and takes out the medium cartridge by the robot hand 48. When the end status of the medium conveyance is received by either one or both of the accessors 12-1 and 12-2, the processing operation in FIG. 47 is activated again.

[Process in Mode 2]

When the conveying operation of the accessor 12-1 is first finished by the operations of the accessors 12-1 and 12-2 based on the allocation of the medium conveyance information by Mode 1, the allocation of the medium conveyance information according to Mode 2 is executed. Namely, the processing operation in FIG. 47 is activated again by the end of the conveying operation of the accessor 12-1, the end of the operation of the accessor 12-1 is judged in step S2, and step S3 follows. Since the accessor 12-2 is in operation, step S10 follows. In step S10, a check is made to see if the medium conveyance information which can be simultaneously executed by the accessor 12-1 which is in a standby state exists in the command queue 140 or not. When the medium conveyance information which can be simultaneously executed exists in the command queue 140, a check is made if there are a plurality of medium conveyance information or not in step S11. If there are a plurality of medium conveyance information, the medium conveyance information having the cell address locating at the shortest distance from the present position of the accessor 12-1 is selected as optimum medium conveyance information in step S12. When there is only one medium conveyance information which can be simultaneously executed, the process in step S12-is not executed. Subsequently, in step S13, the selected medium conveyance information is allocated to the accessor 12-1 which is in the standby state and the medium conveyance of the accessor 12-1 is activated under the control of the accessor controller 28-1.

[Process in Mode 3]

The allocation of the medium conveyance information in Mode 3 is executed when the accessors 12-1 and 12-2 are simultaneously operated and after that, the conveyance of the accessor 12-2 is finished first. The process in FIG. 47 is again activated by the conveyance end of the accessor 12-2, it is judged that the accessor 12-1 is in operation in step S2, and step S14 follows. Since the accessor 12-2 has already finished the operation, step S15 follows. In step S15, a check is made to see if the medium conveyance information which can be simultaneously executed by the accessor 12-2 which is at present in a standby state exists in the command queue 140 or not. If there is any medium conveyance information which can be simultaneously executed in the command queue 140, step S16 follows and a check is made to see if there are a plurality of medium conveyance information. If there are a plurality of medium conveyance information, the medium conveyance information having the cell address that is nearest from the present position of the accessor 12-2 is selected as optimum medium conveyance information in step S17. The medium conveyance information is allocated to the accessor 12-2 and the medium conveying operation is executed under the control of the accessor controller 38-2 in step S18. On the other hand, when there is no medium conveyance information in the command queue 140 which can be simultaneously executed by the accessor 12-2 in step S15, step S19 follows and the reference medium conveyance information which is being executed by the accessor 12-1 at present as a reference is changed. Subsequently, in step S20, a check is made to see if the change of the reference medium conveyance information has been executed to the whole medium conveyance information in the command queue 140 or not in step S20. After the check was made, the processing routine returns to step S15 and a check is made to see if there are any medium conveyance information which can be simultaneously executed by the accessor 12-2 or not with respect to the changed reference medium conveyance information. The change of the reference medium conveyance information of the accessor 12-1 in step S19 is shown specifically in FIG. 50.

Figure 50:
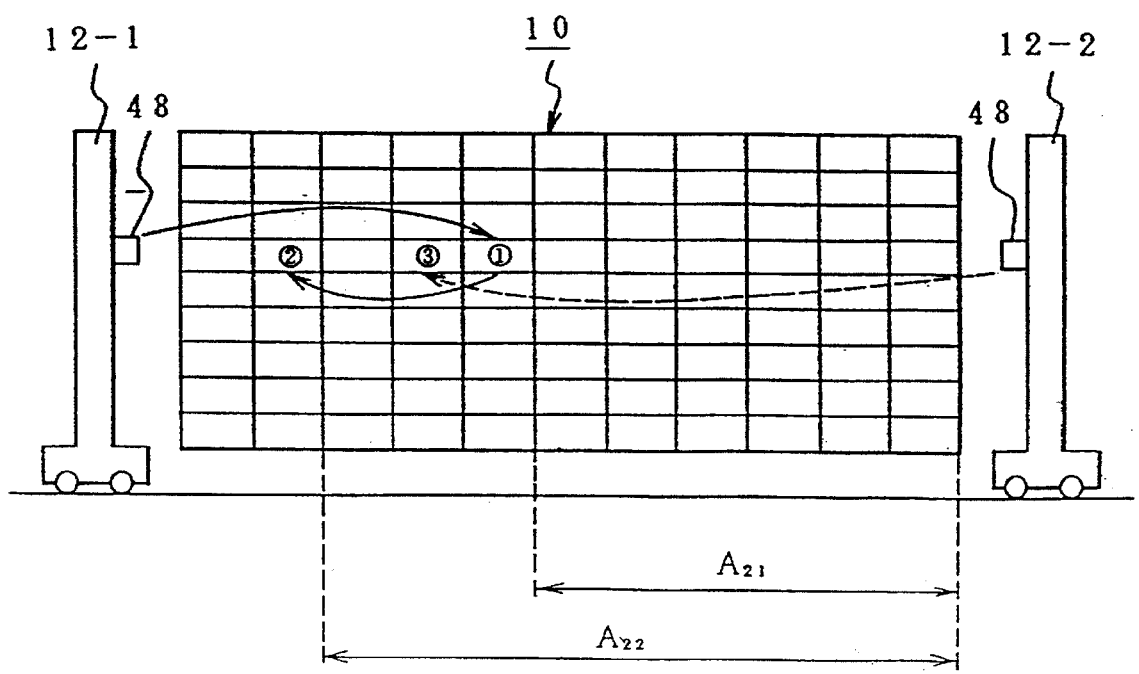
FIG. 50 is an explanatory diagram showing a relation between the medium conveyance information of the command queue and the cell address in case of updating reference medium conveyance information.

FIG. 50 shows the operation in a state in which the command medium conveyance information (1) to (3) were stored into the command queue 140. First, the medium conveyance information (1) is set as reference medium conveyance information and is allocated to the accessor 12-1. The accessor 12-1 executes the conveying operation to the cell address of the reference medium conveyance information (1). A region $A_{21}$ which can be accessed by the accessor 12-2 is located on the right side of the medium conveyance information (2). The remaining medium conveyance information (2) and (3) in the command queue don't exist in the accessible region $A_{21}$. Due to this, it is judged that there is no medium conveyance information which can be simultaneously executed by the accessor 12-2 in step S15 in FIG. 47 in this case and step S19 follows. In step S19, the reference medium conveyance information is changed to the medium conveyance information (2) stored next to the reference medium conveyance information (1) which was allocated to the present accessor 12-1. With respect to the reference medium conveyance information (2), a check is made to see if there is any medium conveyance information which can be simultaneously executed by the accessor 12-2 or not in step S15. When it is changed to the reference medium conveyance information (2), a region which can be accessed by the accessor 12-2 is set to $A_{22}$. The cell address of the next medium conveyance information (3) exists in the accessible region $A_{22}$. Therefore, it is judged that there is medium conveyance information which can be simultaneously executed by the accessor 19-2 and the medium conveyance information (3) is allocated to the accessor 12-2 in step S18. The accessor 12-9 to which the medium conveyance information (3) was allocated is activated under the activating condition such that the conveyance of the medium conveyance information (1) by the accessor 12-1 is finished. Such a process of changing the reference medium conveyance information and retrieving the medium conveyance information which can be executed by another accessor is a kind of predictive optimum control. Due to this, the medium conveyance by the simultaneous operations of the two accessor 12-1 and 12-2 can be realized as much as possible.

[Mode 4]

In Mode 4, since both of the accessors 12-1 and 12-2 are in operation, even if the command extracting condition of the command queue 40 is satisfied and the process in FIG. 47 is activated, the medium conveyance information is not particularly allocated via steps S1, S2, and S14.

[Process of medium conveyance information in which a time-over occurs]

In the medium conveyance by the simultaneous operations of the two accessors 12-1 and 12-2, even if the medium conveyance information is allocated in accordance with the conditions of Modes 1 to 4 of the flowchart in FIG. 47 among a plurality of medium conveyance information stored in the command queue 140, medium conveyance information which is left because of the impossibility of the simultaneous operations always exists. Therefore, a storing time is monitored with respect to the medium conveyance information stored in the command queue 140. For example, with respect to the medium conveyance information which causes time-over in excess of a set time of 5 minutes, a priority flag indicative of a priority process is set. A check is made to see if there is medium conveyance information with the priority flag caused a time over in the command queue 140 in step S1 in FIG. 47. If there is the priority medium conveyance information, the processing routine advances to the processes in step S21 and subsequent steps in FIG. 48.

Figure 48:
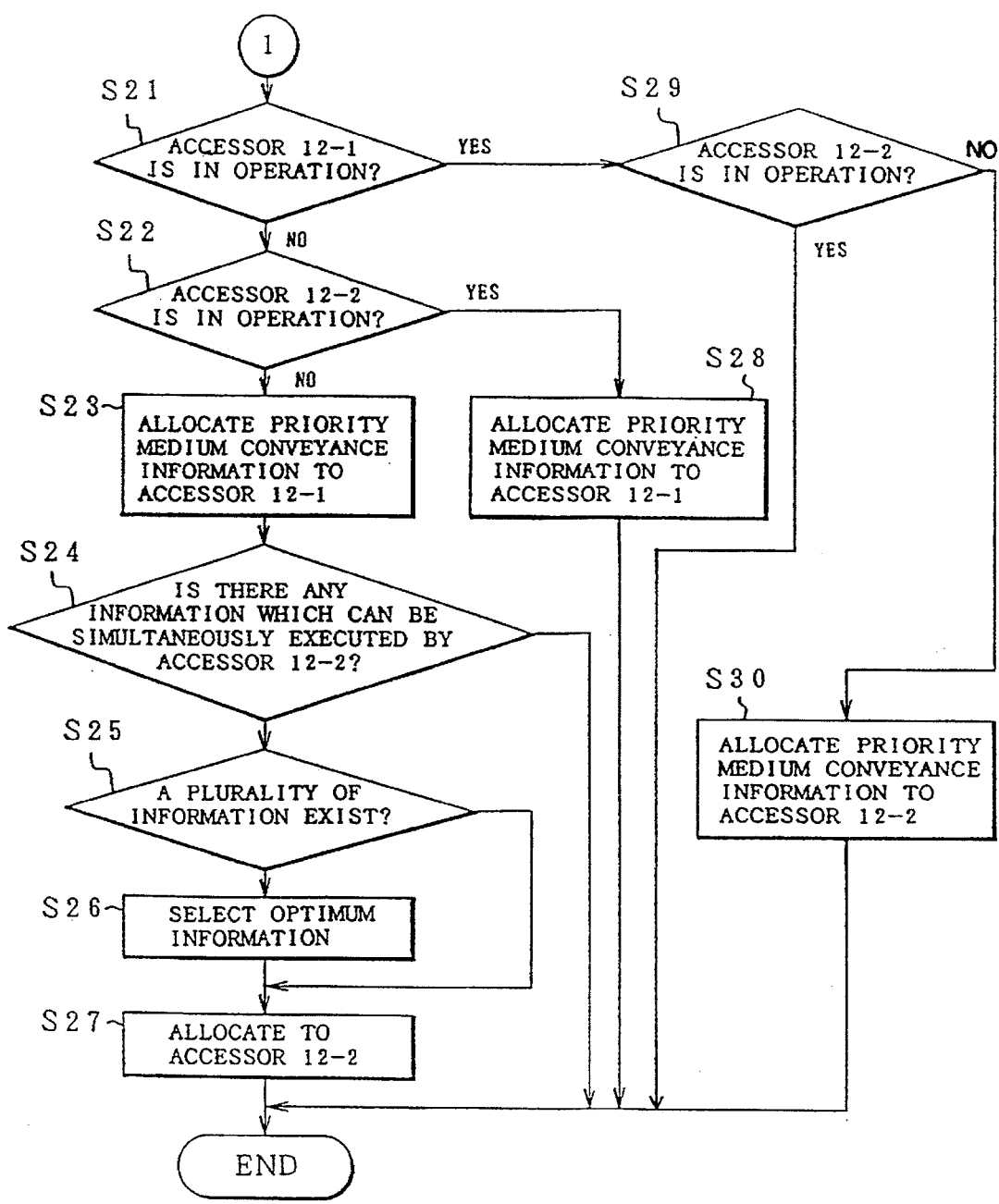
FIG. 48 is a flowchart showing a continuation of FIG. 45.

In FIG. 48, a check is made to see if the accessor 12-1 is in operation or not in step S21. If it is in the standby state, a check is made to see if the accessor 12-2 is in operation or not in step S22. If it is also in the standby state, the priority medium conveyance information is allocated to the accessor 12-1 in step S23. A check is made whether the medium conveyance information which can be simultaneously executed by the accessor 12-2 exists or not. When there are a plurality of medium conveyance information which can be simultaneously executed, the processing routine advances from step S25 to step S26. The medium conveyance information existing at the nearest position from the present position of the accessor 12-2 is selected as optimum medium conveyance information. In step S27, the medium conveyance information is allocated to the accessor 12-2 and the priority medium conveyance information is executed by the accessor 12-1. Simultaneously, the priority medium conveyance information and the medium conveyance information which can be simultaneously executed are executed by the accessor 12-2. On the other hand, when only the accessor 12-2 is in operation in step S12, step S28 follows. The priority medium conveyance information is allocated to the accessor 12-1 which is in the standby state and the medium conveyance information in which the time-over occurs is executed in step S28. Further, when it is judged that the accessor 12-1 is in operation and the accessor 12-2 is in the standby state in steps S21 and S29, step S30 follows and the priority medium conveyance information is allocated to the accessor which is in the standby state and executed. By such a priority process of the medium conveyance information in which the time-over occurs shown in steps S21 to S30, even if the simultaneous operation cannot be executed and the medium conveyance information is left in the command queue 140, the operation is forcedly executed, for example, after 5 minutes. Therefore, when two accessors are operated in parallel and the medium is conveyed, the situation such that the processing time becomes extremely long can be prevented.

Figure 51:
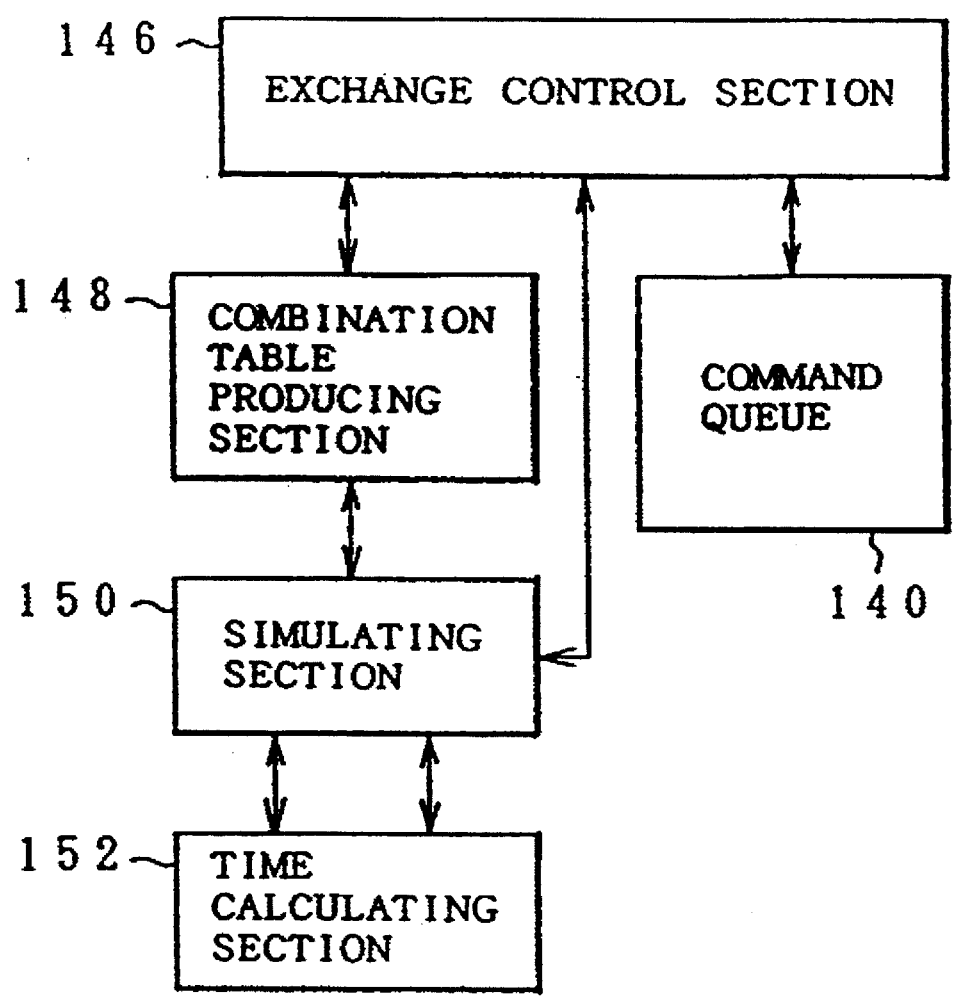
FIG. 51 is a functional block diagram showing a command exchanging section provided for a director in FIG. 45.
Figure 52:
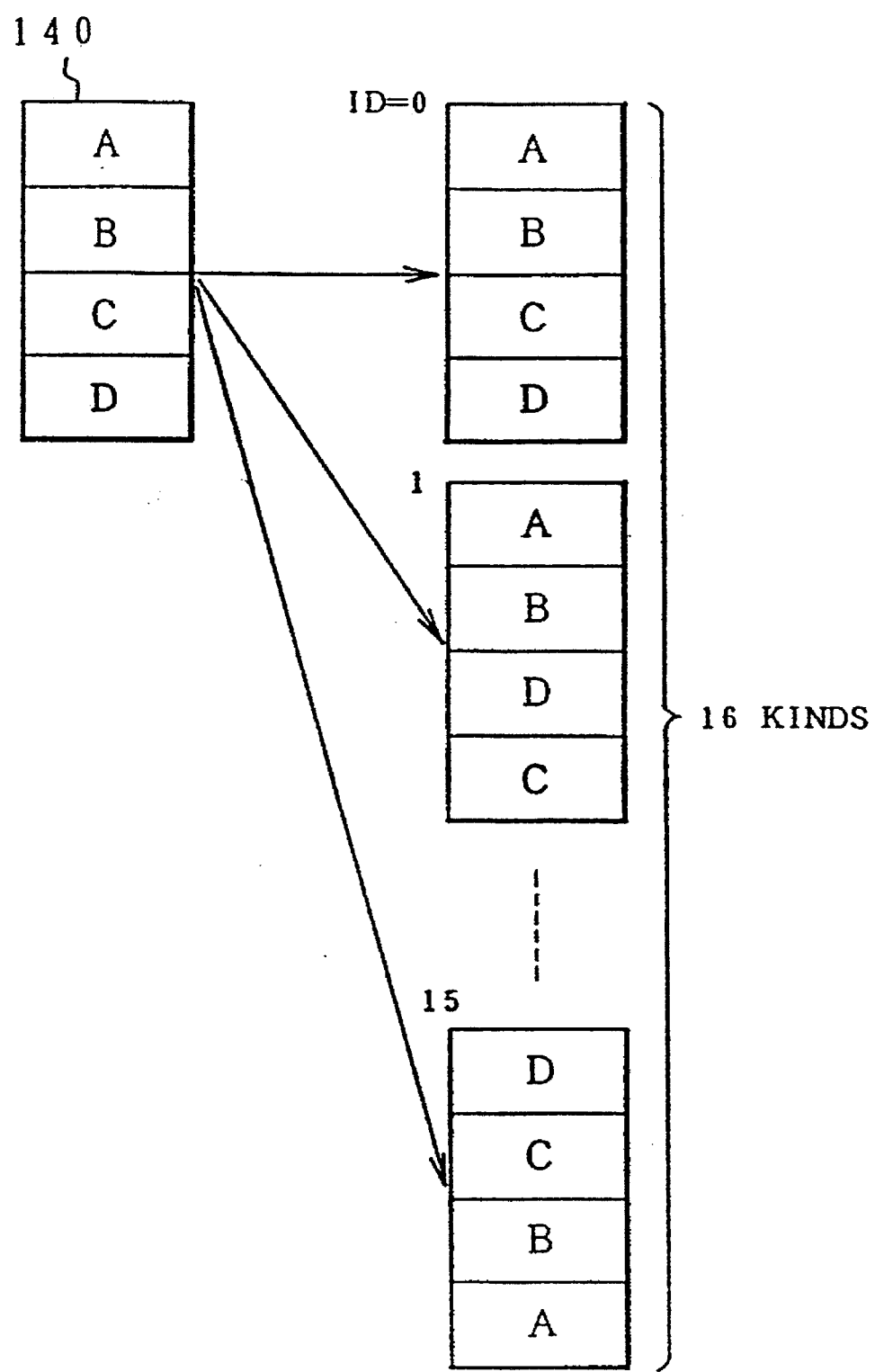
FIG. 52 is an explanatory diagram showing a table production by a combination table producing section in FIG. 45.

With reference to FIG. 51, the command exchanging section 142 provided for the director 26-1 in FIG. 45 will now be described. The command exchanging section 142 comprises an exchange control section 146, a combination table producing section 148, a simulating section 150, and a time calculating section 152. When a vacant time is recognized while the accessors 12-1 and 12-2 are executing the medium conveying operations, the exchange control section 146 makes the combination table producing section 148 and the simulating section 150 operative and executes an exchanging process of the optimum executing procedure of a plurality of medium conveyance information stored in the command queue 140. The combination table producing section 148 produces a table of all of the combinations of the executing orders with respect to the medium conveyance information stored at present in the command queue 140. For instance, as shown in FIG. 52, when it is assumed that four medium conveyance information (A), (B), (C), and (D) have been stored in the command queue 140, 16 kinds of tables having all of the combinations of the executing orders of the medium conveyance information (A), (B), (C), and (D). The table produced as mentioned above is classified by the table ID=0 to 15. Generally, when the number of storage of the command queue 140 is set to (n), $2^n$ tables are produced. The simulating section 150 executes a simulation for simultaneously operating both of the two accessors 12-1 and 12-2 and executing the medium conveyance every table for all of the tables produced by the combination table producing section 148. The conveyance time in the simulation is calculated by the time calculating section 152.

Figure 53:
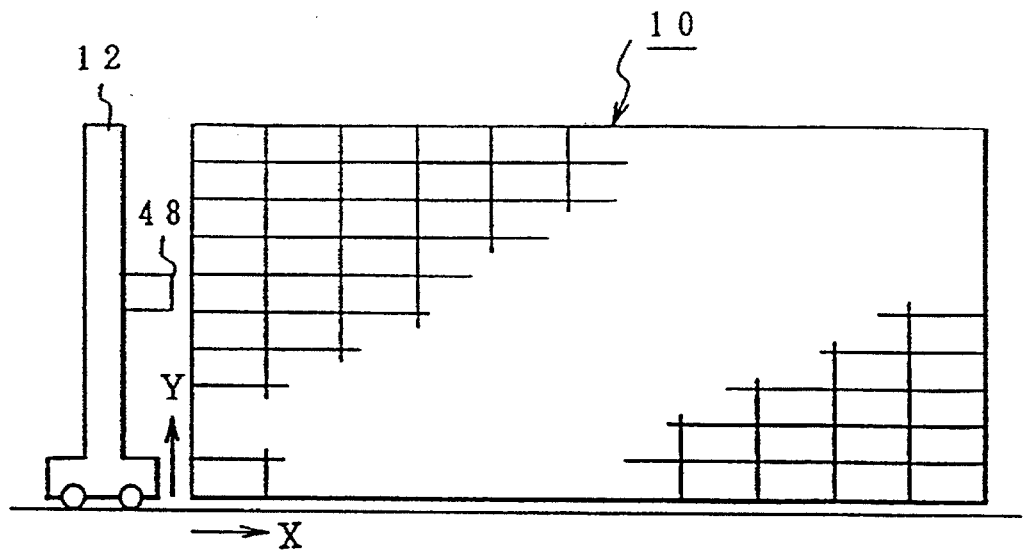
FIG. 53 is an explanatory diagram of a medium conveying direction of the accessor for a cell block.

The conveyance time which is calculated by the time calculating section 152 will now be explained in detail. FIG. 53 shows an accessor 12 to convey the medium to the cell block 10. A running direction of the accessor 12 is set to the X direction and a moving direction of the robot hand 48 provided in the accessor 12 is set to the Y direction. A medium conveyance time Tx in the X direction will be first explained. The running performance in the X direction of the accessor 12 is, for example, as follows.

Maximum speed $V_{mx}$=2.033 (m/sec)

Acceleration $a_{1x}$=1.116 (m/sec$^2$)

Deceleration $a_{2x}$=1.346 (m/sec$^2$)

Figure 54:
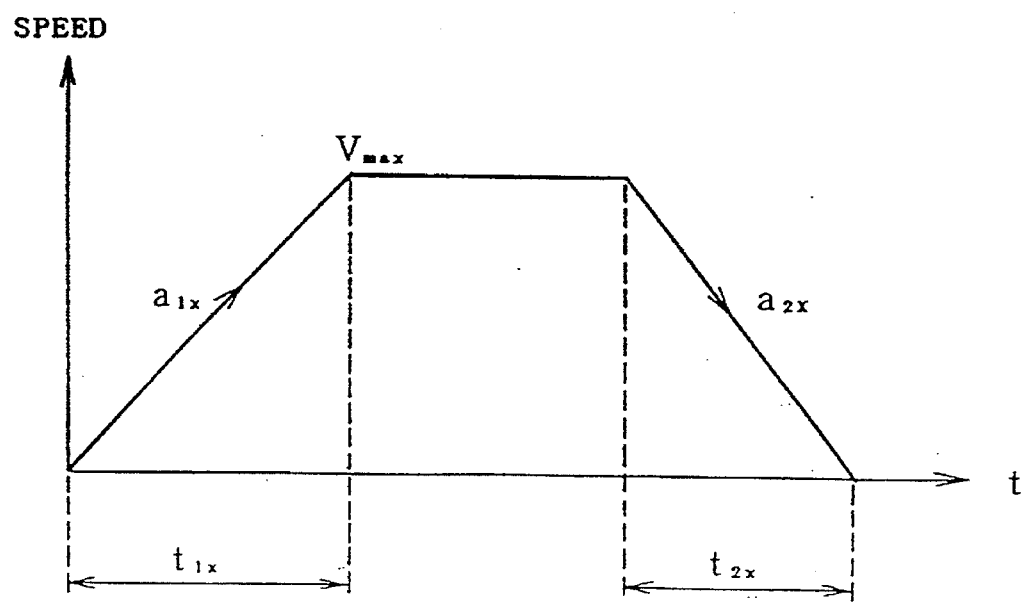
FIG. 54 is a speed diagram in the X direction by the accessor.

FIG. 54 shows a speed diagram when the accessor 12 is accelerated in the X direction and is run at a uniform velocity at the maximum speed and is decelerated and stopped after that. A time $t_{1x}$ which is required from a time point at which the accessor 12 was accelerated from the stop state in FIG. 54 to a time point at which the speed reaches the maximum speed $V_{mx}$ is obtained by the following equation.

$t_{1x}=V_{mx}/a_{1x}=1.822$ (sec)

A time $t_{x2}$ which is required until the accessor 12 is decelerated and stopped from the maximum speed $V_{mx}$ is obtained by $t_{x2}=V_{mx}/a_{2x}=1.510$ (sec)

Distances $S_{1x}$ and $S_{2x}$ at which the accessor progresses for the above time intervals are obtained as follows.

$S_{1x}=0.5 \times a_{1x} \times t_{1x}=0.5 \cdot V_{mx}^2/a_{1x}=1.852$ (m)

$S_{2x}=0.5 \times a_{2x} \times t_{x2}=0.5 \cdot V_{mx}^2/a_{2x}=1.535$ (m)

Therefore, the distance when the accessor reaches the maximum speed $V_{mx}$ and, after that, is decelerated and stopped without running at a uniform velocity is $S_{1x}+S_{2x}=3.387$ (m)

Since the size of the cell in the X direction is equal to, for example, 0.123 (m), the number (x) of cells in the X direction when the accessor doesn't run at a velocity is equal to 3.387/0.123=27.5

Namely, the accessor doesn't run at a uniform velocity when the number of cells is up to 27, and the accessor runs at a uniform velocity when the number of cells is equal to 28 or more. Thus, the accessor 12 progresses by (1.852+1.535) meters for a period of time (1.822+1.510) seconds from a time point at which the accessor 12 is accelerated from the stop state and reaches the maximum speed to a time point at which the accessor is decelerated immediately and stopped without running at a uniform velocity. Therefore, when it is now assumed that it takes a time of Tx for the accessor to progress by the distance of (x) cells, since the distance is proportional to the square of the time, the following relation is obtained.

$Tx^2$: $(0.123 \times x)=(1.822+1.510)^2$: $(1.852+1.535)$

Therefore, the medium conveyance time Tx in the X direction in this instance is $Tx=(1.822+1.510)\sqrt{\{(0.123 \times x)/(1.852+1.535)\}}$ Therefore, the medium conveyance time Tx in the X direction per cell number (x) is when $x \leq 27$ $Tx=(1.22+1.510)\sqrt{\{(0.123 \times x)/(1.852+1.535)\}}=3.332 \times \sqrt{\{(0.123 \times x)/3.387\}}$     (1)

when x>27

$Tx=\{(x \times 0.123)-(1.852+1.535)\}/2.033+(1.822+1.510)$     (2)

Respective values will now be specifically obtained as follows.

| [The number (x) of cells] | [Conveyance time Tx(sec)] |
|---|---|
| 1 | 0.6350 |
| 5 | 1.4198 |
| 10 | 2.0079 |
| 15 | 2.4592 |
| 20 | 2.8397 |
| 26 | 3.2377 |
| 27 | 3.2994 |

A conveyance time Ty in the Y direction will now be explained. The running performance in the Y direction of the robot hand 48 provided in the accessor 12 is set, for example, as follows.

Maximum speed $V_{my}=0.567$ (m/sec)

Acceleration $a_{1y}=2.093$ (m/sec$^2$)

Deceleration $a_{2y}=0.419$ (m/sec$^2$)

A time $t_{1y}$ which is required from a time point when the robot hand 48 is accelerated from the stop state to a time point when it reaches the maximum speed $V_{my}$ is as follows.

$t_{1y}=V_{my}/a_{1y}=0.271$ (sec)

A time $t_{y2}$ which is required until the accessor is decelerated and stopped from the maximum speed $V_{my}$ is $t_{y2}=V_{my}/a_{2y}=1.353$ (sec)

Distances $S_{1y}$ and $S_{2y}$ at which the accessor progresses for the above time intervals are as follows, respectively.

$S_{1y}0.5 \times a_{1y} \times t_{1y}0.5 \cdot V_{my}^2/a_{1x}=0.077$ (m)

$S_{2y}=0.5 \times a_{2y} \times t_{x2}=0.5 \cdot V_{my}^2/a_{2x}=0.384$ (m)

Therefore, the distance in the case where after the speed reached the maximum speed $V_{my}$, the accessor is decelerated and stopped without running at a uniform velocity is $S_{1y}+S_{2y}=0.461$ (m)

Since the size in the Y direction of the cell is equal to, for example, 0.0404 (m), the number (y) of cells in the Y direction in the case where the accessor doesn't run at a uniform velocity is 0.4604/0.0404=11.3

Namely, the accessor doesn't run at a uniform velocity when the number of cells is up to 11, and the accessor runs at a uniform velocity when the number of cells is equal to 12 or more. Thus, the accessor progresses by (0.077+0.384) meters for a period of time (0.271+1.353) seconds from a time point after the accessor was accelerated from the stop state and reached the maximum speed to a time point when the accessor is decelerated immediately and stopped without running at a uniform velocity. Therefore, when it is now assumed that it takes a time of Ty for the accessor to progress by the distance of (y) cells, since the distance is proportional to the square of the time, the following relation is obtained.

$Ty^2$: $(0.0404 \times y)=(0.271+1.353)^2$: $(0.077+0.384)$

Therefore, the medium conveyance time Ty in the Y direction in this instance is $Ty=(0.271+1.353)\sqrt{\{(0.0404 \times y)/(0.077+0.384)\}}$ The medium conveyance time Ty in the Y direction per (y) cells is when y<11

$Ty=(0.271+1.353)\sqrt{\{(0.0404 \times x)/(0.077+0.384)\}}=1.624 \times \sqrt{\{(0.0404 \times x)/0.461\}}$     (3)

when y>11

$Ty=\{(y \times 0.0404) \textbf{ 31 } (0.077+0.384)\}/0.567+(1.852+1.535)$     (4)

Respective values will now be specifically obtained as follows.

| [The number (y) of cells] | [Conveyance time Ty(sec)] |
| --- | --- |
| 1 | 0.4808 |
| 3 | 0.8327 |
| 5 | 1.0750 |
| 7 | 1.2720 |
| 9 | 1.4422 |
| 10 | 1.5203 |
| 11 | 1.5945 |

On the basis of such medium conveyance times Tx and Ty in the X and Y directions, the time calculating section 152 obtains the number (x) of moving cells in the X direction and the number (y) of moving cells in the Y direction from the moving side address and moving destination address which were designated as medium conveyance information. By applying the values of (x) and (y) to the equations (1) to (4) mentioned above, the conveyance times Tx and Ty are obtained. The medium conveyance time (T) is obtained as follows.

$$T=Tx+Ty$$

The medium conveyance time T is divided into the medium conveyance time T1 from the cell to the drive and the medium conveyance time T2 from the drive to the cell and each of them is calculated. As for the calculation of the medium conveyance time (T), it is possible to obtain the time (T) by solving the above calculating equations or by using a look-up table in which the medium conveyance times Tx and Ty corresponding to the numbers of the cells (x) and (y) have been stored.

Figure 55:
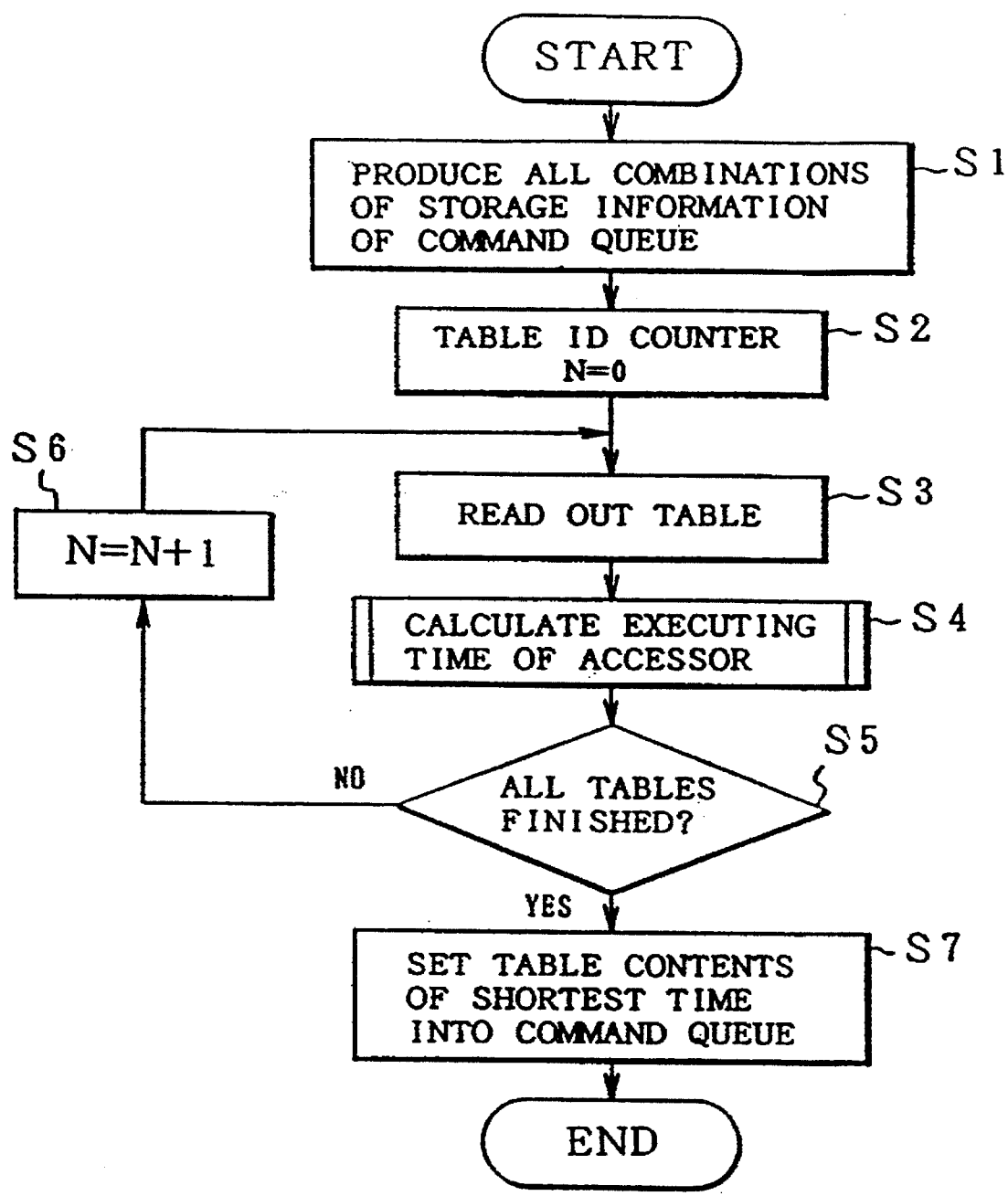
FIG. 55 is a flowchart showing an exchanging process of the command queues in FIG. 45.

A flowchart of FIG. 55 shows the processing operation of the command exchanging section shown in FIG. 51. When the two accessors 12-1 and 12-2 recognize the vacant time during the medium conveying operation, the processes are started. First, in step S1, a combination table producing section 148 forms a table of all combinations with respect to the orders of the storage information stored in a present command queue 140 as shown in, for example, FIG. 52. Subsequently, in step S2, A count value (N) of a table ID counter to identify the table is initialized to 0. In step S3, the table having the ID designated by N=0 is read out. In step S4, an accessor executing time is calculated for the read-out table as a target. A calculating process of the accessor executing time is shown in detail as a subroutine in a flowchart of FIG. 56. When the calculation of the accessor executing time is finished in step S4, a check is made to see if the processes of all of the tables have been finished or not in step S5. If NO, the value (N) of the table ID counter is increased by one in step S6 and the next table is read out and the calculation of the accessor executing time is repeated. When it is Judged in step S5 that the processes for all of the tables have been finished, step S7 follows and the table having the maximum time is selected from the accessor executing times obtained with respect to all tables. The contents of the selected table are set as an optimum executing procedure into the command queue 140 and the command exchanging process is finished.

Figure 56:
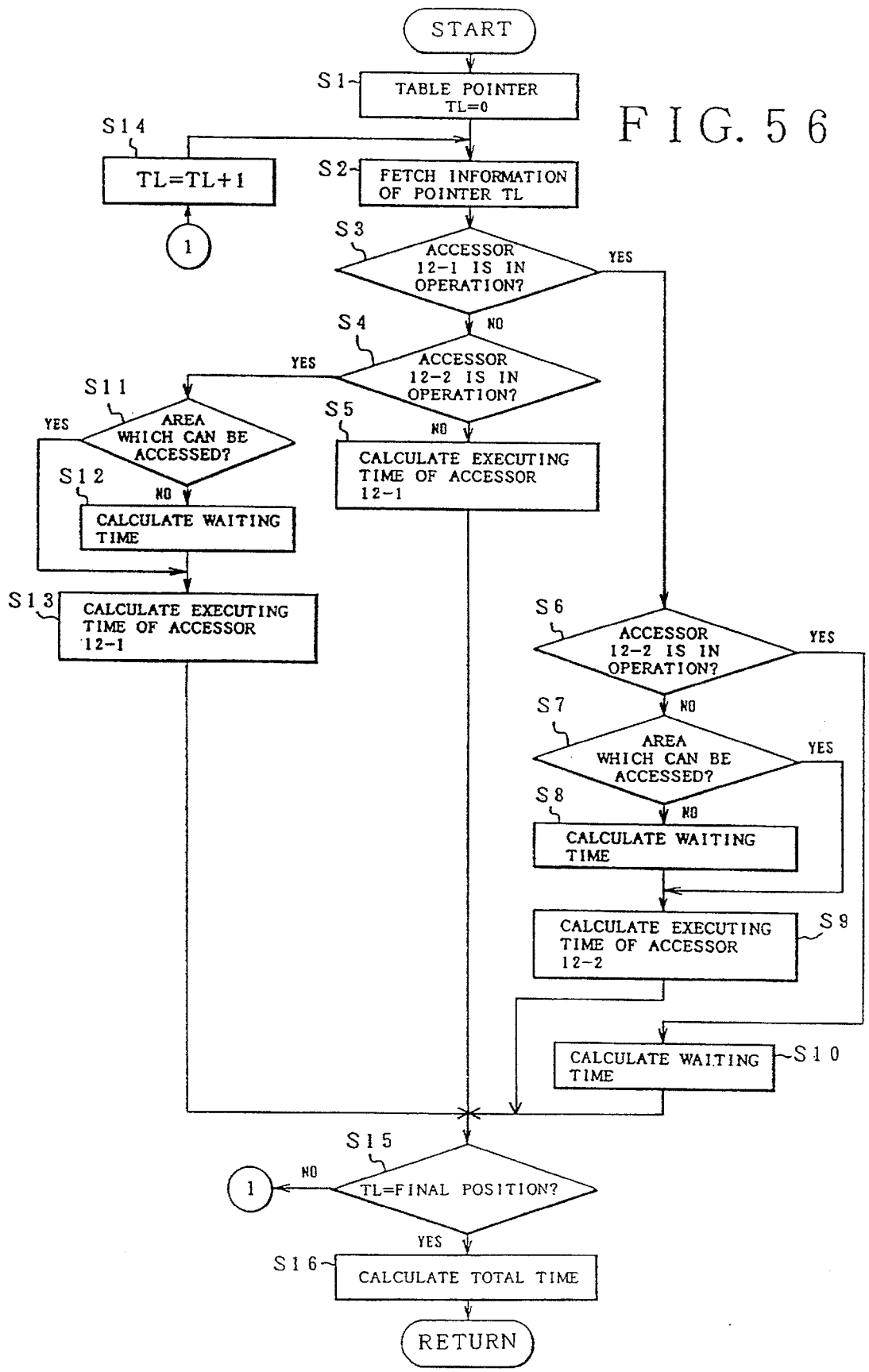
FIG. 56 is a flowchart showing a calculating process of an executing time of an accessor in FIG. 55.

A flowchart of FIG. 56 shows calculating processes of the accessor executing time. First, in step S1, a table pointer TL indicative of the table storing position is initialized to 0 with respect to the table selected at present as a target. In step S2, the medium conveyance information at the position designated by the table pointer TL is extracted. In step S3, a check is made to see if the accessor 12-1 is operating or not. If NO, a check is made in step S4 to see if the accessor 12-2 is operating or not. When the accessor 12-2 is also not operating, step S5 follows and the executing time when the accessor 12-1 was operated is calculated on the basis of the medium conveyance information extracted in step S2 and a logging is performed. On the other hand, when the accessor 12-1 is operating in step S3, step S6 follows and a check is made to see if the accessor 12-2 is operating or not. When the accessor 12-2 is not operating in this instance, step S2 follows and a check is made to see if a moving side address and a moving destination address of the extracted medium conveyance information exist at present in the area which can be accessed by the accessor 12-2 or not. If NO, step S8 follows and a waiting time based on the completion of the execution of the accessor 12-1 which is at present operating is calculated. If YES, the calculation of the waiting time in step S8 is not performed. Subsequently, the executing time of the accessor 12-2 is calculated in step S9. In this instance, if the waiting time was calculated in step S8, the time which is obtained by adding the waiting time to the executing time of the accessor 12-2 is set to the executing time. A logging is also performed for the result of the calculation of the executing time in step S9. On the other hand, when both of the accessors 12-1 and 12-2 are operating in steps S3 and S6, the waiting time until the end of the execution by either one of the accessors is calculated in step S10. Further, when only the accessor 12-2 is operating, the processing routine advances from step S4 to step S11 and a check is made to see if the extracted medium conveyance information is at present lies in the accessible area of the accessor 12-1 or not. If NO, the waiting time until the end of the operation of the accessor 12-2 which is at present operating is calculated in step S2. If YES, the calculation of the waiting time in step S12 is not performed. Subsequently, in step S13, the executing time of the accessor 12-1 is calculated. In this instance, if the waiting time was calculated in step S12, the time which is obtained by adding the waiting time to the executing time is set to the executing time. Further, in the case where both of the accessors 12-1 and 12-2 are operating when the medium conveyance information is extracted in all of steps S5, S9, and S13 and the waiting time has been calculated in step S10, the time which is obtained by adding the waiting time in step S10 to the calculation result of each executing time is set to the executing time. In step S15, a check is made to see if the position is a table final position or not from the table pointer TL. Up to the table final position, the processes in steps S2 to S12 are repeated while increasing the value of the table pointer TL one by one in step S14. At the final position, the processing routine advances to step S16 and the total executing time of the accessors 12-1 and 12-2 which were calculated with respect to the medium conveyance information of the table taken out at present is calculated. A logging is performed by setting the total executing time to the accessor executing time of the table taken out at present. The processing routine is returned to the process in step S16.

Although the embodiment of FIG. 45 has been described with respect to the case where two conveying systems are provided for the library apparatus for two host computers as an example, the number of conveying systems can be set to a proper value as necessary.

According to the second embodiment of the invention as mentioned above, since the medium conveyance information from the upper-order unit can be received by a plurality of paths, the processing performance of the library apparatus when it is seen from the upper-order unit can be remarkably improved. After the medium conveyance information received from the upper-order unit via a plurality of paths was stored into the command queue in a lump, the optimum medium conveyance information is allocated so as to allow a plurality of medium conveying apparatuses to simultaneously execute the conveying operations. Therefore, a plurality of medium conveyance information stored in the command queue can be efficiently processed and the processing performance can be remarkably improved. By simultaneously operating the spare system of the conventional library apparatus together with the main system, the invention can be easily realized by merely changing a firmware of the library apparatus to a firmware which executes the processes of the invention. The processing performance can be remarkably improved by a necessary minimum increase in costs. Further, by setting the optimum combination by simulating all of the combinations of the orders of the commands held in the command queueing means, the order is generated by a procedure of the best efficiency and the medium conveying operation can be executed.

[Grade-up of the accessor machine controller]

Figure 57:
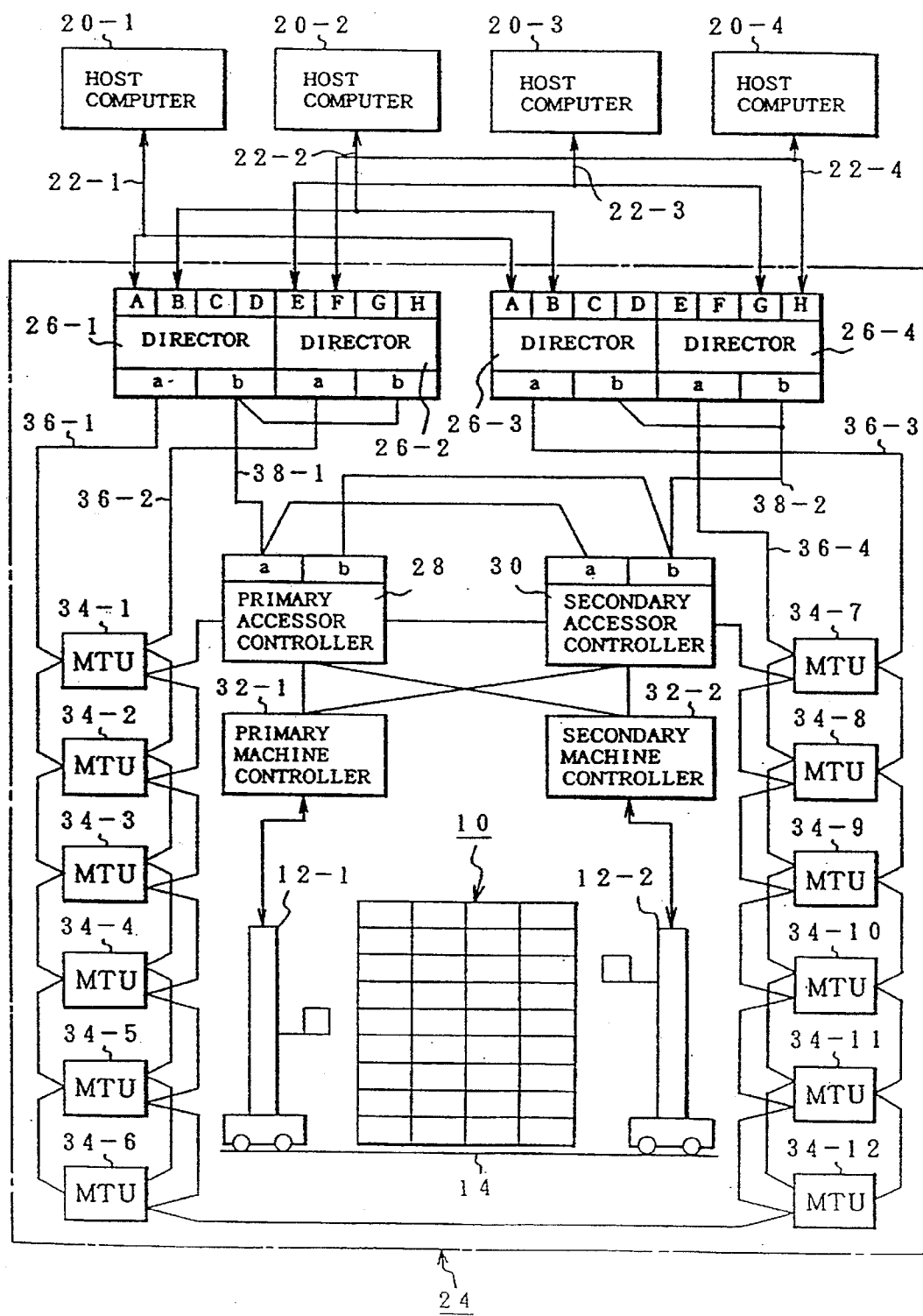
FIG. 57 is a block diagram showing the third embodiment of the invention.

FIG. 57 shows a hardware construction of a library apparatus according to the third embodiment of the invention. The third embodiment is characterized in that the conventional operation program in which only one accessor is operated is used as it is, thereby enabling two accessors to be simultaneously operated.

In FIG. 57, the host computers 20-1 to 20-4 and the library apparatus 24 are substantially the same as those in FIG. 15. FIG. 57 differs from FIG. 15 with respect to a point that with respect to two systems provided for the library apparatus 24, the left side is set to the primary side and the right side is set to the secondary side. That is, the left side comprises the primary accessor controller 28, primary machine controller 32-1, and primary accessor 12-1. The right side comprises the secondary accessor controller 30, secondary machine controller 32-2, and secondary accessor 12-2.

Figure 58:
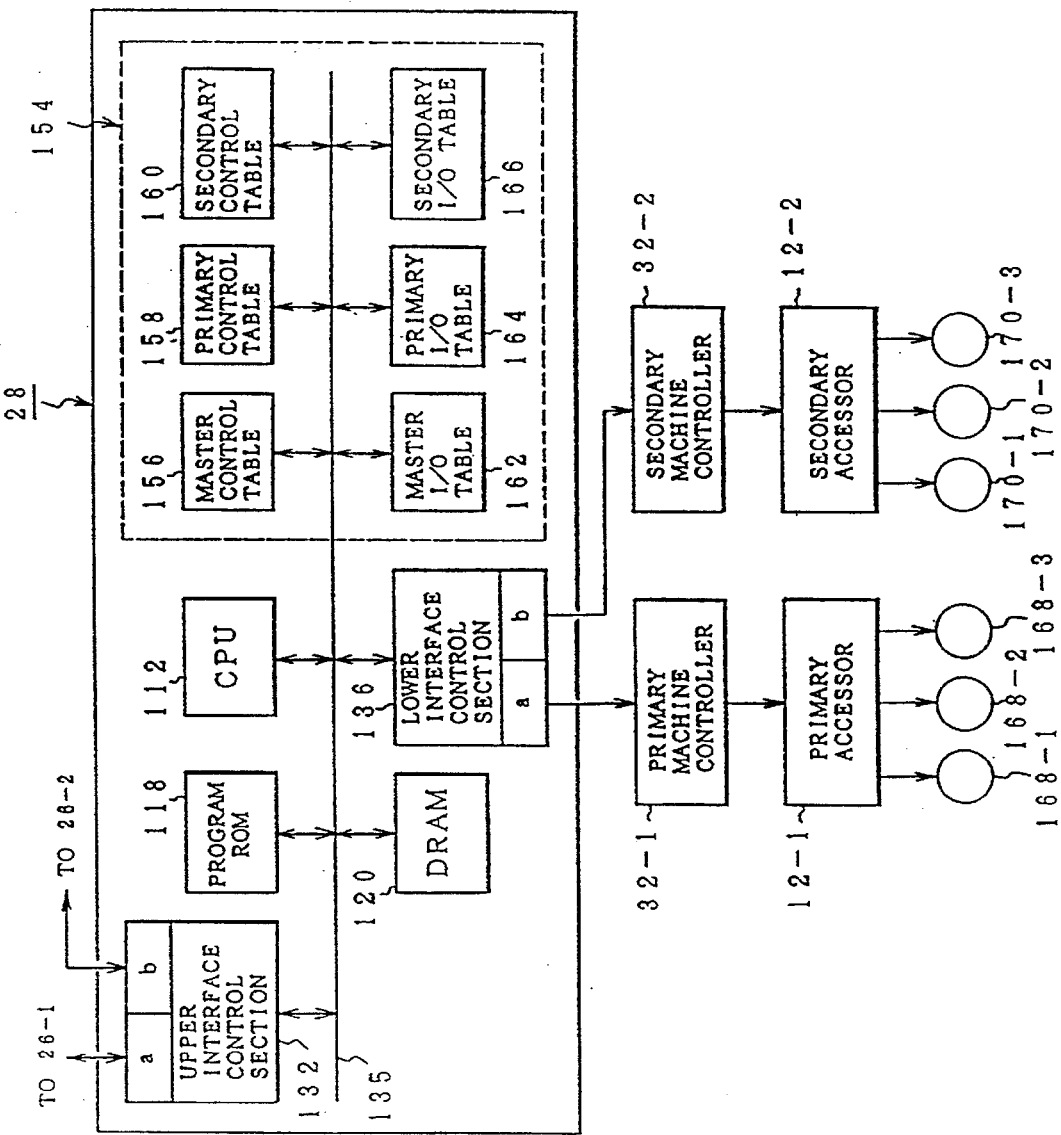
FIG. 58 is a block diagram showing a hardware of an accessor machine controller in FIG. 57.

FIG. 58 shows a hardware construction of the primary accessor controller 28 provided for the library apparatus 24 in FIG. 57. Since a construction of the secondary side is substantially the same as that on the primary side, its description is omitted here. The CPU 112 is provided in the primary accessor controller 28. The upper interface section 132, the program ROM 118, the DRAM 120 for control, a control register section 154, and the lower interface control section 136 are provided for the internal bus 135 of the CPU 112. The upper interface section 132 receives the medium conveyance information having the moving side cell address and the moving destination cell address which were received by the directors 26-1 to 26-4 by the channels (a and b) subsequently to the moving command. Further, a response such as a status or the like indicative of the state of the primary accessor controller 28 and the state of the lower apparatus is returned. The lower interface control section 136 has ports (a and b). The primary machine controller 32-1 is connected to the port (a) side. The secondary machine controller 32-2 is connected to the port (b) side. The primary machine controller 32-1 has the primary accessor 12-1. The secondary machine controller 32-2 has the secondary accessor 12-2. The accessor 12-1 has an X-axis motor 168-1, a y-axis motor 168-2, and a Z-axis motor 168-3. The accessor 12-2 has an X-axis motor 170-1, a Y-axis motor 170-2, and a Z-axis motor 170-3. The control register section 154 of the primary accessor controller 28 has: a master control table 156 which is used in the command executing operation by the CPU 112; and a master I/O table 162 which is used for switching of the ports (a and b) of the lower interface control section 136. The master control table 156 and master I/O table 162 are real tables which are used in the operation program to make one accessor operative. On the other hand, according to the invention, in order to simultaneously make both of the primary accessor 12-1 and the secondary accessor 12-2 operative, a primary control table 158 and a secondary control table 160 are provided as virtual tables for the master control table 156. A primary I/O table 164 and a secondary I/O table 166 are provided as virtual I/O tables for the master I/O table 162 to switch the ports of the lower interface control section 136.

FIG. 59 shows a construction of each of the master primary and secondary control tables 156, 158, and 160 provided for the control register section 154 in FIG. 58. Each of those control tables is constructed by, for example, an 8-bit register table of 128 entries. The following parameters have been stored in the control table on the basis of the medium conveyance information from the upper-order director side.

I. Sequence status of a task monitor section which manages the operation programs II. Command receiving ports a/b in the upper interface section 132

III. Moving side address

IV. Moving destination address

V. Sequence number which is executed by the operation program next

VI. Various kinds of control flags

VII. Various kinds of state flags

FIG. 60 shows each of the master primary and secondary I/O tables in FIG. 58. The designation of the switching I/O ports for the lower machine controller which is designated for the lower interface section 136 has been stored in the I/O table.

Figure 61:
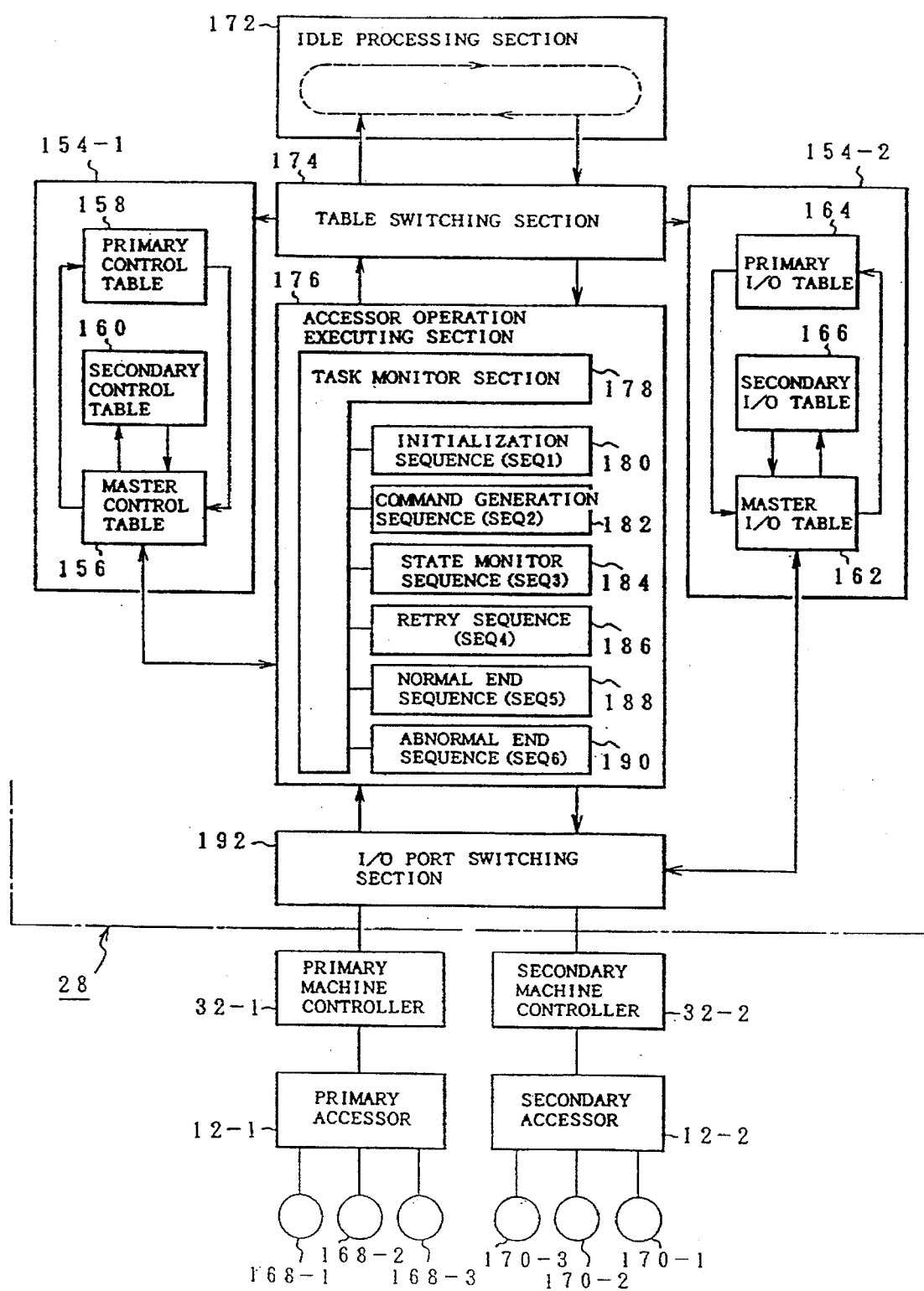
FIG. 61 is a block diagram showing functions of the accessor machine controller in FIG. 58.

FIG. 61 shows functions of the simultaneous operations of two accessors which are realized by the operation program in the primary accessor controller 28 in FIG. 58. The operation program of the primary accessor controller 28 has a program structure which is divided into an idle processing section 172, a table switching section 174, an accessor operation executing section 176, and an I/O port switching section 192. The idle processing section 172 relates to a waiting routine for the command execution based on the medium conveyance information from the upper director. When a conveying command including the medium conveyance information is received from the upper-order unit, processes of the table switching section 174 and subsequent sections are activated. The table switching section 174 switches and selects either one of the two virtual tables provided for every primary accessor 12-1 and secondary accessor 12-2 for the real table which the accessor operation executing section 104 inherently has and copies the selected virtual table, thereby allowing the program operation to be executed.

When the designation of the primary mode is judged by the command from the upper-order unit, the table switching section 174 develops the data shown in FIG. 59 based on the received medium conveyance information into the primary control table 158 of a control register section 154-1. The contents of the developed primary control table 158 are copied into the master control table 156 which is used in the accessor operation executing section 176. In the case where the secondary mode is designated by the command from the upper-order unit, the data shown in FIG. 59 is stored into the secondary control table 160 by the command from the upper-order unit. After that, the secondary control table 160 is selected and the contents of the secondary control table 160 are copied into the master control table 156 which is used in the accessor operation executing section 176.

A task monitor section 178 is provided for the accessor operation executing section 176. The task monitor section 178 selects a plurality of predetermined command sequences on the basis of the result of the analysis of the command from the upper-order unit and executes. In the embodiment, the task monitor section 178 has an initialization sequence 180, a command generation sequence 182, a state monitor sequence 184, a retry sequence 186, a normal end sequence 188, and an abnormal end sequence 190. Sequence numbers SEQ1 to SEQ6 to be stored into the control table are allocated to those sequences, respectively. In the initialization sequence 180, when the library apparatus is activated, the primary machine controller 32-1 side and the secondary machine controller 32-2 side are initialized and the primary accessor 12-1 and the secondary accessor 12-2 are automatically stopped at the initial positions. In the command generation sequence 182, the I/O command based on the medium conveyance information received from the upper director is sent to the primary machine controller 32-1 or the secondary machine controller 32-2, thereby allowing the command executing operation to be executed. In the state monitor sequence 112, after the command was generated by the command generation sequence 110, a state I/O command is generated, a status response indicative of the state of the primary machine controller 56-1 or secondary machine controller 32-2 is received, and the corresponding process is executed. In the retry sequence 34, the retrying operation in the case where the execution of the command failed after the I/O command had once been generated is repetitively performed until the number of retry times reaches a predetermined number.

In the normal end sequence 116, a process in the case where the normal end is performed for the retrying operation by the retry sequence 114 is executed. In the abnormal end sequence 118, the abnormal end process in the case where the retrying operation fails a predetermined number of times by the retry sequence is executed. A proper command sequence can be preset into the task monitor section 178 as necessary. Further, with respect to the execution of each of the commend sequences provided for the task monitor section 178, a disk connecting system such that when the command is executed, the primary machine controller 32-1 or the Secondary machine controller 32-2 is coupled and, after the command was sent, it is disconnected is used. Therefore, the accessor operation executing section 176 disconnects the machine controllers 32-1and 32-2 after a moving command was issued to the primary machine controller 32-1 by the command generation sequence 182. In the next cycle, another moving command is issued to the secondary machine controller 32-2 by the command generation sequence 182 and those machine controllers can be disconnected. Due to this, the primary machine controller 32-1 and the secondary machine controller 32-2 can be simultaneously operated.

The I/O port switching section 192 provided subsequently to the accessor operation executing section 176 is subjected to the port switching using each of the I/O ports provided in the control register section 154-2 by the table switching section 174. Namely, when the table switching section 174 receives the medium conveyance information of the primary mode from the upper-order director, designation information of the I/O port (a) for the primary machine controller 32-1 is registered into the primary I/O table 164. Subsequently, the primary I/O table 164 is selected-and copied into the I/O table 162. When an I/O request is received from the accessor operation executing section 176, the I/O port switching section 192 switches and connects either one of the registered I/O ports (a) and (b) with reference to the master I/O table 162. When the medium conveyance information of the secondary mode is received from the upper-order director, the table switching section 174 registers the switching information to the I/O port (a) for the secondary machine controller 32-2 into the secondary I/O table 166. Therefore, when the I/O port switching section 192 receives the I/O request from the accessor operation executing section 176 which was operated by the moving command of the secondary mode, the port is switched and connected to the registered port (a) or (b) with reference to the master I/O table 162 into which the secondary I/O table 166 was copy transferred.

Figure 62:
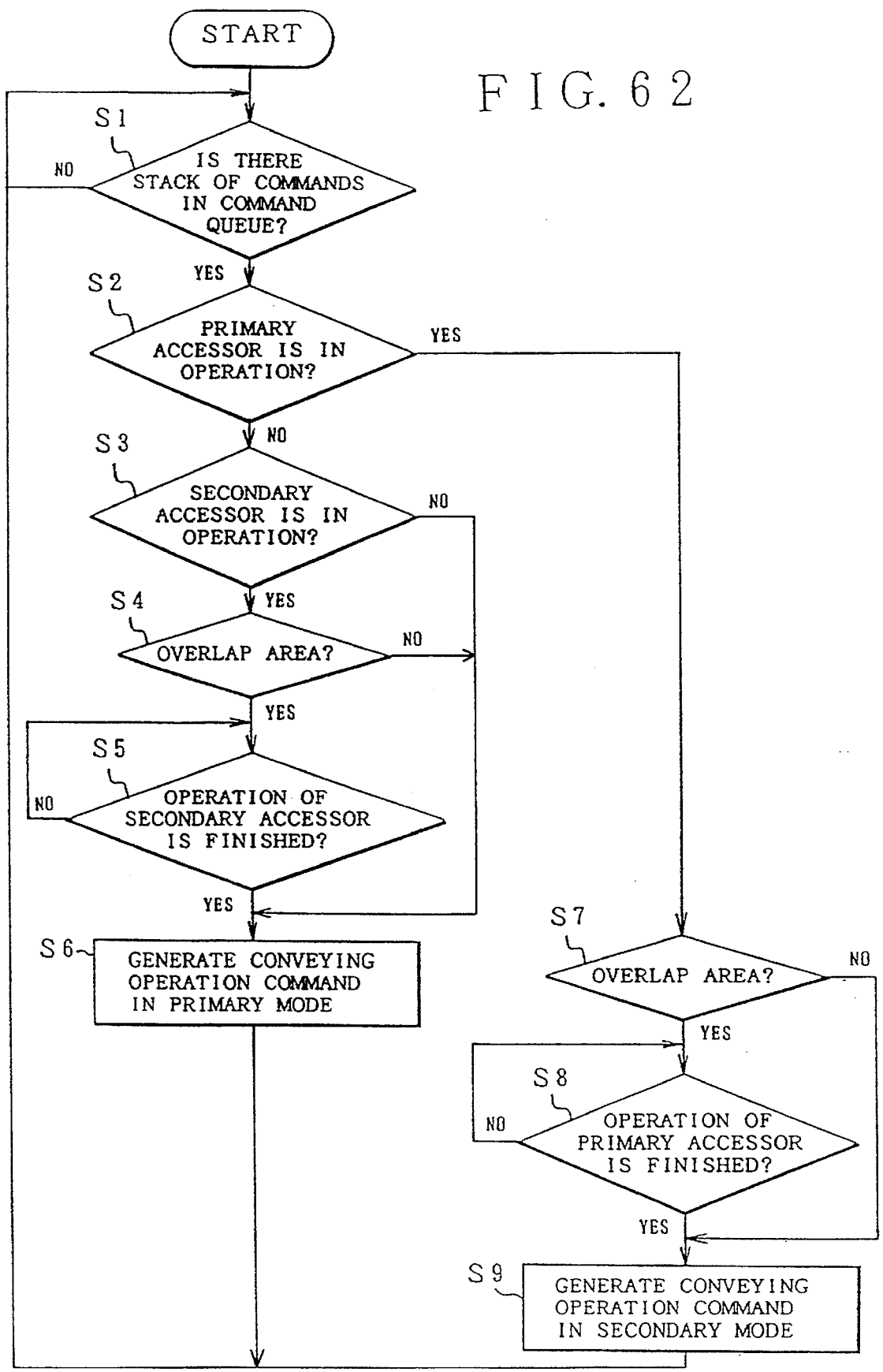
FIG. 62 is a flowchart showing a command generating process by a director in FIG. 57.

A flowchart of FIG. 62 Shows the processing operation of the command generation from the directors 26-1 to 26-4 side shown in FIG. 57 to the primary accessor controller 28. In the library apparatus 24, in order to enable the primary accessor 12-1 and the secondary accessor 12-2 to simultaneously operate, a command queue to stack a plurality of medium conveyance information generated from the host computers 20-1 to 20-4 is provided on the directors 26-1 to 26-4 side. Either one of the primary mode and the secondary mode is designated for the medium conveyance information stored in the command queue as a target and a conveyance operating command is issued to the lower primary accessor controller 28.

First, in step S1 in FIG. 62, a check is made to see if a stack of the medium conveyance information having the moving side cell address and the moving destination cell address which were generated, subsequently to the moving command from the channel exists in the command queue on the director side or not. If YES, step S2 follows and a check is made to see if the primary accessor 12-1 is at present operating or not. When the primary accessor 12-1 stops and is in a ready state, step S3 follows and a check is made to see if the secondary accessor 12-2 is operating or not. When the secondary accessor 12-2 also stops and is in the ready state, step S6 follows and a conveyance operating command is generated in the primary mode. On the other hand, when the secondary accessor 12-2 is operating in step S3, step S4 follows and a check is made to see if a moving area of the primary accessor 12-1 which is issued at this time overlaps the moving area by the secondary accessor 12-2 which is at present executing or not. If they don't overlap, step S6 follows and the conveyance operating command based on the medium conveyance information is generated in the primary mode. When they overlap, step S5 follows and the apparatus waits for a ready response due to the operation end of the secondary accessor which is at present operating. The conveyance operating command by the primary mode is generated in step S6. On the other hand, when the primary accessor 12-1 is operating in step S4, since the conveyance operating command is generated in the secondary mode, the processing routine advances to step S7. In step S7, a check is made to see if the moving area of the primary accessor 12-1 which is operating at present overlaps the moving area of the secondary accessor 12-2 which is newly generated at this time or not. If they don't overlap, step S9 follows and the conveyance operating command is generated in the secondary mode. If they overlap, step S8 follows and the apparatus waits for a ready response by the operation end of the primary accessor 12-1 which is at present operating. The conveyance operating command by the secondary mode is generated in step S9.

Figure 63:
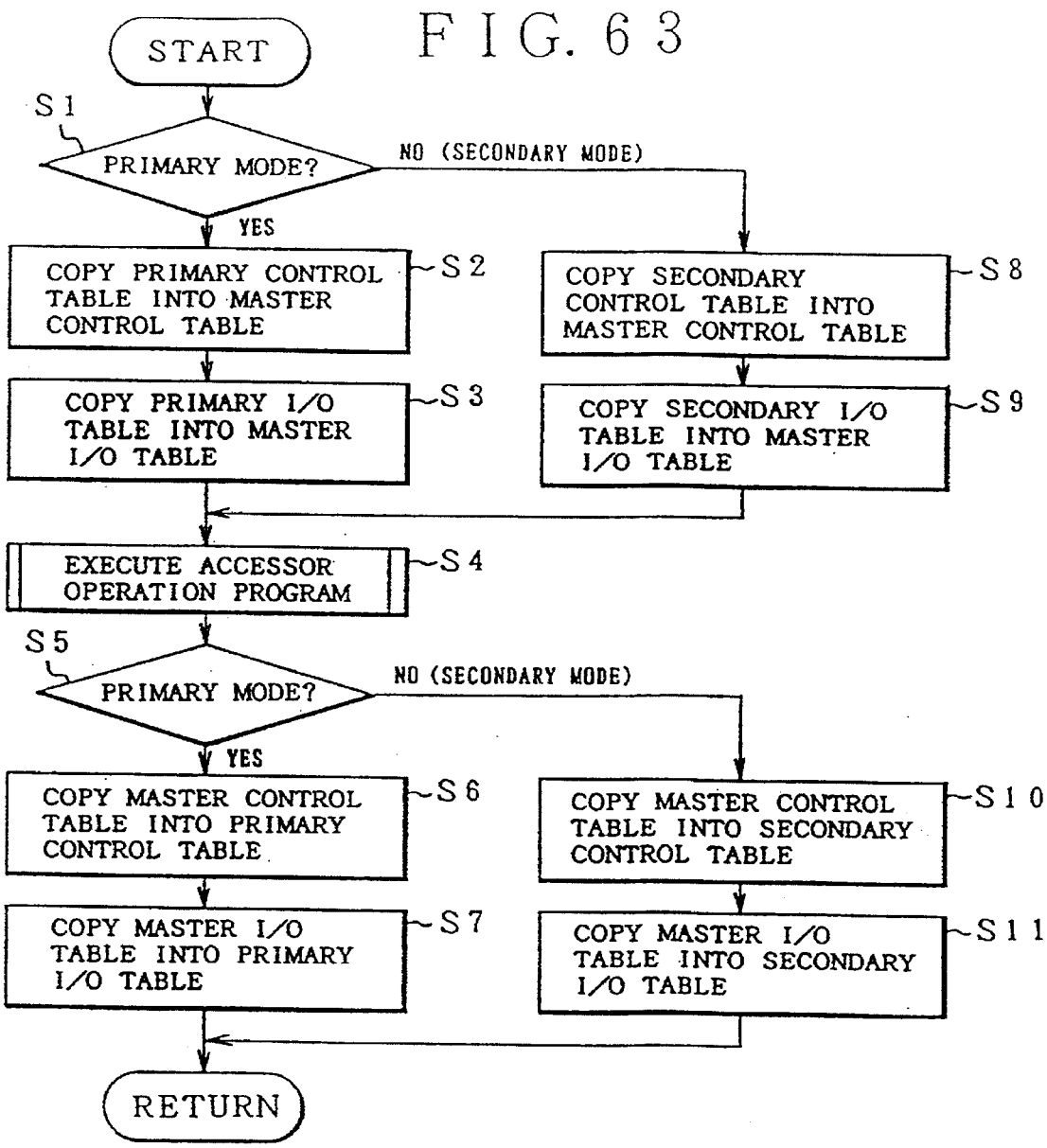
FIG. 63 is a flowchart showing a table switching process by the accessor controller in FIG. 57.

A flowchart of FIG. 63 shows a simultaneous process of the primary accessor 12-1 and the secondary accessor 12-2 by the primary accessor controller 28 shown in FIG. 61. In an idle routine of the idle processing section 172, when the medium conveyance information is received from the upper-order director, the process in FIG. 63 is started. First, in step S1, the medium conveyance information is analyzed and a check is made to see if the mode is the primary mode or not. If YES, step S2 follows and the primary control table 158 in which the data based on the medium conveyance information from the upper-order unit has been developed is copied into the master control table 156. The primary I/O table 164 in which the I/O ports to the primary side have been registered is copied into the master I/O table 162. Subsequently, in step S4, the accessor operation program is executed and the primary accessor 12-1 is made operative by the primary machine controller 32-1. When the operation of the primary accessor 12-1 is finished, a check is made in step S5 to see if the mode is the primary mode or not. If YES, the master control table 156 is copied into the primary control table 158 in step S6. As for the contents of the master control table 156, there is a case where the contents have been rewritten in the execution of the accessor operation program in step S4. Therefore, in the next step S7, the master I/O table 162 is copied into the primary I/O table 164.

On the other hand, in the case where the medium conveyance information in the secondary mode is received from the upper director, the secondary control table 160 is copied into the master control table 156 in step S8. The secondary I/O table 166 is copied into the master I/O table 162 in step S9. The accessor operation program is executed by generating a command to the secondary machine controller 32-2 in step S4. When the operation on the secondary accessor 12-2 side is finished, the processing routine advances to step S10 due to the judgment of the secondary mode in step S5. In step S10, the master-control table 82 is copied into the secondary control table 160. In step S11, the master I/O table 162 is copied into the secondary I/O table 166. The processing routine is now returned to the idle routine of the idle processing section 172.

Figure 64:
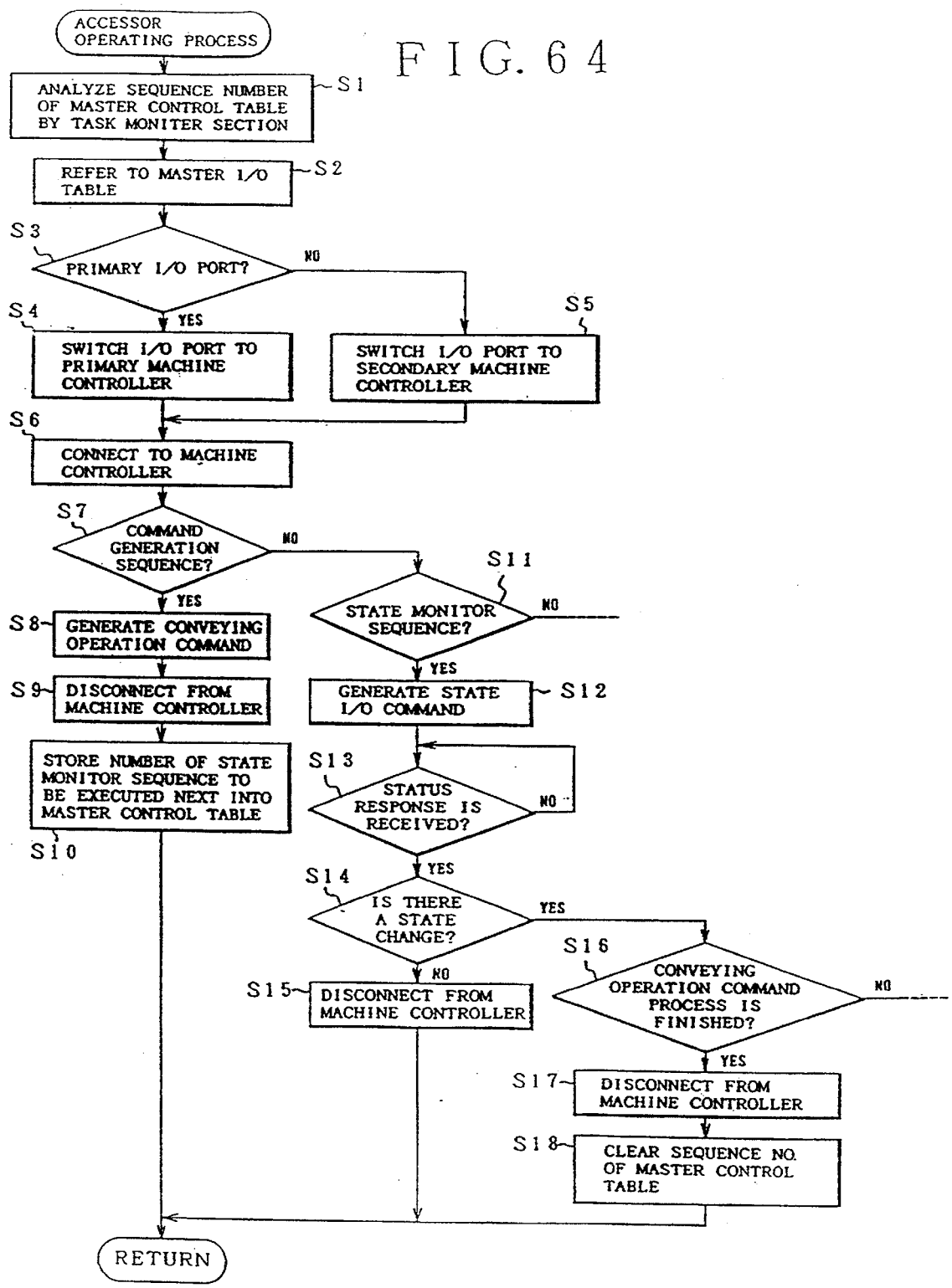
FIG. 64 is a flowchart showing the details of an accessor operating program in FIG. 63.

A flowchart of FIG. 64 shows the details of the accessor operation program in step S4 in FIG. 63. FIG. 64 also shows the processes about the command generation sequence 182 and state monitor sequence 184 in FIG. 61. First, in step S1, the task monitor section 178 refers to the master control table 156 at that time and analyzes the sequence number at the next time in the control table shown in FIG. 59. With respect to the first medium conveyance information, the sequence number at the next time has previously been stored on the basis of the result of the analysis of the medium conveyance information. It is now assumed that by receiving the medium conveyance information in the primary mode from the upper director and copying the primary control table 158, the data shown in FIG. 59 has been stored into the master control table 156. In this instance, the sequence number at the next time is equal to SEQ2 indicative of the command generation sequence 182. Therefore, in step S1, the sequence number SEQ2 in the master control table 156 is analyzed and the command generation sequence 182 is selected as an execution sequence by the task monitor section 178. In the next step S2, the master I/O table 162 is referred. At this time, the I/O port (a) to the primary machine controller 32-1 has been stored in the master I/O table 162 by the copy of the primary I/O table 90 in the primary mode. In step S3, therefore, the primary I/O port is discriminated and step S4 follows. In step S4, the I/O port switching section 192 switches the I/O port to the primary machine controller 32-1 side. Subsequently, by the execution of the command generation sequence 182 of the accessor operation executing section 176, the path with the primary machine controller 32-1 designated by the switching of the I/O port is connected in step S6. In the next step S7, since the command generation sequence 182 is now executed, step S9 follows and the conveyance operating command is generated as an I/O command to the primary machine controller 32-1. The conveyance operating command is based on the medium conveyance information designated by the moving side address and the moving destination address of the medium cartridge. When the conveyance operating command is generated in step S8, the primary machine controller 32-1 is disconnected in step S9. Further, in step S10, the sequence number SEQ3 of the state monitor sequence 184 which is executed next is stored into the master control table 162. The processing routine is returned to the main routine in FIG. 63. Therefore, in step S6 in FIG. 63, the sequence number SEQ3 of the state monitor sequence 184 which was newly stored in the master control table 156 and is executed next is copied into the primary control table 158. In step S8, the primary machine controller 32-1 which received the conveyance operating command moves the primary accessor 12-1 by the motor driving to the moving side address which was designated by the command, thereby positioning. Subsequently, the medium cartridge is taken out by a robot hand and is moved and positioned to the position of the moving destination address designated by the command, thereby inserting the medium cartridge held to the designated position. Specifically speaking, the medium cartridge taken out from the cell block 10 is conveyed and loaded into the recording and reproducing apparatus. The medium cartridge in which the reading and writing operations were finished by the recording and reproducing apparatus is conveyed and returned to the cell block 10. Further, the medium is also conveyed between the cell block 10 and the medium inlet/outlet 15.

After the generation of the moving command in the primary mode was finished, the program operation of the accessor is executed every predetermined time by a timer interruption. In this case as well, the task monitor section 178 analyzes the sequence number of the master control table 156 into which the primary control table 158 was copies in step S1. The sequence number is equal to SEQ3 indicative of the state monitor sequence 184 by the generating process of the moving command at the previous time. Therefore, the processor operation executing section 176 executes the state monitor sequence 184. The selection of the I/O port in the primary mode is performed in a manner similar to that in the preceding case. When the I/O port is connected to the primary machine controller 32-1 in step S6, step S11 follows and the state monitor sequence is judged. A state I/O command is generated in step S12. For the state I/O command, a status response from the primary machine controller 32-1 is received in step S13. Subsequently, in step S18, the presence or absence of a state change of the status response is discriminated. If there is no state change, in step S15, the master control table 156 is held as it is and the primary machine controller 32-1 is disconnected. The processing routine is returned to the main routine in FIG. 63.

When the state change is judged from the status response in step S14, step S16 follows and a check is made to see if the process of the conveyance operating command has been finished or not. If YES, the primary machine controller 32-1 is disconnected i$_n$ step S17. After that, the sequence number SEQ3 of the master control table 156 is cleared in step S18. The processing routine is returned to the main routine in FIG. 63. Therefore, the sequence number in the primary control table 156 is returned to the clear state by the copy of the master control table 156 into the primary control table 158 in step S6. On the other hand, in the secondary mode, there is a difference such that the processing routine advances to step S5 in FIG. 64 and the I/O port is switched to the secondary machine controller 32-2. The other construction is substantially the same as that in case of the primary mode. That is, upon execution of the operation program by the accessor operation executing section 176, the operation program can be executed without being aware of whether the operation is the operation of the primary accessor 12-1 or the operation of the secondary accessor 12-2. The accessor operating process in FIG. 64 has been described in detail with respect to the command generation sequence and the state monitor sequence as an example. However, with regard to the remaining initialization sequence, retry sequence, normal end sequence, and abnormal end sequence, the corresponding command sequence can be similarly executed by the switching of the I/O port according to the result of the analysis of the sequence number in the master control table 156 and the primary or secondary mode.

Further, when the state change of the status response doesn't indicate the end of process of the conveyance operating command in step S16 in FIG. 64, the sequence number SEQ4 of the retry sequence 186 in FIG. 61 is registered as a next command sequence into the master control table 156. In this instance, when the processes are not normally finished by the execution of the retry sequence of a predetermined number of times, the processing routine advances to the abnormal end sequence.

Figure 65:
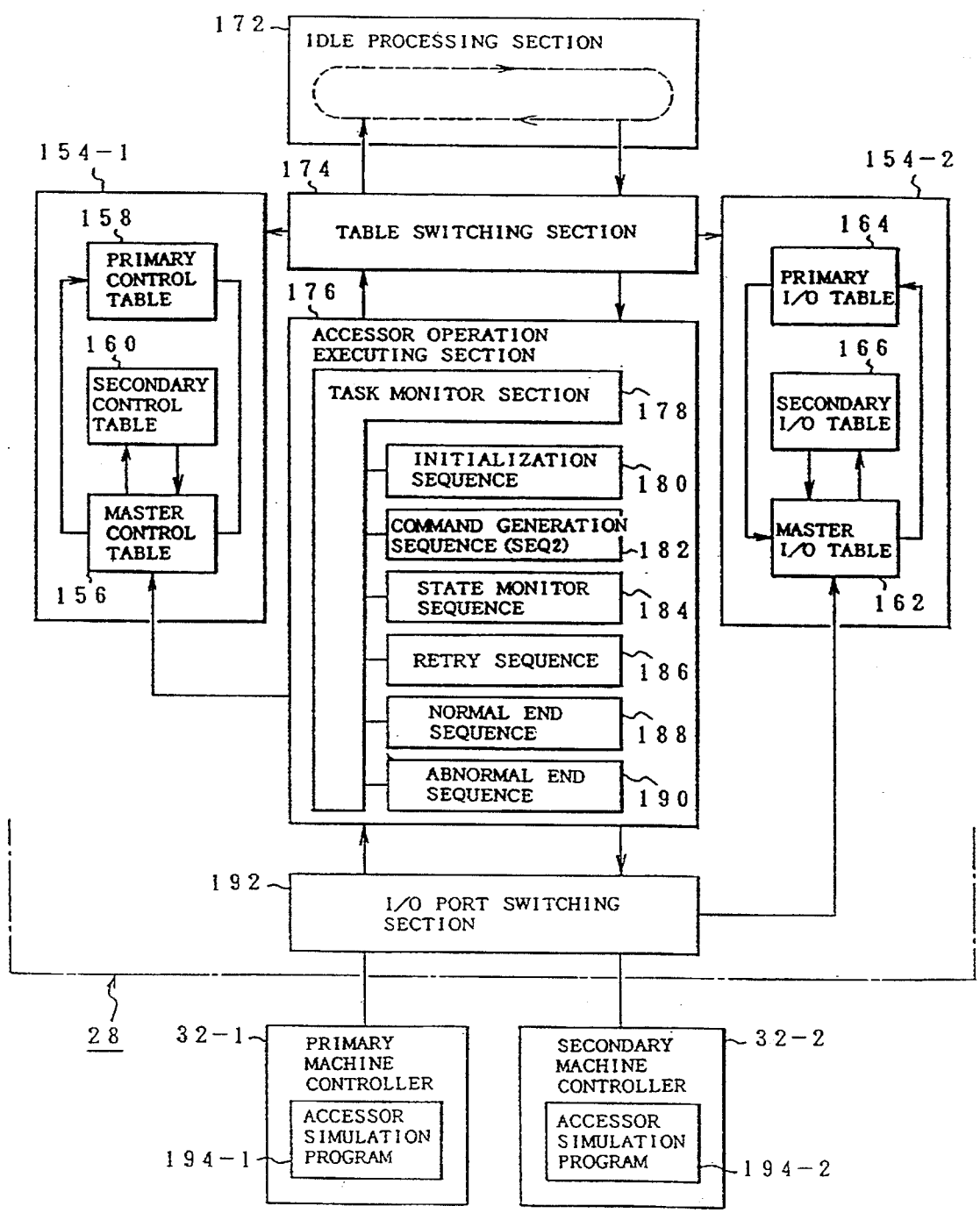
FIG. 65 is a block diagram showing a simulating function of an accessor in FIG. 63.
Figure 66:
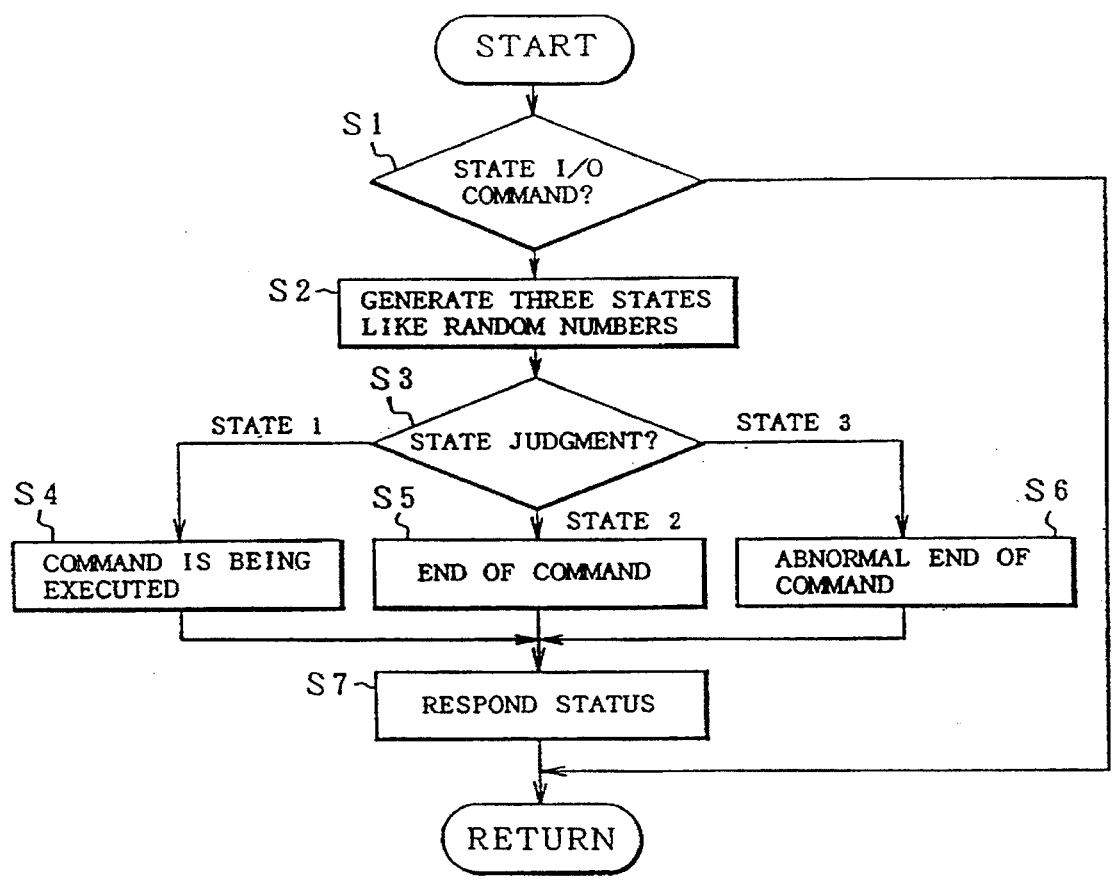
FIG. 66 is a flowchart showing a simulating process in FIG. 65.

FIG. 65 is a diagram showing a state in which the simulating function which is used for verification of the simultaneous operations of the two accessors in the accessor controller is provided for each of the machine controllers 32-1 and 32-2. The primary accessor controller 28 has the same function as that shown in FIG. 61. Accessor simulation programs 194-1 and 194-2 are installed in the machine controllers 32-1 and 32-2. The accessor simulation programs 194-1 and 194-2 are used to verify the function of the simultaneous operations by the primary accessor controller 28 in an assembly state in which the accessors 12-1 and 12-2 shown in FIGS. 11 to 14 are not attached to the library apparatus. As shown in FIG. 66, according to the accessor simulation programs 194-1 and 194-2, when the operating command from the primary accessor controller 28, namely, the state I/O command is discriminated in step S1, the following three states I. during the command execution II. command normal end III. command abnormal end are generated like random numbers and a status response is returned. Therefore, when the conveyance operating command is generated as an I/O command from the primary accessor controller 28, in response to the state I/O command in the next state monitor sequence, the accessor simulation program 194-1 or 194-2 forms a message indicative of "during the command execution", "command normal end", or "command abnormal end" like a random number and returns as a status response. For the pseudo status response from the accessor simulation program 194-1 or 194-2, the primary accessor controller 28 registers the next sequence number into the master control table 156 and can execute the control operation similar to that two accessors are actually simultaneously driven. Therefore, evaluation data such as whole processing time when two accessors simultaneously operate, mean time of the conveyance until the medium is loaded from the processing block into the recording and reproducing apparatus, further, mean time of the return conveyance when the medium is returned from the recording and reproducing apparatus to the cell block, and the like can be obtained by using the accessor simulation programs 194-1 and 194-2 of the primary machine controller 32-1 and the secondary machine controller 32-2.

As for such accessor simulation programs 94-1 and 94-2, they are not developed into the control unit of the actual library apparatus as shown in the above embodiment but the accessor operation program and accessor simulation program are developed onto a computer as a mother machine and are all processed in a software manner and the processed programs are used to confirm and improve the performance of the accessor operation program. After completion of the adjustment on the computer as a mother machine, it is sufficient to transfer the completed program into the primary accessor controller 28 of the actual library apparatus.

Although the above embodiment has been described with respect to only the primary accessor controller 28 side, further, almost the same operation program is also installed with regard to the secondary accessor controller 30 aide and it is provided as a spare apparatus for alternating when the primary side fails. Moreover, although the above embodiment has been described with respect to the case as an example Where a command queue to store a plurality of medium conveyance information generated from the host computer is provided on the director side, the command queue can be also provided on the accessor controller side.

As mentioned above, according to the invention, there is no need to modify the operation program to make one accessor operative. By merely providing the virtual tables and virtual I/O port tables corresponding to the two accessors and exchanging those tables to the real table and real I/O port table which are used for the actual program operation and the switching of the I/O ports, one operation program can be regarded as two operation programs. The simultaneous operations of the two accessors can be easily executed and the processing performance of the library apparatus can be remarkably improved.

Since the operation program developed for one accessor in the conventional apparatus can be used as it is, the software function can be utilized. The development costs and apparatus costs when realizing the simultaneous operations of two accessors can be remarkably reduced.

Further, since the simulating function to falsely execute the conveying operation for the operating command from the accessor controller is provided for the machine controller of the accessor, the function of the operation program of the accessor controller can be confirmed in a short time.

[Fault recovering process]

Figure 67:
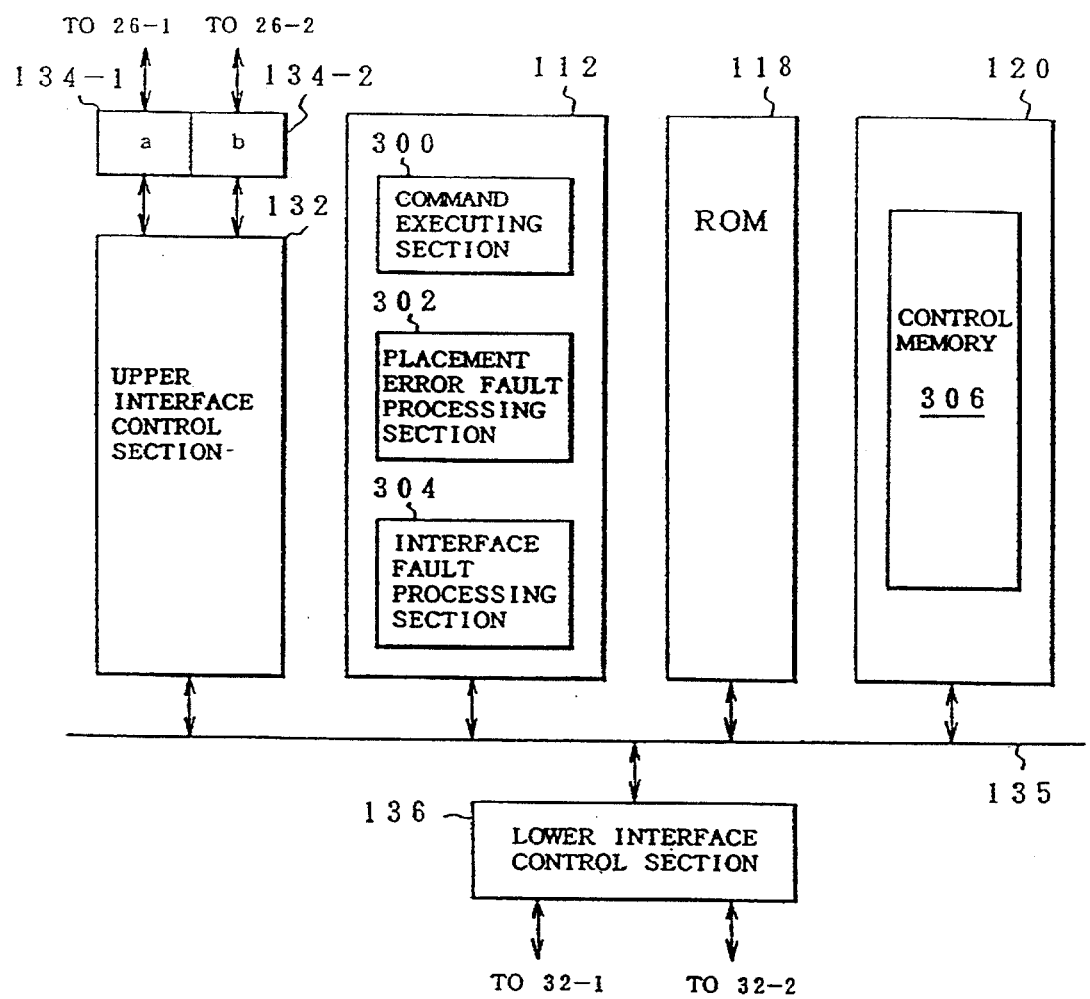
FIG. 67 is a block diagram showing an accessor controller which is used in the fourth embodiment of the invention.

FIG. 67 shows a hardware of the accessor controller 28 which is used in the fourth embodiment of the library apparatus of the invention for performing the fault recovering function. The accessor controller 28 comprises the CPU 112, ROM 118, DRAM 120, upper interface control section 132, adapters 134-1 and 134-2, internal bus 135, and lower interface control section 134. The CPU 112 realizes functions as a command executing section 300, a placement error fault processing section 302, and an interface fault processing section 304 on the basis of a program in the ROM 118. A control memory 306 is stored in the DRAM 120.

Figure 68:
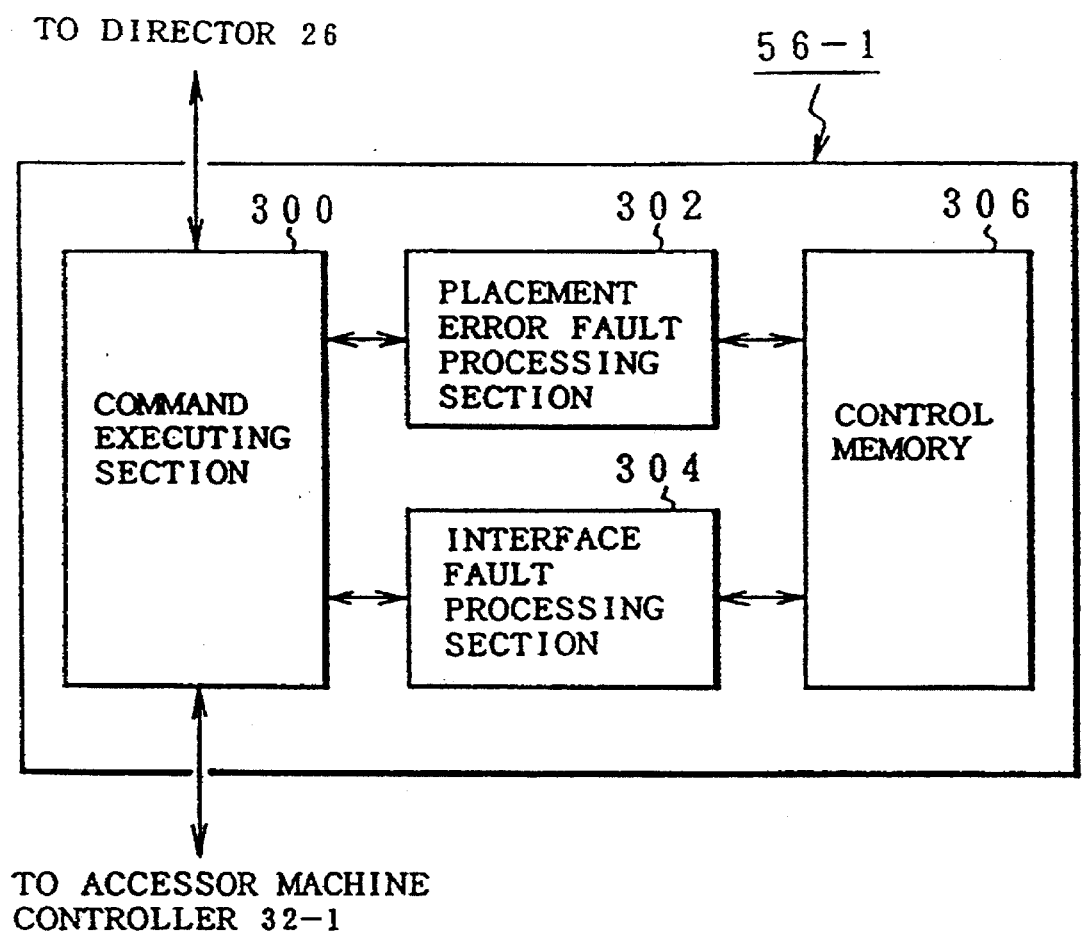
FIG. 68 is a block diagram showing functions of the accessor controller in FIG. 67.

FIG. 68 shows the functions of the accessor controller 28 in FIG. 67. For instance, as shown in FIG. 15, the command executing section 300 of the accessor controller 28 receives the medium conveyance information generated subsequently to the moving command from the host computer via the director and makes the machine controller 32-1 operative, thereby allowing the accessor 12-1-to convey the medium from the designated moving side address to the moving destination address. After the medium conveying operation was instructed, the command executing section 300 monitors the status response from the accessor 12-1. When a fault is recognized from the status response, the recovering process corresponding to the kind of fault is executed. Practically speaking, the placement error fault processing section 302 operates for the status response of the placement error fault from the accessor 12-1. The interface fault processing section 304 operates in response to the notification from the director side of a fault of the interface bus system between the host computer and the library apparatus. The placement error fault processing section 302 and the interface fault processing section 304 are prepared as an interruption routine for the interruption obtained from the status response in the command executing section 300. The control memory 306 to store the placement error medium information is provided for the placement error fault processing section 302. In the fault recovering process by the placement error fault processing section 302, each of the medium which was first held to the robot hand of the accessor and the medium remaining in the moving destination address in which the placement error occurred is shunted to the shunt cell addresses in the cell block 10. In this instance, if the medium is left in the moving destination address after it was shunted, the placement error fault is not recovered but the processes are finished as a fault. When the medium is shunted to the shunt cell in the cell block, the medium information indicative of the storage of the placement error medium to the shunt cell is stored into the control memory 306. The medium information stored in the control memory S06 due to the placement error fault is used as information indicative of the position where the medium exists at the time when a placement error fault overlappingly occurs upon recovering process by the interface fault processing section 304.

Figure 69:
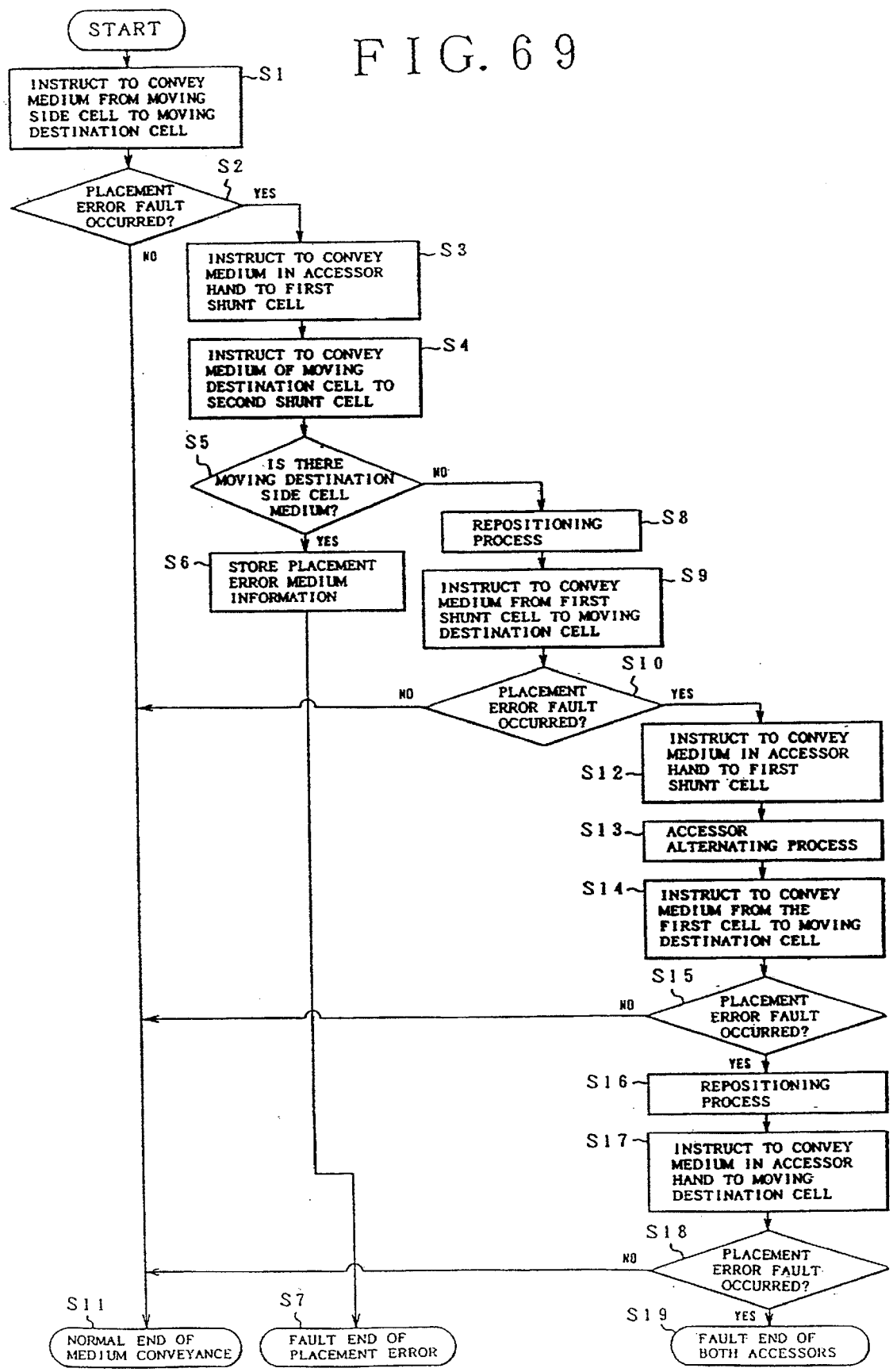
FIG. 69 is a flowchart showing a recovering process of a placement error fault in FIG. 68.

A flowchart of FIG. 69 shows a recovering process for the placement error fault. A fundamental idea of the recovering process for the placement error fault in the present invention is such that the medium in which a placement error occurred is conveyed to the shunt cell in the cell block by the accessor and, further, the medium remaining in the moving destination address is also conveyed to the shunt cell by the same accessor. After the medium was shunted, a check is made to see if the medium exists in the moving destination address or not. When there is the medium in the moving destination address, it is judged that the placement error fault is not recovered, so that a placement error fault end is immediately performed. In this instance, the placement error medium information indicating that two media were stored into the shunt cells is stored. After the media were shunted, a check is made to see if the medium exists in the moving destination address or not. When no medium exists there, an alternating process of the accessor is executed by regarding as an alignment error of the accessor used at the time of occurrence of the placement error fault in such a case. After the accessor was alternated, the medium which has been stored in the shunt cell by the spare accessor and in which the placement error fault occurred is conveyed to the moving destination address.

Figure 70:
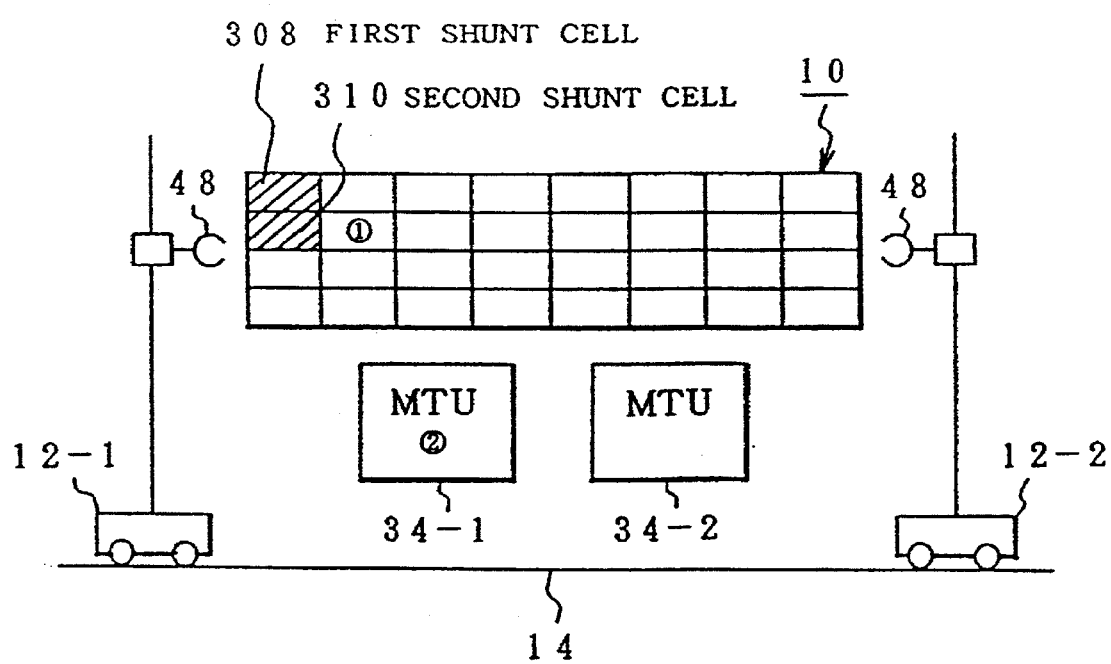
FIG. 70 is an explanatory diagram showing a practical example of the medium conveyance in a library apparatus which executes the recovering process in FIG. 69.

The recovering process of the accessor controller for the placement error fault of FIG. 69 will now be specifically explained with respect to the medium conveyance in the library apparatus shown in FIG. 70 as an example. First, in step S1, it is assumed that the accessor controller 28 generated the command of the medium conveyance from the moving side address (1) in the cell block 10 to the moving destination address (2) to designate the recording and reproducing apparatus 34-1. It is assumed that during the medium conveyance of the accessor 12-1 based on the command, another medium remains in the recording and reproducing apparatus 34-1 having the moving destination address (2) and, when the operator tries to load the medium conveyed by the robot hand 48 of the accessor 12-1, the medium collides and a placement error fault occurs. Therefore, the accessor controller 28 discriminates the status response indicative of the occurrence of the placement error fault from the accessor 12-1 side in step S2 and the recovering process in step S3 and subsequent steps is executed. In step S3, a command to convey the medium in the robot hand 48 of the accessor 12-1 to a first shunt cell 308 in the cell block 10 is generated. Namely, a command for setting the robot hand 48 of the accessor 12-1 to the moving side address and for setting the cell address of the first shunt cell 308 in the cell block 10 into the moving destination address is generated. By receiving the medium conveying command, the accessor 12-1 stores the medium which was held to the robot hand 48 and in which the placement error fault occurred into the first shunt cell 308. In the next step S4, a command for conveying the medium remaining in the recording and reproducing apparatus 34-1 corresponding to the moving destination address (2) to a second shunt cell 310 in the cell block 10 is generated. That is, a command for setting the cell address (2) of the recording and reproducing apparatus 34-1 to the moving side address and for setting the second shunt cell 310 in the cell block 10 to the moving destination address..is generated. After the shunting process for shunting the two media to the first shunt cell 308 and the second shunt cell 310 was finished, a check is made in step S5 to see if there is the medium in the recording and reproducing apparatus 34-1 having the moving destination address (2) or not. If YES, it is judged that the placement error fault could not be recovered. In step S6, placement error medium information indicating that the medium in which the placement error occurred has been stored in the first shunt cell 308 is formed and stored into the control memory 306. A placement error fault end is performed in step S7.

On the other hand, when no medium exists in the recording and reproducing apparatus 34-1 having the moving destination address (2) after the shunting in step S5, step S8 follows and a repositioning process is executed. As shown in step S9, in the repositioning process, the medium conveyance from the first shunt cell 308 in which the medium having the placement error has been enclosed to the recording and reproducing apparatus 34-1 as a moving destination address (2) is instructed to the accessor 12-1. By receiving such a command, the accessor 12-1 takes out the medium from the first shunt cell 308 and conveys and loads the medium into the recording and reproducing apparatus 34-1. In this instance, if no placement error fault occurs, the processing routine advances from step S10 to step S11 and a normal end of the medium conveyance is performed. However, when a placement error fault again occurs and the occurrence of the placement error fault is judged from the status response in step S10, it is determined that an alignment error occurred in the accessor 12-1. The processing routine advances to step S12. In step S12, a command to again return the medium in the robot hand 48 of the accessor 12-1 to the first shunt cell 308 is generated. Subsequently, in step S13, an accessor alternating process for switching from the accessor 12-1 to the accessor 12-2 is executed. After completion of the accessor alternating process, a command to convey the medium from the first shunt cell 308 to the recording and reproducing apparatus 34-1 having the moving destination address (2) is generated to the accessor 12-2 after the alternation in step S14. Therefore, the alternated accessor 12-2 takes out the medium from the first shunt cell 308 and conveys and loads the medium to the MTU 34-1. When the accessor 12-2 normally conveys the medium, the status response of the placement error fault is not obtained. Therefore, the processing routine advances from step S14 to step S11 and the normal end of the medium conveyance is performed.

However, in the case where a placement error fault again occurs even by the medium conveyance by the accessor 12-2, step S16 follows and the repositioning process by the accessor 12-2 is performed. For this purpose, in step S7, a command to convey the medium in the robot hand 48 of the accessor 12-2 to the recording and reproducing apparatus 34-2 having the moving destination address (2) is generated. That is, a command for setting the robot hand 48 of the accessor 12-2 to the moving side address and for setting the address (2) of the recording and reproducing apparatus 34-2 to the moving destination address is generated. When the medium can be normally loaded to the recording and reproducing apparatus 34-1 of the moving destination address (2) by the shunt positioning operation of the accessor 12-2, the processing routine advances from step S18 to step S11 and the normal end of the medium conveying operation is performed. However, in the case where a placement error fault is again judged from the status response by the alignment error of the accessor 12-2, both of the accessors 12-1 and 12-2 cannot be used. Therefore, step S19 follows and the fault end of both of the accessors is performed.

As mentioned above, in the recovering process for the placement error fault of the invention, when the occurrence of the first placement error fault is judged in step S2, the medium in the robot hand of the accessor and the medium in the moving destination address are respectively conveyed to the shunt cells in steps S3 and S4 and a check is made to see if the medium exists in the moving destination address or not. When the medium still remains, it is judged that the placement error fault is not recovered, the placement error medium information indicative of the medium stored in the shunt area is stored and the fault end is performed. Therefore, as compared with the case of performing the repositioning operation by regarding the placement error fault as an alignment error of the accessor in the conventional apparatus, the processing time which is required until the placement error fault which cannot be recovered is finished as a fault can be remarkably reduced. With respect to the end of placement error fault, the medium collision occurs only once due to the occurrence of the first placement error fault and the medium collision never occurs until the end of fault. Therefore, the problem of the medium damage which occurs when a shock is applied by the medium collision can be also certainly reduced. Since the alternating process due to the alignment error of the accessor is performed on the assumption that no medium exists in the moving destination address in which the placement error fault occurred as a prerequisite, even if the repositioning process or accessor alternating process is executed in step S8 and subsequent steps, the medium doesn't collide.

Figure 71:
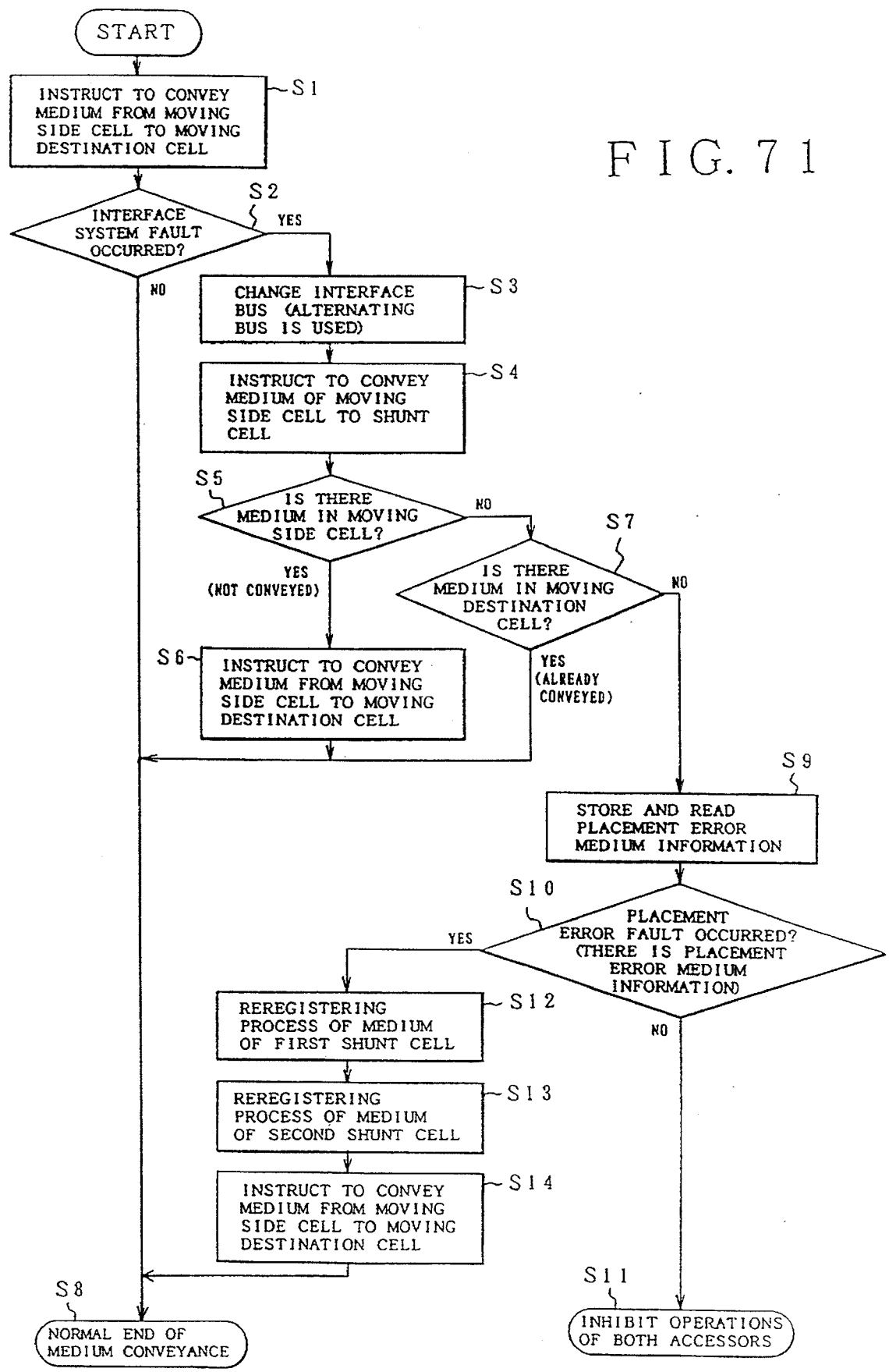
FIG. 71 is a flowchart showing a recovering process of an interface bus system fault in FIG. 68.

A flowchart of FIG. 71 shows a recovering process in the case where an interface system fault between the apparatus and the host computer occurred. The fundamental idea of the recovering method for the interface system fault of the invention is such that when an interface system fault occurs, the interface bus between the host computer and the director of the library apparatus is changed to the alternating path side. After the alternation, the accessor controller discriminates whether the medium as a target of the conveyance at the time of occurrence of the interface fault exists in the moving side address or the moving destination address, and the necessary recovering process is executed. Further, when the medium doesn't exist in both of the moving side address and the moving destination address, the placement error medium information is read out and checked. If the placement error fault overlappingly occurred, the medium stored in the shunt cell is recognized from the placement error medium information and the necessary recovering process is executed.

First, in step S1 in FIG. 71, the accessor controller 28 generates to the accessor 12-1 a command for conveying the medium, for example, from the moving side address (1) in the cell block in FIG. 70 to the moving destination address indicative of the recording and reproducing apparatus 34-1 on the basis of the medium conveyance information received from the host computer. Now, assuming that a fault occurred in the interface bus during the execution of the command, a fault notification from the director side is received and the occurrence of the interface system fault is judged in step S2. The processing routine advances to the recovering process in step S3 and subsequent steps. In step S3, the interface bus with the host computer in which the interface system fault occurred is changed to the interface bus for alternating on the director side. When the end of change to the alternating path is notified from the director side, the accessor controller 28 generates a command to refer to the medium in the moving side address to the accessor 12-1 in step S4. In association with the execution of the command by the accessor 12-1, a check is made in step S5 to see if the medium exists in the moving side address or not. When the accessor 12-1 inserts the robot hand 48 into the moving side address (1) and judges the presence of the medium, step S5 follows and judges that the medium conveying operation by the command generated in step S1 at the time of occurrence of the interface system fault is not executed. In this case, a command to again convey the medium from the moving side address (1) to the moving destination address (2) is generated in step S6. Due to this, the medium conveyance can be normally finished in step S8 for the interface system fault.

On the other hand, when the operator tries to take out the medium in the moving side address (1) in the cell block 10 by the robot hand 48 of the accessor 12-1 in order to convey the medium in the moving side address (1) to the shunt cell, if no medium exists, step S7 follows and a check is made to see if the medium exists in the moving destination address (2) or not. If YES, it is determined hat, when the interface system fault occurs, the conveying operation of the medium has already been completed, so that the normal end is performed in step S8. When the medium doesn't exist in the moving destination address (2) in step S7, step S9 follows and the placement error medium information in the control memory 306 is read out. When there is no placement error medium information, no medium is stored in the shunt cell. It is, therefore, regarded that there is a possibility such that the medium was dropped out from the robot hand 48, so that the processing routine advances to step S11. In order to avoid that the medium is damaged, the operations of both of the accessors 12-1and 12-2 are inhibited. The processes are finished as a CE call fault.

In the case where the placement error medium information is obtained in step S10, a reregistering process into the cell table of the medium stored in the first shunt cell 308 by the occurrence of the placement error fault is executed. When the medium has also been stored in the second shunt cell 310, the reregistering process for the cell table is also similarly executed in step S13. After the reregistering process of the medium into the cell table was finished, in order to convey the medium stored in the first shunt cell 308 to the recording and reproducing apparatus 34-1, the medium conveyance for setting the first shunt cell 308 to the moving side address and for setting the recording and reproducing apparatus 34-1 to the moving destination address is instructed to the accessor 12-1. The normal end can be performed in step S8.

It will be obviously understood that the present invention is not limited by the number of apparatuses shown in each of the embodiment mentioned above.

What is claimed is:

1. A library apparatus comprising:

memory reproducing means for performing the reading and writing operations for a portable memory medium;

inlet/outlet means for inserting and ejecting said memory medium into/from an outside of the apparatus;

medium stocking means for storing a plurality of said memory media;

at least two medium conveying means for conveying the memory medium between said medium stocking means and said memory reproducing means or between the medium stocking means and said inlet/outlet means; and conveyance control means for controlling said medium conveying means on the basis of medium conveyance information including a moving side address and a moving destination address which were obtained in association with a moving command from an upper-order unit, wherein said conveyance control means has command executing means for taking out the memory medium from the moving side address of said medium conveyance information by said medium conveying means and conveying and storing said memory medium to said moving destination address, placement error fault processing means for processing in a manner such that when a placement error fault such that the conveyed memory medium cannot be stored because another memory medium has already been stored in the moving destination address designated by said command executing means occurs, the medium held by the medium conveying means is stored into a first shunt cell, said another memory medium stored in said moving destination address is taken out and stored into a second shunt cell by the same medium conveying means, further, placement error medium information indicating that the memory medium has been stored in each of the first and second shunt cells is stored, and processes are finished as a fault, and interface fault processing means for processing in a manner such that when a fault of an interface system between the apparatus and the upper-order unit occurs, the presence or absence of the memory medium in each of the moving side address and the moving destination address of said medium conveyance information is judged by using an alternating path, and when no medium exists in both of the moving side address and the moving destination address, said placement error medium information is examined, and when the medium exists in a shunt destination cell, the first shunt cell is set to the moving side address, and the fault is recovered by the medium conveyance from the moving destination address.

2. An apparatus according to claim 1, wherein in the case where no medium exists in the moving destination address after the memory media in the moving side address and the moving destination address were shunted, said placement error fault processing means executes a repositioning process for conveying the memory medium in the first shunt cell to the moving destination address by using the same medium conveying means, and in the case where a placement error fault occurs due to said repositioning process, it is judged that such a fault is a fault of the medium conveying means, so that the medium conveying means is alternated to spare medium conveying means and the memory medium in the first shunt cell is conveyed to the moving destination address by said spare medium conveying means.

3. An apparatus according to claim 2, wherein in the case where the placement error fault occurs when the medium conveying means is alternated to the spare medium conveying means and the medium in the first shunt cell is conveyed to the moving destination address, said placement error fault processing means executes the repositioning process for conveying the medium in the first shunt cell to the moving destination address by using the same medium conveying means, and in the case where the placement error fault occurs due to said repositioning process by said spare medium conveying means, it is judged that such a fault is a fault of both of the medium conveying means, so that the processes are finished.

4. An apparatus according to claim 1, wherein when the memory medium in the moving destination address is conveyed to the shunt cell by the medium conveying means by using an alternating bus, in the case where it is judged that the memory medium exists in the moving side address, said interface fault processing means judges that the memory medium is not conveyed yet, so that the medium is conveyed from the moving side address to the moving destination address.

5. An apparatus according to claim 1, wherein when the memory medium in the moving destination address is conveyed to the shunt cell by the medium conveying means by using an alternating bus, in the case where it is judged that the memory medium exists in the moving destination address, said interface fault processing means judges that the conveyance of the memory medium has already been finished, thereby finishing the processes as a normality.

6. An apparatus according to claim 1, wherein in the case where said placement error medium information is not stored, said interface fault processing means inhibits the operations of both of the medium conveying means, thereby finishing the processes as a fault.

* * * * *

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 2, line 24, delete "Channel (A)" and insert --channel (A)-- therefor.

Column 4, line 33, delete "counter measure" and insert --countermeasure-- therefor.

Column 4, line 43, delete "an example in step" and insert --an example. In step-- therefor.

Column 5, line 12, delete "Judged" and insert --judged-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 5, line 14, delete "Judged" and insert --judged-- therefor.

Column 5, line 14, delete "he recovered" and insert --be recovered-- therefor.

Column 8, line 63, delete "system in" and insert --system. In-- therefor.

Column 11, line 1, delete "Conveying" and insert --conveying-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 16, line 48, delete "directors and"

insert --directors 26-1 and-- therefor.

Column 17, line 4, delete "controllers and"

and insert --controllers 28 and-- therefor.

Column 21, line 35, delete "26L2" and insert

--26-2-- therefor.

Column 21, line 49, delete "Status" and insert --status-- therefor.

Column 28, line 60, delete "17-2" and insert

--122-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 29, line 26, delete "Busy" and insert --busy-- therefor.

Column 35, line 34, delete "Of the" and insert --of the--therefor.

Column 37, line 2, delete "19-2" and insert --12-2-- therefor.

Column 37, line 4, delete "12-9" and insert --12-2-- therefor.

Column 39, line 16, delete "at a velocity" and insert --at a uniform velocity-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 40, line 20, delete

"$S_{1y}0.5xa_{1y}xt_{1y}0.5V_{my}^2/a_{1x}=0.077 \text{ (m)}$" and insert

--$S_{1y} = 0.5 \times a_{1y} \times t_{1y} = 0.5.V_{my}^2/a_{1x} = 0.077(m)$-- therefor.

Column 40, line 64, delete "{(yx0.0404) 31 (0.077+0.384)}" and insert --{(y x 0.0404)-(0.077+0.384)}-- therefor.

Column 45, line 42, delete "commend" and insert --command-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 45, line 45, delete "Secondary" and insert --secondary-- therefor.

Column 48, line 63, delete "$i_n$" and insert --in-- therefor.

Column 50, line 21, delete "30 aide" and insert --30 side-- therefor.

Column 50, line 25, delete "Where" and insert --where-- therefor.

Column 51, line 33, delete "S06" and insert --306-- therefor.

UNITED STATES PATENT AND TRADEMARK OFFICE
CERTIFICATE OF CORRECTION

PATENT NO. : 5,640,510
DATED : Jun. 17, 1997
INVENTOR(S) : Hanaoka et al.

It is certified that error appears in the above-indentified patent and that said Letters Patent is hereby corrected as shown below:

Column 52, line 30, delete "address..is" and insert --address is-- therefor.

Column 53, line 39, delete "Judged" and insert --judged-- therefor.

Column 54, line 49, delete "determined hat"

and insert -- determined that-- therefor .

Signed and Sealed this

Twenty-fifth Day of August, 1998

Attest:

BRUCE LEHMAN

*Attesting Officer*  *Commissioner of Patents and Trademarks*